(12) United States Patent
DePhillips

(10) Patent No.: US 9,991,654 B1
(45) Date of Patent: *Jun. 5, 2018

(54) INTELLIGENT DECORATION SYSTEM

(71) Applicant: Thomas DePhillips, Bellfontaine, OH (US)

(72) Inventor: Thomas DePhillips, Bellfontaine, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/587,845

(22) Filed: May 5, 2017

Related U.S. Application Data

(63) Continuation-in-part of application No. 15/479,785, filed on Apr. 5, 2017, now Pat. No. 9,796,094, and a
(Continued)

(51) Int. Cl.
*B60Q 1/34* (2006.01)
*H01R 25/00* (2006.01)
(Continued)

(52) U.S. Cl.
CPC ........ *H01R 25/003* (2013.01); *B25J 11/0005* (2013.01); *B64C 39/024* (2013.01); *F21S 4/10* (2016.01); *H01R 13/52* (2013.01); *H05B 33/0845* (2013.01); *H05B 37/029* (2013.01); *B64C 2201/12* (2013.01); *F21Y 2115/10* (2016.08)

(58) Field of Classification Search
CPC ............ H05B 37/0272; H05B 33/0857; H05B 33/0815; H05B 33/0818; H05B 33/0884; H05B 33/0809; H05B 33/0848; H05B 33/0887; H05B 37/0254; H05B 5/03; H05B 5/181

USPC ................ 361/314, 315, 728, 752, 796, 805
See application file for complete search history.

(56) References Cited

U.S. PATENT DOCUMENTS

| 5,913,583 A * | 6/1999 | Zachoszcz ............. G06F 1/181 312/263 |
| 7,581,849 B2 * | 9/2009 | Mock ........................ G09F 9/35 362/234 |

(Continued)

*Primary Examiner* — Douglas W Owens
*Assistant Examiner* — Syed M Kaiser
(74) *Attorney, Agent, or Firm* — Dale J. Ream

(57) ABSTRACT

An intelligent electronic decoration system includes smart modular power cable (MPC) having a flexible body extending between opposed proximal and distal ends and having a plurality of spaced apart electronic ports along and perpendicular to the body, the MPC configured for powering and communicating data relative to respective ports. The system includes embedded electronics operatively coupled to the proximal end of the MPC and having a rechargeable component for energizing electronics devices electrically coupled to respective ports, a microcontroller unit, and a memory collectively positioned within the housing, the embedded electronics being configured for data interfacing with wired or wireless communication components of external electronic devices. Electronic devices that may be coupled to the ports of the MPC and embedded electronics include smart LED electronics modules, LED replaceable covers, Display or Monitor Touch Screen plug-in for smart LED Electronics Module, Smart Multi-Port Auxiliary Base Unit, and automated robotic puppet module.

21 Claims, 34 Drawing Sheets

Related U.S. Application Data continuation-in-part of application No. 15/240,740, filed on Aug. 18, 2016, now Pat. No. 9,655,218.

(60) Provisional application No. 62/207,425, filed on Aug. 20, 2015, provisional application No. 62/207,530, filed on Aug. 20, 2015, provisional application No. 62/206,903, filed on Aug. 19, 2015, provisional application No. 62/206,891, filed on Aug. 19, 2015, provisional application No. 62/206,898, filed on Aug. 19, 2015.

(51) Int. Cl.
| | | |
|---|---|---|
| *H05B 37/02* | (2006.01) | |
| *H05B 33/08* | (2006.01) | |
| *F21S 4/10* | (2016.01) | |
| *H01R 13/52* | (2006.01) | |
| *B25J 11/00* | (2006.01) | |
| *B64C 39/02* | (2006.01) | |
| *F21Y 115/10* | (2016.01) | |

(56) References Cited

U.S. PATENT DOCUMENTS

| | | | | |
|---|---|---|---|---|
| 9,098,429 | B2* | 8/2015 | Varanda | G06F 13/409 |
| 2002/0036121 | A1* | 3/2002 | Ball | B66B 23/24 |
| | | | | 187/391 |
| 2002/0104246 | A1* | 8/2002 | Reynolds | G09F 3/18 |
| | | | | 40/642.02 |
| 2005/0276053 | A1* | 12/2005 | Nortrup | F21S 48/325 |
| | | | | 362/294 |
| 2006/0022214 | A1* | 2/2006 | Morgan | F21K 9/00 |
| | | | | 257/99 |
| 2006/0048800 | A1* | 3/2006 | Rast | A47L 1/02 |
| | | | | 134/56 R |
| 2006/0238532 | A1* | 10/2006 | LaFleur | G09G 3/2092 |
| | | | | 345/211 |
| 2006/0287783 | A1* | 12/2006 | Walker | G06Q 30/02 |
| | | | | 701/31.4 |
| 2007/0268678 | A1* | 11/2007 | Barringer | H01R 13/514 |
| | | | | 361/796 |
| 2008/0015058 | A1* | 1/2008 | Noble | A63B 24/0021 |
| | | | | 473/423 |
| 2008/0160224 | A1* | 7/2008 | Nakamura | A47G 33/08 |
| | | | | 428/7 |
| 2008/0197702 | A1* | 8/2008 | Banach | H02G 3/0437 |
| | | | | 307/11 |
| 2010/0100997 | A1* | 4/2010 | Lee | H01R 13/2407 |
| | | | | 2/69 |
| 2010/0128449 | A1* | 5/2010 | Mangaroo | G06F 1/1626 |
| | | | | 361/752 |
| 2011/0225859 | A1* | 9/2011 | Safavi | G02F 1/133308 |
| | | | | 40/448 |
| 2011/0229098 | A1* | 9/2011 | Abernathy | G02B 6/4402 |
| | | | | 385/102 |
| 2013/0027279 | A1* | 1/2013 | Peacock | G06F 3/1446 |
| | | | | 345/1.3 |
| 2013/0119893 | A1* | 5/2013 | Chen | A47G 33/06 |
| | | | | 315/294 |
| 2013/0135831 | A1* | 5/2013 | Hsu | B29C 45/14467 |
| | | | | 361/752 |
| 2013/0198935 | A1* | 8/2013 | Waters | A42C 5/00 |
| | | | | 2/209.13 |
| 2013/0207854 | A1* | 8/2013 | Ryu | H01Q 5/35 |
| | | | | 343/702 |
| 2014/0084165 | A1* | 3/2014 | Fadell | G08B 17/00 |
| | | | | 250/340 |
| 2014/0120983 | A1* | 5/2014 | Lam | H04W 84/18 |
| | | | | 455/557 |
| 2015/0250067 | A1* | 9/2015 | Gaddam | H05K 5/0213 |
| | | | | 40/541 |
| 2016/0054786 | A1* | 2/2016 | Chenault | G06F 1/3212 |
| | | | | 710/313 |
| 2016/0273716 | A1* | 9/2016 | Tarsa | F21K 9/61 |
| 2016/0323972 | A1* | 11/2016 | Bora | H05B 33/0842 |
| 2017/0127536 | A1* | 5/2017 | Oh | G02F 1/1333 |

* cited by examiner

INTELLIGENT DECORATION SYSTEM

CROSS REFERENCE TO RELATED APPLICATIONS

This non-provisional patent application claims the benefit of Applicant's U.S. non-provisional application Ser. No. 15/479,785, filed Apr. 5, 2017, titled Decoration System which claims the benefit of U.S. non-provisional application Ser. No. 15/240,740 filed Aug. 18, 2017 titled Modular Intelligent Electronic Decoration System, which is incorporated herein by reference, and which claims the priority of provisional applications:

Ser. No. 62/206,891 filed on Aug. 19, 2015, titled Smart Gadget of Things System (SMART GOTS)/Intelligent Gadget of Things System (IGOTS);

Ser. No. 62/206,903 filed on Aug. 19, 2015, titled USB or Similar Connector Multi-Port Hub Smart Cable;

Ser. No. 62/206,898 filed on Aug. 19, 2015 titled LED Smart Module;

Ser. No. 62/207,425 filed on Aug. 19, 2015 titled LED Character/Number/Data/Decorative Object; and Ser. No. 62/207,530 filed on Aug. 20, 2015, titled Smart Electronic Automated Robot/Puppet of Things.

Application Nos. 62/206,891, 62/206,903, 62/206,898, 62/207,425 and 62/207,530 are all hereby incorporated in their entireties by reference.

FIELD OF THE INVENTION

This invention relates generally to the field of electrical decorations and smart modules, and particularly to smart electronic modules and a cable system that connects multiple electronic decorations and other electronic devices to respective multiple ports of the cable system. Each device or decoration connected to the cable may be independently controlled and operated or programmed wirelessly by a smart phone, tablet computer or other computing device.

BACKGROUND OF THE INVENTION

Standard decorations may be bland and uninspiring. People may wish to incorporate many audio and visual dynamics to their decorations rather than just setting up static decorations or lights, decorating a Christmas tree, and the like. However, most decorations that are offered in the market are merely strings of lights or signs that are static and often remain a single color or single illumination pattern. As a result, such decorations may not provide much aesthetic appeal and may fail to draw attention to a home or business.

The only attempts that Applicant is aware of to solve this problem are to provide a connection hub, such as a USB hub or other connection switch. The inadequacy with these types of solutions include a separate discrete cable that is required to be connected to each device, the processing speed that may become an issue when large amounts of data (steaming video or large data files) are being loaded to a device or devices, and the increased amount of electrical power required for the total number of devices connected to the main USB hub or switch. Presently, in order to connect multiple audio and visual devices together, people will need to utilize a single connection hub such as a computer or other peripheral device. However, connecting multiple devices to one main electronic device or computer can impact processing performance and it also may not be able to deliver the needed electrical power load to all devices connected.

FIG. 2 illustrates problems with typical connector hub technology. As shown, there is a view of the typical connector hub 56 that shows multiple ports 57-65. Each port 57-65 must connect to a cable 66-74 in order to communicate with each of the devices shown 35-43. The typical USB connector hub 56 also delivers only 5 volts at 500 milliamps per port, and is thus not capable of delivering more power to operate actuators, lights and other processing systems from any single port. A USB hub also may slow processing speeds. This means that loading programs and large amounts of data may take minutes and not seconds. Often, the multiple cables that are required to connect each device to a hub become tangled or occupy unnecessary space along a desk top or area near the connected devices 35-43.

Therefore, there exists a need for an "intelligent" or "smart" electronic system that can introduce visually stunning pictures, artistic graphics, video, decorative lights, other electronic devices (that may include electrically mechanized devices), and audio that does not negatively affect performance of the main system to which they are connected. It would be desirable to have an electronic decoration system including a cable having a plurality of ports that allows a user to provide a more advanced, interesting, independent, and custom decoration, with each decoration being unique, and each decoration being capable of independent control from other decorations plugged into other ports of a cable. The decoration system interacts with the end-user by using feedback sensors, or peripheral inputs/outputs such as microphones, cameras, and audio. Further, it would be desirable to have an electronic decoration system that allows the user to replace some decoration(s)/device(s), or reprogram a particular decoration(s)/device(s), or load different data to particular decoration(s)/device(s) within the same electrically connected cable or decoration string if desired.

SUMMARY OF THE INVENTION

An intelligent electronic decoration system according to the present invention includes a smart multi-port communication and power cable (MPC) having a flexible body extending longitudinally between opposed proximal and distal ends and having a plurality of electronic ports spaced apart along the body. The MPC is configured for electrically powering and communicating data via conductors connected to respective ports. The decoration system includes electronics in a housing selectively coupled to the proximal end of the MPC and in electrical and data communication therewith. Electronics including a microcontroller are mounted in the housing, and components connected to the MPC, may be powered in some embodiments by a rechargeable battery or rechargeable component configured for energizing electronics devices electrically coupled to respective MPC ports. The electronics are configured for interfacing with wired or wireless communication components of external electronic devices. Devices that may be coupled to the ports of the MPC include Smart LED Electronics modules, Discrete LED and electrical illuminated replaceable covers, an input device such as an electronic monitor display device plug-in, including a touch screen or non-touch screen monitor plug-in. for MPC port and smart LED Electronics Module, a Smart Multi-Port Auxiliary Base Unit, an automated robotics and puppet module, and a Flasher/blinker/dimmer Electronics module.

In a closely related embodiment, a decoration system includes a plurality of decorative covers each having a cover-to-cover fastening structure and an electrical component fastening structure. Each cover-to-cover fastening structure includes a fastening assembly for releasably connecting one of the decorative covers to a contiguously adjacent decorative cover. In other words, the decorative covers may be arranged horizontally and vertically as desired. Each electrical component fastening structure defines at least one opening that selectively receives elements of an external electrical device into an interior compartment of a respective decorative cover. The electrical component fastening structure enables a respective decorative cover to be coupled to a traditional light string having lamps, a rigid or flexible material having embedded LEDs, electrical illuminated objects, or be coupled to an MPC and related electronics.

Therefore, a general object of this invention is to provide an electronic decoration system that allows a user to provide an advanced, interesting, independent, and custom decoration within each decoration attached to an MPC cable.

Another object of this invention is to provide an electronic decoration system, as aforesaid, that allows the user to replace selected decoration(s)/device(s), or reprogram a selected decoration(s) device(s), or load different data to selected decoration(s)/device(s) within the same electrically connected cable or decoration string if desired. Thus, the MPC may be altered by changing the decorations, adding or subtracting components and changing programming of the MPC.

A further object of this invention is to provide an electronic decoration system, as aforesaid, having a plurality of decorative covers that are releasably attached to conventional light strings having lamps, electrical illuminated objects, a rigid or flexible material having embedded LEDs or to an MPC.

A still further object of this invention is to provide an electronic decoration system, as aforesaid, in which the plurality of decorative covers may be coupled together horizontally and vertically to form decorative arrangements of electronic and illumination features.

Other objects and advantages of the present invention will become apparent from the following description taken in connection with the accompanying drawings, as set forth by way of illustration and example only.

BRIEF DESCRIPTION OF THE DRAWINGS

FIG. 11 is a flow chart of the Monitor/Touch Screen Electronics Module Plug-in

FIG. 27 is a block diagram of the Smart Sensor electronics module plug-in.

FIG. 33 is a block diagram of the Smart Projector electronics module plug-in.

FIG. 34 is a block diagram of the Smart Camera electronics module plug-in.

DETAILED DESCRIPTION OF THE DRAWINGS

Figure 1:
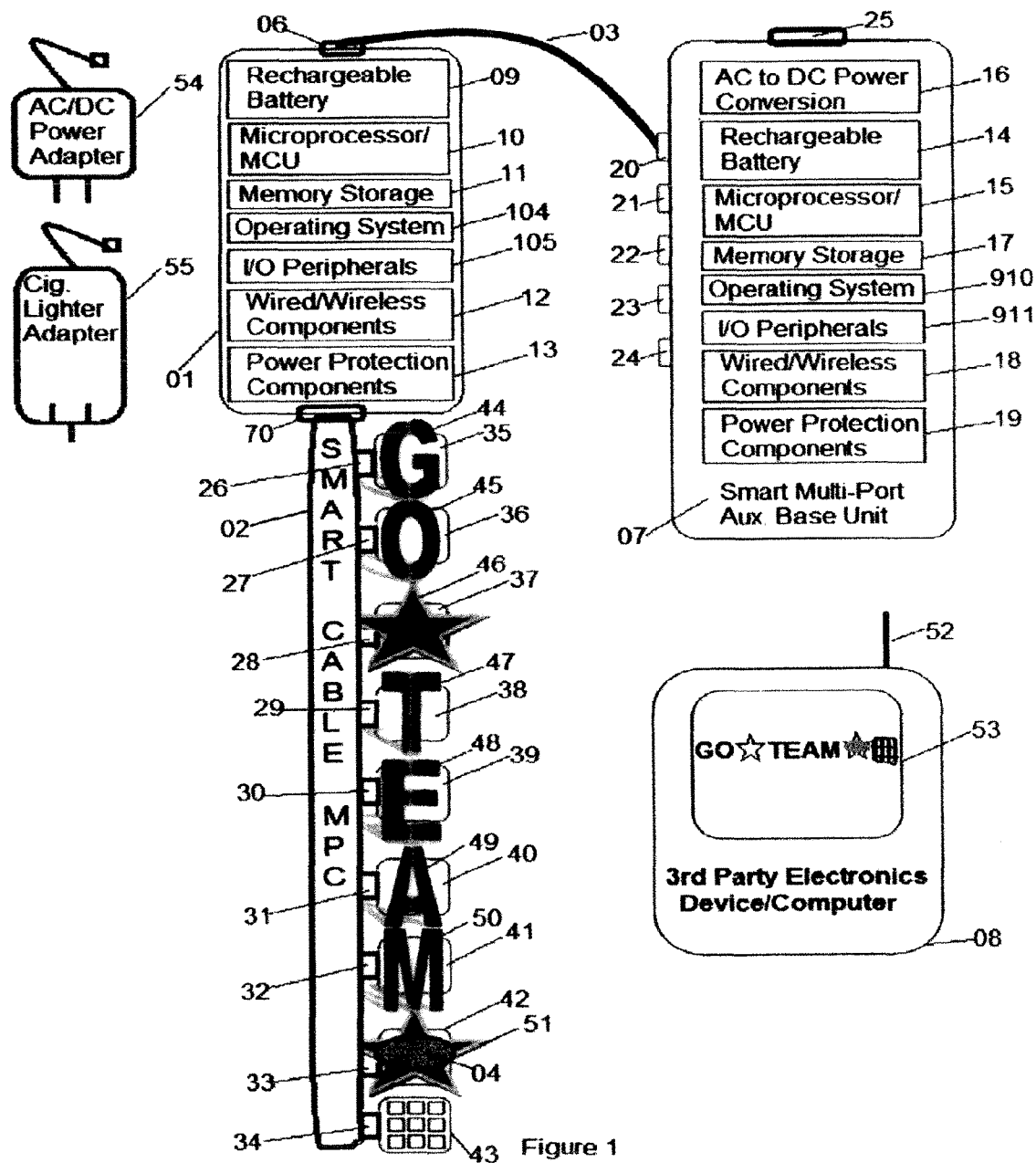
FIG. 1 is a partially diagrammatic, partially block diagram of an electronic decoration system of the invention
Figure 2:
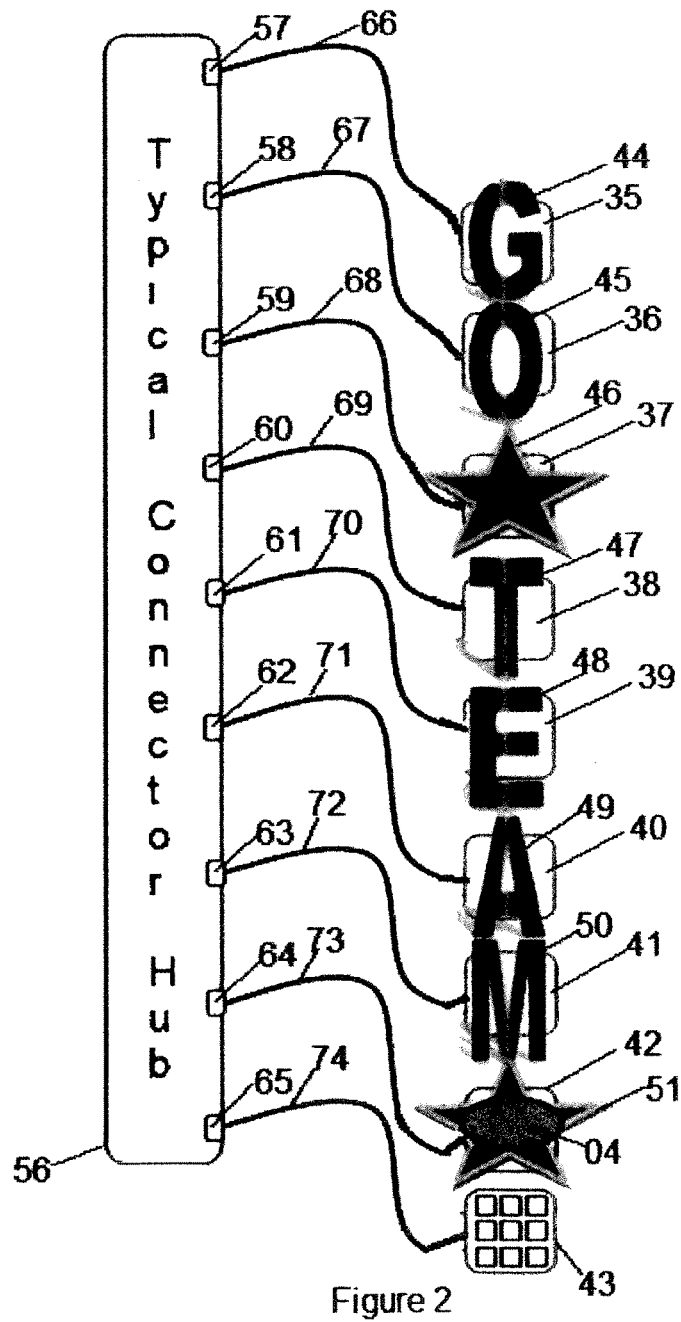
FIG. 2 is a typical view of a present day connection hub (USB or similar).

An intelligent electronic decoration system and related decoration system will now be described with reference to FIGS. 1 to 34 the accompanying drawings wherein the same identification numbers refer to the same designated parts throughout the various drawings.

The intelligent electronic decoration system of the invention provides an electronic system and method for connecting multiple electronic devices, including electromechanical devices, directly to a single cable having multiple ports, with electronic systems operatively connected to or integrated with the cable and used for powering each port, independently communicating data to each port, providing short circuit protection to each port, providing over current protection to each port, and communicating wirelessly with third party commercial off the shelf user electronics devices or smart devices such as smart phones, tablet computers and the like. In some embodiments, a small, special purpose computing device may be manufactured that integrates only the user interface and instruction set for the system in hardware, software or a combination of both.

The smart decorations or other electronic devices may be interchangably connected to ports of the cable, and may be bottomed by a smart electronics module that initially plugs into a cable port. A plurality of types of devices are in turn pluggable into the smart electronics module via a plurality of respective ports in the smart module, such as LCD displays that can have their appearance changed manually, or automatically such as a slideshow of still images or a video stream. Digital media ports for interfacing with other electronic devices such as cameras, microphones and speakers are also envisioned. A port, which may comprise multiple terminals, is provided for powering and controlling a display of LED lights. A mechanical connection on an exterior of the smart modules is provided for connecting an interchangeable replaceable decorative cover having display lights or the like integrated therein, and which plugs into the smart electronics module is contemplated. A port for an electronics monitor display/touch screen with its own electronics/wireless transceiver, and possibly a plurality of lights associated with or attached to the smart module is provided. As such, the smart LED electronics module may be a multi-function electronics interface that plugs into a port of the cable, and which provides interfaces for a number of different types of devices to the electronic/power package of the cable. One of the devices pluggable into a smart module may be a control device, such as a small electronics display/touch screen monitor, including a touch screen or non-touch screen monitor plug-in, on the order of perhaps 1 inch to 6 inches or greater, and associated electronics, and which may be programmed with a user interface for controlling the other devices connected to the cable and for uploading and downloading data and media to/from such other devices plugged into smart modules.

Referring now to FIG. 1, a multi-port cable 02 ("MPC") is constructed as an elongated electrical cord or cable having a plurality of connector ports, such as ports 26-34, spaced apart along a body of cable 02, wherein each of the ports 26-34 is configured to receive respective terminals of an electronic device. Spacing of the ports may be on the order of approximately an inch or so such as for decorative applications where letters spell out words, for other small decorative objects, or may be up to 6 inches or greater, as where electromechanical devices are attached to the ports of the cable. Devices attached to the ports may be attached generally perpendicular to the cable.

In at least one embodiment, the multi-port cable 02 would typically include at least four conductors, one conductor to carry voltage and current to the multiple ports 26-34, and a second conductor for providing a ground reference to ports 26-34. Conductors three and four would be used for serial communication, such as an RS-485 protocol or the like. Other conductors within cable 02 and electronic components within Smart LED Electronics Modules 35-43 may be included, and configured for parallel communication with the ports, or other forms of electronic communication using corresponding serial or parallel protocols. It is envisioned that in some embodiments a custom ribbon cable, or similar flexible cable, having power conductors capable of supporting at least 5 volts and at least 10 amps of current may be used to provide 50 watts or more of power to the various modules connected to the cable. Other types of cable material that contain conductors capable of conducting at least 50 watts of power could be used, such as polyimide type insulation with copper or conductive traces. Significantly, the cable would be ruggedized for use, as by enclosing conductors therein with a flexible protective wrap or stranded material, which may include a tough, synthetic material such as Aramid™ fibers, polyester-type materials, polyurethane-type materials or similar materials. In other embodiments, the conductors may be sealed in a tough, flexible tubular housing, such as a vinyl-type material. The individual ports would typically be sealed in a housing that is sealed or otherwise attached to the tough exterior of the cable. The cable material and its construction in this invention easily adapts to each decorative application due to the flexible material used, and which allows for its conductors to have multiple connector ports 26-34 (not limited to this quantity) mounted generally perpendicular to the cable body. As such, connector ports 26-34 are not just connected to the end or ends of the cable. This type of cable 02 construction allows for a plurality of electronics, electronic devices, and decorative electronic objects to connect directly to a single cable 02, which reduces the quantity of conventional cables needed in most applications by ten or more, while at the same time delivering much higher power than a USB port to its connected electronic devices. This type of cable 02 construction also eliminates a need for connector hubs 56, such as USB type connector hubs or TCP/IP switch hubs. Ultimately, this cable design leads to a significant reduction in cost and space due to elimination of cables and connector hubs of the prior art while allowing for re-usability of the core components of the system so that decoration changes may be made by the user through data changes or changes of the electronic devices connected to cable 02.

The connector ports 26-34 fixedly attached to cable 02 could be an easily installed joint test action group (JTAG) type connector that could clinch its metallic contacts into respective conductors in order for electrical contact to be made between the connector pins of the port and the conductors within a ribbon cable. Such a connector could also be a custom type JTAG connector that could have contact pins capable of carrying higher electrical power to each connected device or connector port. As such, while a power of 50 watts for all ports of a cable 02 is anticipated, power and ground conductors of cable 02 could be sized to support higher anticipated loading applied to the power and ground conductors by all the ports operating their respective devices simultaneously.

Attached to cable 02 is a housing 01 that encloses power and communications electronics attached to power and communication conductors of cable 02. Housing 01 and associated electronics may be made integral with cable 02, or may be made detachable, as by a connector 70, at the proximal or top-end of cable 02. Electronics in housing 01 include a microprocessor 10 in communication with a digital memory storage unit 11, which may include non-volatile storage for storing control programs or routines. In addition, memory unit 11 may include a card slot for accepting memory cards, such as SD cards, micro SD cards, USB thumb drives or any of a number of portable memory devices. This would allow the user to receive and store digital media files in multiple ways. The user may also access digital media files from a digital storage unit via the cable connectors that are connected to one of the plurality of its associated connector ports 26-34. A wired or wireless communications module 12, which may include any or all of a Wi-Fi transceiver, a Bluetooth transceiver or conductors and associated port or ports for connecting to an external device via wires and input/output peripheral ports, is provided for communicating, either wirelessly or via cables, with a plurality of electronic devices such as a Smart Multi-Port Auxiliary Base unit 07, as will be further described, and with computers, electronic phones, tablet computers or other similar third party electronic devices 08.

In one embodiment, the power source may be a 115 VAC to DC power adapter 54 plugged into a 115 VAC wall outlet, or possibly a vehicle adapter plug 55 for using DC vehicle power. In either case, power is provided that charges a portable or built-in battery or other rechargeable component 09 within or operatively connected to the electronics within housing 01. Such a rechargeable device 09 makes the cable 02 and modules plugged into ports 26-34 portable, and capable of being placed at locations where it is inconvenient to place a power cord. This embodiment would likely be configured for using less power, such as devices that primarily would use LED lighting, sound effects and the like, although small mechanical actuators in animated displays might also be included. A larger battery could be used where cameras are used in security applications or where it is desired to take pictures or video streams, or where larger displays are desired. In other embodiments, power may be conventionally provided to housing 01 by a connection to AC power and appropriate voltage conversion.

Figure 4:
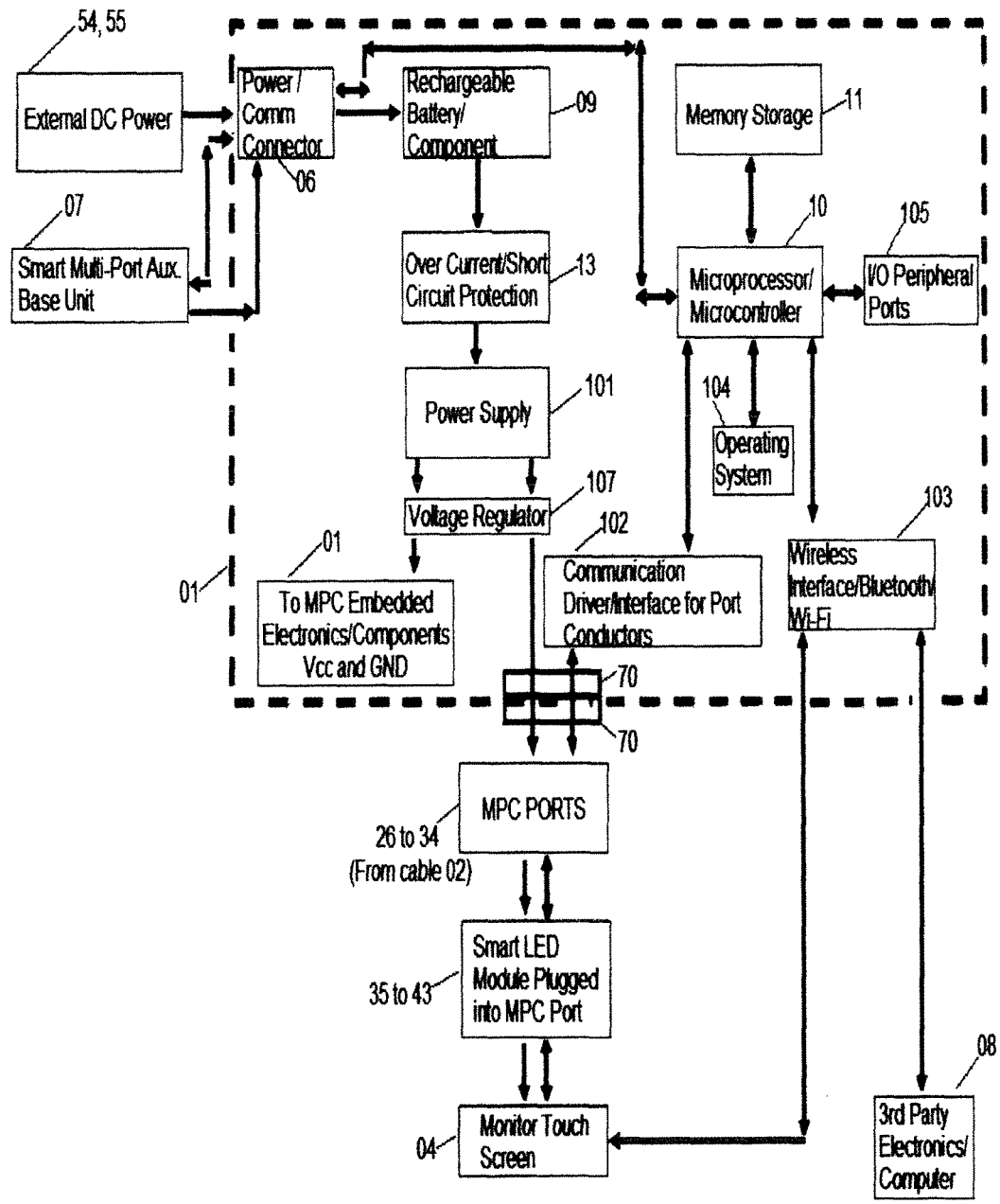
FIG. 4 is a block diagram of the MPC embedded electronics.

Reference is now made to FIG. 4 that shows one embodiment of electronic components in housing 01 (FIG. 1). When external DC power 54, 55 is connected to the power and communication connector 06, power is applied to rechargeable battery or other rechargeable component 09. The Smart Multi-Port Auxiliary Base unit 07 (FIG. 1) could also connect to the power and communication connector 06 with the power and communication cable 03 (FIG. 1). The electronics in housing 01 will run without external DC power until rechargeable battery or other rechargeable component 09 is completely de-energized. Over current/short circuit protection 13 is designed to protect the electronics, cable 02 (FIG. 1), and LED Smart Modules 35-43 from becoming electrically damaged. In other embodiments, power may be supplied to the electronics in housing 01 via a DC power supply connected to a conventional AC power source.

A power supply 101 and constant power source components 107, such as a voltage regulator, serve to regulate power through the printed circuit board (PCB) conductive traces to the voltage (Vcc) and ground (GND) connection points to each of the components within the MPC embedded electronics 01, to the power and communication connector 70, and to all of the MPC ports 26-34 that connect to LED Smart Modules 35-43. The microprocessor/MCU 10 might use an operating system based on assembly language, machine code or a "C" based software to communicate with input/output peripheral ports 105, digital or memory storage 11 and to the communication driver/interface to the port conductors 102. One particular family of microprocessors for use may be TINYAT™ processors available from ATMEL™, and which may integrate volatile and non-volatile memory and have I/O ports configurable on-the-fly to serve as both inputs and outputs. As should be apparent, where a particular family of microprocessors are used, the microprocessors of all devices of the system would be from the same family, be at least compatible with all devices of the system or have some form of cross-platform adapter. A communication driver for the port conductors 102 communicates with cable ports 26-34 through power and communication circuitry 70. The microprocessor/MCU 10 might also use wireless communication network protocol components 103 such as Wi-Fi (802.11), Bluetooth, or other wireless transmission protocols. If a Smart Module 35-43 is plugged into a cable port 26-34, it receives power and communication from the electronics in housing 01. If an electronics monitor display, which might be a touch screen or non-touch screen monitor plug-in, 04 is plugged into a Smart LED Electronic Module 35-43 then it might communicate through the conductors of cable 02 or it might communicate wirelessly to the wireless interface components 103. If a wireless electronic device/computer 08 is provided with Smart decoration system user interface software and communicates through its wireless technology 52 (FIG. 1), then it will communicate with cable wireless interface components 103. All Smart Modules 35-43 and monitor touch screens 04 plugged into any of Ports 26-34 may ultimately communicate with each other, with the electronics in housing 01, and could also communicate with the Smart Multi-Port Auxiliary Base Unit 07 if connected, and also with a third party electronics device 08 that is user controlled through the proper interface software.

Smart electronics modules 35-43 are pluggable into any of ports 26-34 of cable 02, and as described above, provide interfaces for different types of electronic devices, such as power terminals for providing power and control for LED lights, input/output terminals for audio and input/output terminals for static images and streaming video. Other modules would additionally include terminals for a communication and display device, such as the small display or touch screen monitor as noted above. Another module would additionally incorporate terminals for selectively powering actuators for animated parts of a display or decoration, such as a robotic puppet. In one embodiment of modules 35-43, a module may be provided with LED lights, such as module 43, and which may be programmed by a user as a display or part of a display. Other terminals may be provided for additional functionality as described. As such, one module 35-43 may only power and control LED lights, while another module 35-43 may power both lights, control a video stream and provide audio. Thus, discrete modules could be fabricated to perform any or all of the described functions, allowing a user to purchase only those modules needed to perform specific functions, or to purchase modules to perform all functions to provide more configuration flexibility to a display or other system.

Figure 5:
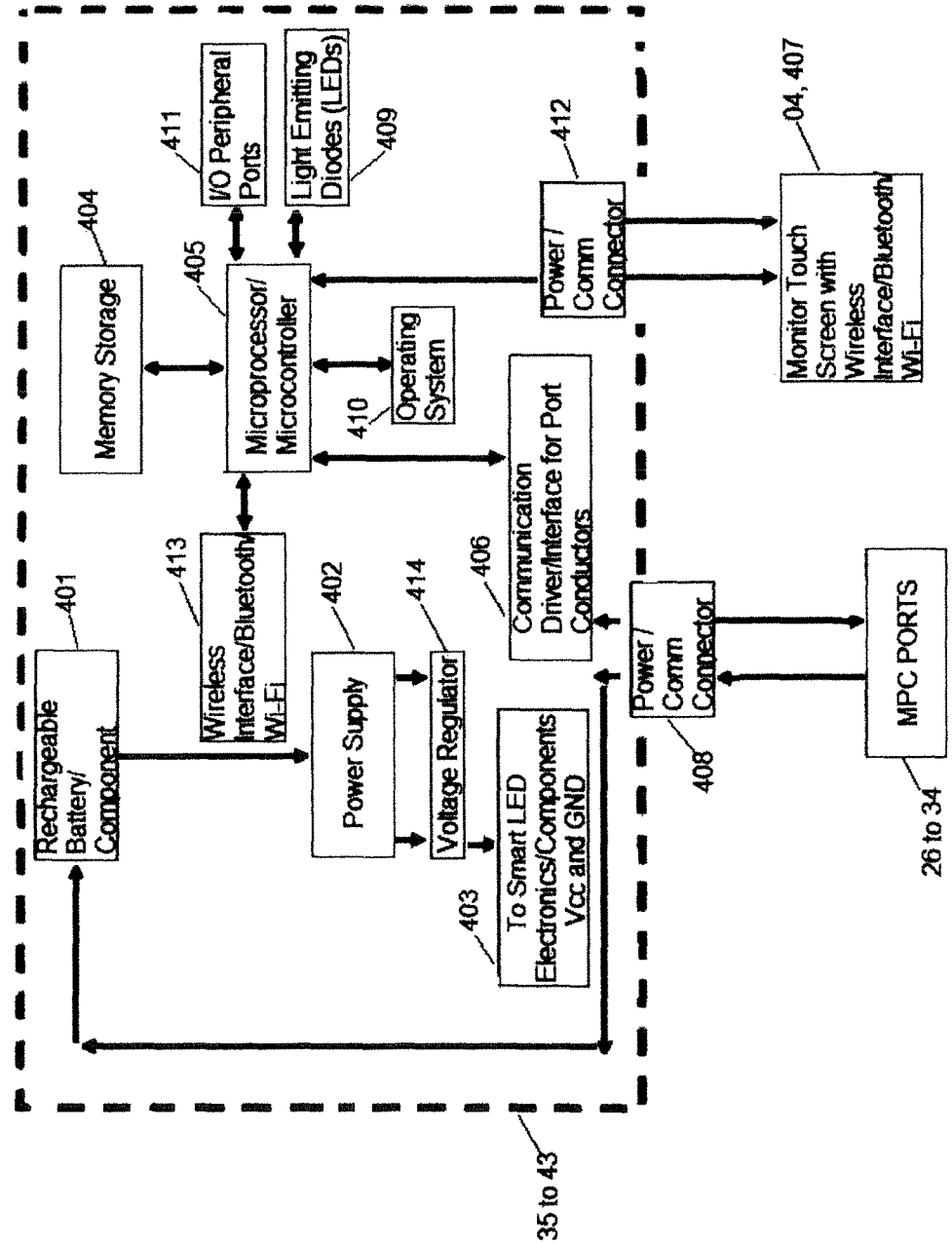
FIG. 5 is a block diagram of the Smart LED Electronics Module

Referring now to FIG. 5, one embodiment of electronics of a smart module 35-43 is shown that embodies the anticipated functions of the invention, although other functions may be added. For each smart module plugged into a respective port of the cable, DC power from the ports of cable 02 (FIG. 1) is connected to a power/communication connector 408 of the port and thereafter applied to a rechargeable battery or other rechargeable component 401. As such, the smart modules, once programmed, may run autonomously under their own power independently from power supplied by cable 02 or under control of a program operated by microprocessor 10 (FIG. 1).

A power supply 402 and voltage regulator 414 provide a constant power source through the printed circuit board (PCB) conductive traces to the voltage (Vcc) and ground (GND) connection points to each of the components within the Smart LED Electronics Modules 35-43, and to all of the Smart LED Electronics components 403. A microprocessor/MCU 405 with associated memory 404 might use assembly language based software like machine code, "C" based software and commands or proprietary language where TINYAT™ type processors are used to communicate to the operating or control system 410, input/output peripheral ports 411, digital or memory storage 404, through the power and communication connector 412 connected to a Monitor/Touch Screen plug-in 04 and its wireless interface components 407, and to a communication driver/interface to the port conductors 406. The communication driver for the port conductors 406 communicates to its power/communication connector 408 connected to cable 02 ports 26-34. If a Smart Module 35-43 is plugged into a cable 02 port 26-34 then it receives power and communication. If a monitor/touch screen plug-in 04 is plugged into a Smart Module 35-43 with its power and communication connector 412 then it might communicate through the conductors of the Smart Module 35-43, or it might communicate wirelessly 407 to the wireless interface components 413, or it could communicate with electronics in cable housing 02. There are also mechanical connections on the exterior of modules 35-43 for detachable/replaceable decorative covers and connections for tie-wraps or a strap-like material (can be rotated multiple angles) for hanging the LED smart electronics module to another object, such as a Christmas tree, an animal or human, or anything else to be decorated. In addition, there are clips or other fasteners on modules 35-43 for an exterior cover or the like 44-51 (FIG. 1) to be removably attached to an exterior of modules 35-43. Such a detachable decoration cover may provide a housing for one or more LED lights that can be fabricated in the shape of a character, letter, or string of characters, or almost any desired decorative shape. As shown in FIG. 1, a plurality of such programmable decorations 44-51 can be used together on a cable 02, but controlled independently by programming provided by a cell phone, tablet or other computer 08 (FIG. 1) and stored in memory 11 (FIG. 1) in housing 01 (FIG. 1). In some embodiments, microprocessor 10 (FIG. 1) may be programmed to break up code for a display formed by all of modules 35-43 into discrete sections of code, and provide a clock or synchronization signal to all of modules so that portions of code for respective portions of the display are stored in respective ones of modules 35-43 and operated in synchrony. In such embodiments, commands are encoded by microprocessor 10 in housing 01 and communicated via communications conductors in cable 02 to respective microprocessors in smart modules 35-43, where the commands are decoded and used to control respective parts of a display. In other embodiments, the modules themselves may be programmed to operate synchronously, as by providing synchronization signals to each other as operation of a display progresses.

The LED lights may be configured to illuminate in various colors, and can be illuminated in conjunction with recorded and preloaded music, real time music or sound as sensed by one or more microphones integrated into the LED modules, or in integrated electronics module 01, or with other preprogrammed patterns. In this way, the present invention provides an improved decoration for homes or businesses, or almost any electronics safe environment. Outdoor displays would be weatherized by sealing components in waterproof housings and insulation.

Figure 8:
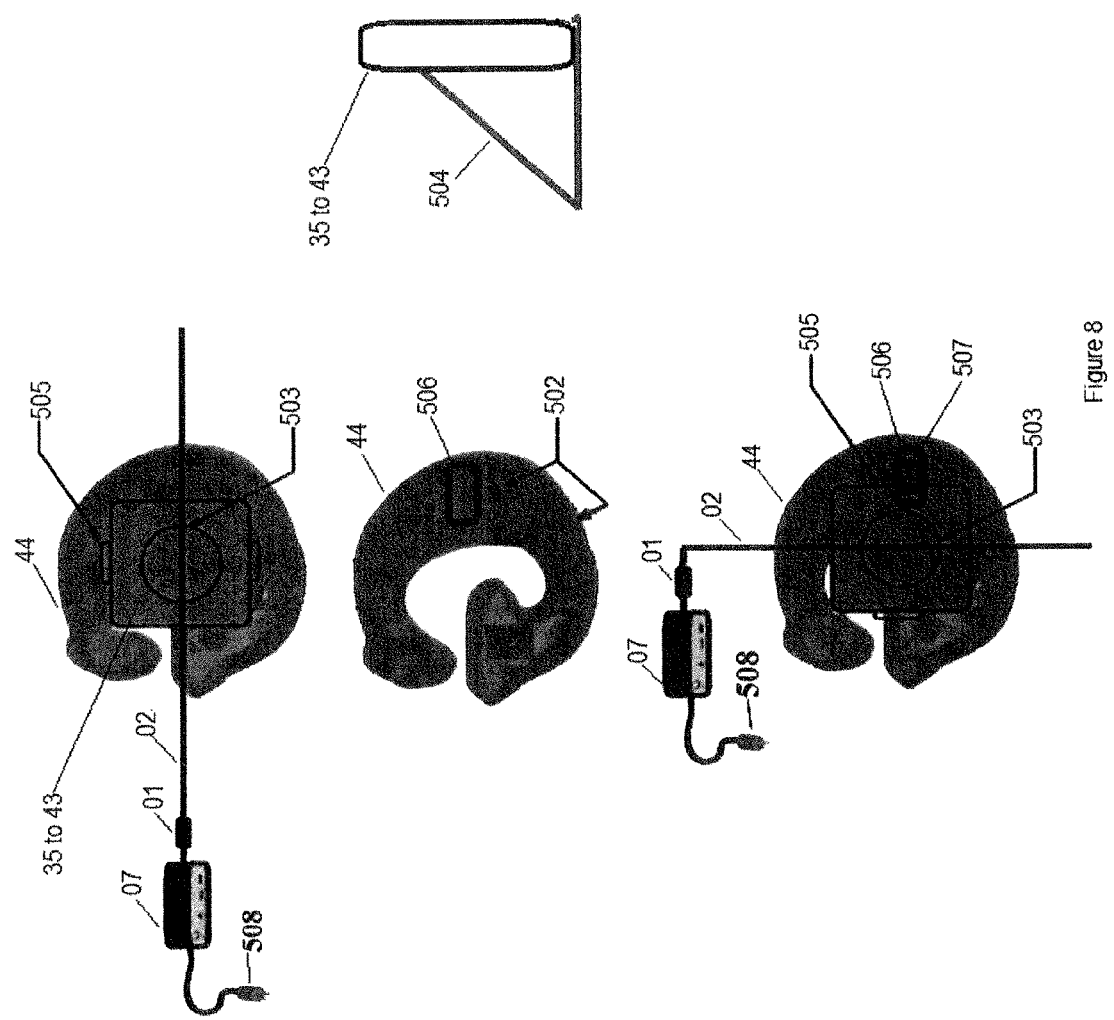
FIG. 8 is a view of the modular or replaceable discrete LED decorative cover.

Reference is now made to FIG. 8. By way of example, in the top most diagram representation there is a 115 VAC power plug 508 connected to a Smart Multi-Port Auxiliary Base unit 07 that in turn is electrically connected to a housing 01 (FIG. 1) containing associated electronics, and a cable 02 having respective ports 26-34. Smart modules 35-43 plugged into ports 26-34 are provided with Discrete LED Replaceable Covers 44 that removably attach to respective smart modules and are attachable/detachable by means of a mechanical connector, such as a clip, tabs, fasteners or the like 506 that engage a mating connector 507 on the Smart modules 35-43. In other embodiments, and as noted, the housings 01 may be connected directly to AC power without the base units 07.

Within each LED Replaceable Cover 44 there may be miniature/individual compartments or other structures 502 containing or otherwise integrating light emitting diodes (LEDs), for providing illumination control. These compartments 44 might not be included in all replaceable covers 44 if improved illumination control is not desired, but the Discrete LED Replaceable Cover would still be a generally hollow housing for LEDs enclosed therein or mounted thereto. A printed circuit board may be specifically configured in the shape of each Discrete LED Replaceable cover 44 and which has LEDs and other components that could connect to a connector within the Discrete LED Replaceable cover 44, and which connects to a port of a respective smart module 35-43. As noted, connectors for LED lights attached to a smart module may be modular connectors with multiple terminals so as to independently control individual lights of a replaceable cover 44. In other embodiments, the specifically-configured printed circuit board may be omitted, with the LEDs mounted directly to or in the replaceable cover. Reflectors, retro-reflectors, prisms and lenses and other optical shapes might be molded into covers 44 to increase the illumination effects. In addition, using special paints such as fluorescent paint, reflective coatings and glitter may be added to replaceable decorative covers 44.

As noted above, in or on the back of the Smart LED Electronics module 35-43 there may be a slit, tab hook or the like 505 to be used for a tie wrap or strap-like material that can be used to hang the Smart LED Electronics module 35-43 at different angles from various objects or things. A rotatable mechanized accessory 503 might also be added to a Smart LED Electronics module 35-43 in order for the accessory to be rotated. A tabletop or desktop accessory 504 is another feature that enables the LED Smart Electronics module 35-43 to be placed or mounted on or to a flat surface.

Figure 10:
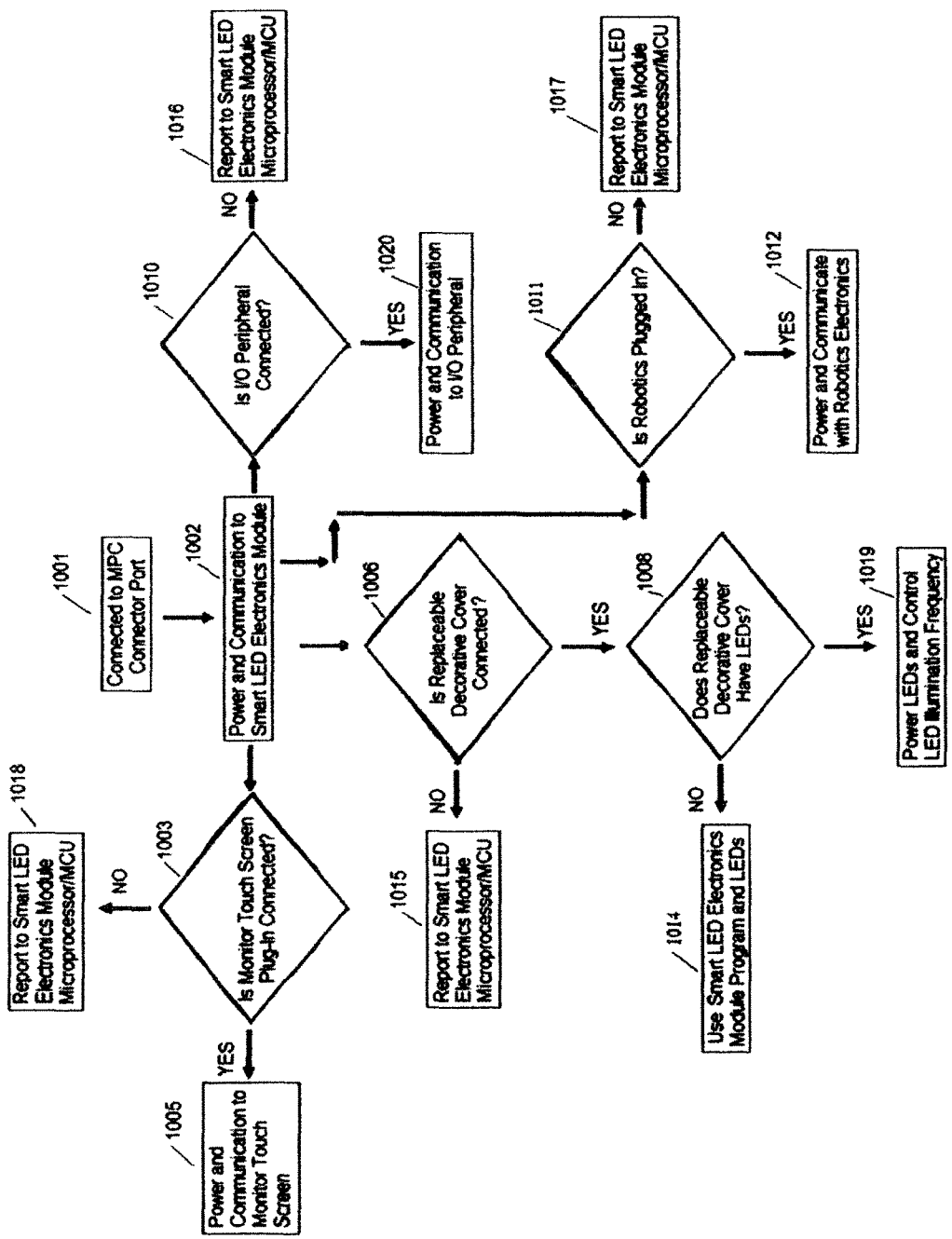
FIG. 10 is a flow chart of the Smart LED Electronics Module

Referring now to FIGS. 1 and 10, exemplary programming a smart module is illustrated. If an electronics module 35-43 (FIG. 1) is connected to a cable connector 26-34 at box 1001 (FIG. 10), then electronics module 35-43 receives DC power and begins to communicate with microprocessor 10 in housing 01 via communication system 12 at box 1002. If an electronics monitor display device or touch screen module 04 is detected at decision box 1003, then power and communications are enabled for the Monitor Touch Screen device at box 1005. If there is no Monitor Display/Touch Screen connected to Electronics Module 35-43 at box 1003, then no connection is reported to microprocessor 10 at box 1018, and the logic flow returns to box 1002 where box 1006 is queried. If a Replaceable Decoration Cover 44-51 is detected with its own LEDs at box 1008, then decoration cover is electrically powered, and the LED illumination frequency or pattern is controlled based on user inputs or a program is initiated at box 1019. If no LEDs in the cover are detected at box 1008, then the Electronics Module may use its own attached LEDs and controls the LED illumination frequency at box 1014 based on user inputs or a program the user interface software is communicating with the Electronics Module, microprocessor 12, or Multi-Port Auxiliary Base Unit electronics. If no replaceable decoration cover is detected at box 1015, then no connection is reported to the Electronics Module 35-43 and logic flow returns to box 1002. At box 1002 box 1010 is queried as to whether the Electronics Module 35-43 detects an input/output peripheral device, such as a digital camera, then microprocessor 12 is prompted to electrically power the I/O device and communicates with it at box 1020. If no I/O peripheral device is detected at box 1010, then no connection is reported at box 1016 and logic flow returns to box 1002, where box 1011 is queried. At decision box 1011 if a robotics module is detected, then the robotics module is electrically powered and communications are initiated at box 1012. If no robotics module is detected at box 1011 then no connection is reported at box 1017.

Figure 7:
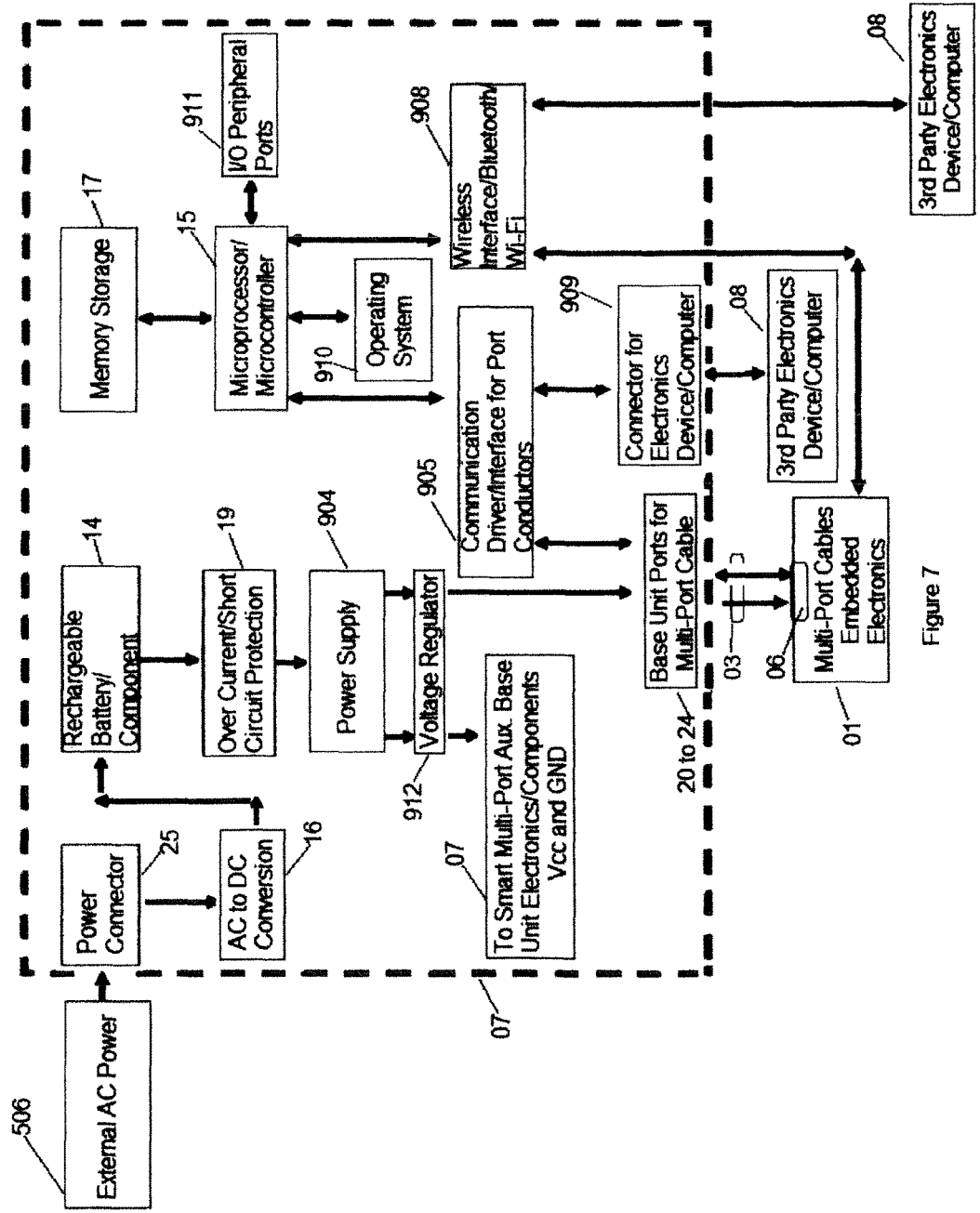

Reference is now made to FIG. 7 that shows one embodiment of a Smart Multi-Port Auxiliary Base unit 07. When external AC power is connected to power connector 25, the AC power is converted to DC power by power converter 16, and then applied to the rechargeable battery or other rechargeable component 14. The Smart Multi-Port Auxiliary Base unit 07 will run without external plugged-in AC power until the rechargeable battery/rechargeable component 14 is completely de-energized or until battery voltage falls below an operating voltage of the microprocessor 15, at which point the microprocessor will turn itself off. Over current/short circuit protection 19 is designed to protect the Smart Multi-Port Auxiliary Base unit 07, its components, multi-port cables 02 (FIG. 1) and where used, cable electronics in housing 01 plugged into its ports 20-24 from getting electrically damaged. Power supply 904 regulates power and constant power source components 912, such as a voltage regulator, could regulate power through the printed circuit board (PCB) conductive traces to the voltage (Vcc) and ground (GND) connection points to each of the components within the Smart Multi-Port Auxiliary Base unit 07 and to all of the Smart Multi-Port Auxiliary Base unit components 07.

Microprocessor/MCU 15 might use assembly language based software like machine code or "C" based software, or a proprietary language, to communicate to the operating system 910. The microprocessor/MCU 15 communicates with input/output peripheral ports 911, with digital or memory storage 17, with communication driver 905 for wired or conductor communication that in turn communicates with Base unit Ports (20-24). Ports 20-24 enable a plurality of housings 01 and associated cables 02 (FIG. 1) to plug in via cable/cables 03. A communication driver 905 for wired communication communicates directly to a user electronics device or computer 08 via a communication connector 909 for user device 08. A wireless interface/Bluetooth/Wi-Fi components 908 communicates with wireless interface 103 (FIG. 4), 413 (FIG. 5) and also with a user electronics device 08. If a housing 01 (FIG. 1) is plugged into a Base unit port 20-24 then the electronics therein and respective cable 02 (FIG. 1) receives power and communication.

Figure 12:
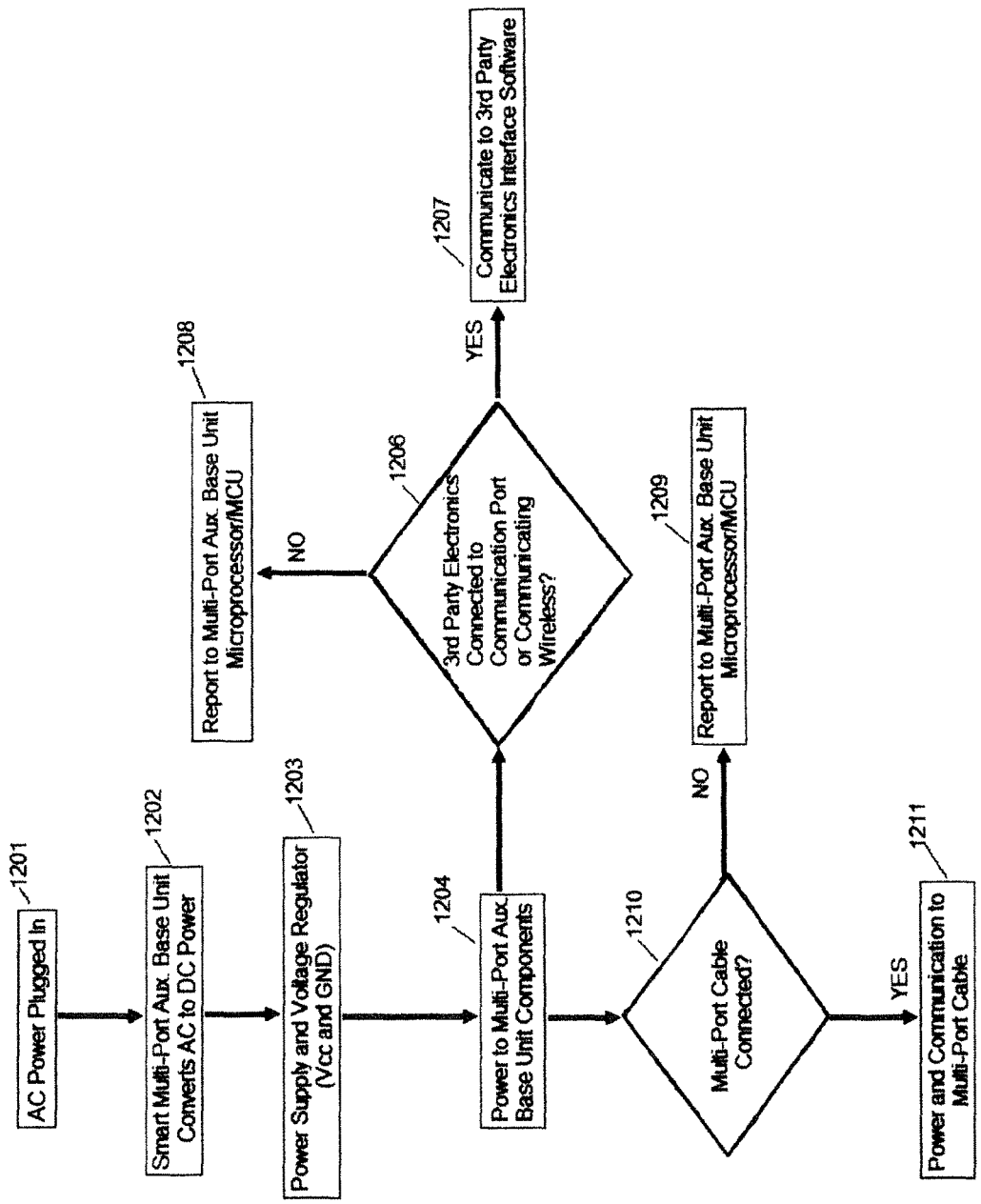
FIG. 12 is a flow chart of the Smart Multi-Port Auxiliary Base Unit.

Reference is now made to FIG. 7 and FIG. 12, which shows logic flow of a base unit 07 (FIG. 7). At box 1202 (FIG. 12), if an AC power source is connected to the Smart Multi-Port Auxiliary Base Unit at box 1201 then the Smart Multi-Port Auxiliary Base Unit converts the AC power to DC power. At box 1203 the components of the Smart Multi-Port Auxiliary Base Unit receive the DC power, are initialized and prepared for operation. At box 1204 the power supply and constant power source components like the voltage regulator regulate power to its ports 20-24 (FIG. 1) for housings 01 or cables 02 plugged into ports 20-24. At decision box 1206 if the Smart Multi-Port Auxiliary Base Unit detects whether a third party electronics device (FIG. 1, 08) is physically connected or is communicating with the Smart Multi-Port Auxiliary Base Unit communication components, then it communicates with the third party electronics device interface software at box 1207. If there is no third party electronics device communicating with the Smart Multi-Port Auxiliary Base Unit then no connection is reported to the Smart Multi-Port Auxiliary Base Unit microprocessor/MCU at box 1208, and the logic flows to box 1210. At decision box 1210 if the Smart Base Unit 07 detects a housing 01 (FIG. 1) with power and communication cable 03 (FIG. 1) plugged into one of its ports 20-24 then it delivers power and communicates with the electronics of housing/housings 01 to operate a display program at box 1211. Where simply a housing 01 connected to MPC 02 (FIG. 1) and to cable 03 is plugged into a port 20-24, then at box 1211 communication is initiated with microprocessors in smart modules plugged into the discrete ports of respective cables 02 to operate a display program. If no MPC 02, or housing 01 (FIG. 1), or cable 03 (FIG. 1) are connected then no connection is reported it to the Smart Multi-Port Auxiliary Base Unit microprocessor/MCU at box 1209.

Figure 6:
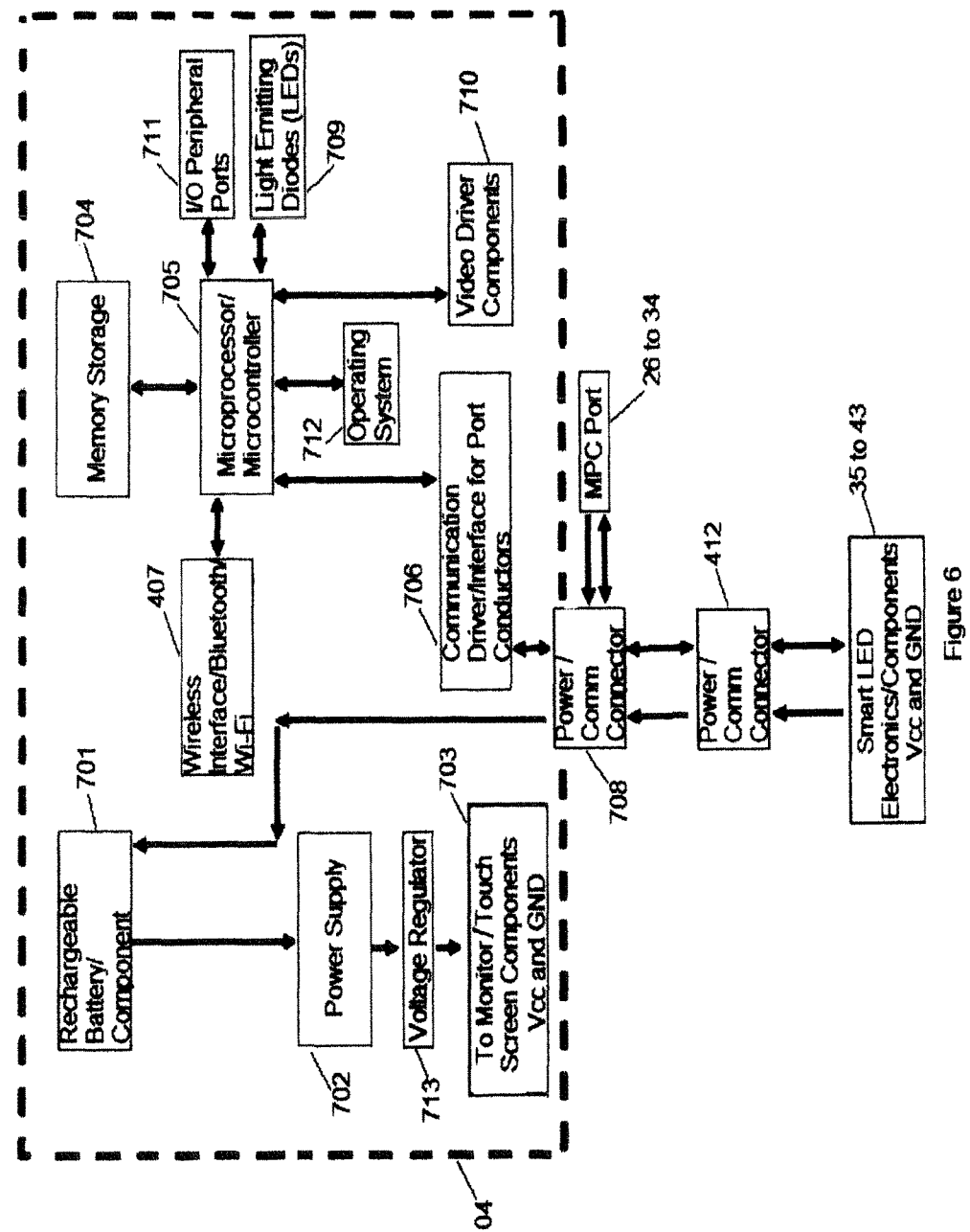
FIG. 6 is a block diagram of the Monitor Touch Screen Electronics Module Plug-in FIG. 7 is a block diagram of the Smart Multi-Port Auxiliary Base Unit.

Reference is now made to FIG. 6 that shows, by way of example, one embodiment of the Monitor Display or Touch Screen Module plug-in 04. External DC power from the Smart LED Electronics Module is connected to power/communication connector 708. In other embodiments the Monitor Display or Touch Screen Module plug-in 04 may be plugged in directly via connector 708 to a cable port 26-34 without the LED Smart Electronics Module 35-43. In this embodiment, external DC power is fed directly from housing 01 (FIG. 4) and DC power is applied to the rechargeable battery or other rechargeable component 701. The Monitor display or Touch Screen Module plug-in 04 will run without external DC power until the rechargeable battery or other rechargeable component 701 is completely de-energized or as noted, the battery voltage falls below an operational voltage of the monitor display or touch screen module, at which point it turns itself off. The power supply 702 regulates power and constant power source components 713 such as a voltage regulator to regulate power through the printed circuit board (PCB) conductive traces to the voltage (Vcc) and ground (GND) connection points to each of the components within the Monitor Display or Touch Screen Module plug-in 04 and to all of the Monitor Display or Touch Screen Module plug-in components 703. The microprocessor/MCU 705 might use assembly language based software like machine code, "C" based software language or a proprietary language as noted above to communicate to the operating system 712. The microprocessor/MCU 705 controls the on/off frequency of light emitting diodes (LEDs) 709 attached to its printed circuit board (PCB), communicates with the operating system 712, to the input/output peripheral ports 711, to the digital or memory storage 704, to the communication driver/interface to the conductors 706, to the video driver components 710, and to the wireless interface components 407 within the monitor display or touch screen module plug-in 04. The communication driver for the conductors 706 communicates through its power/communication connector 708 to the Smart Module connector 412.

If a Monitor Display or Touch Screen Module 04 is plugged into a Smart Module connector 35-43, then it receives power and communication via connector 708, and communicates wirelessly using wireless system 407 to the cable electronics wireless interface components 103 (FIG. 4) in housing 01 (FIG. 1) or with the Smart Electronics Module wireless interface components 413 (FIG. 5).

Figure 11:
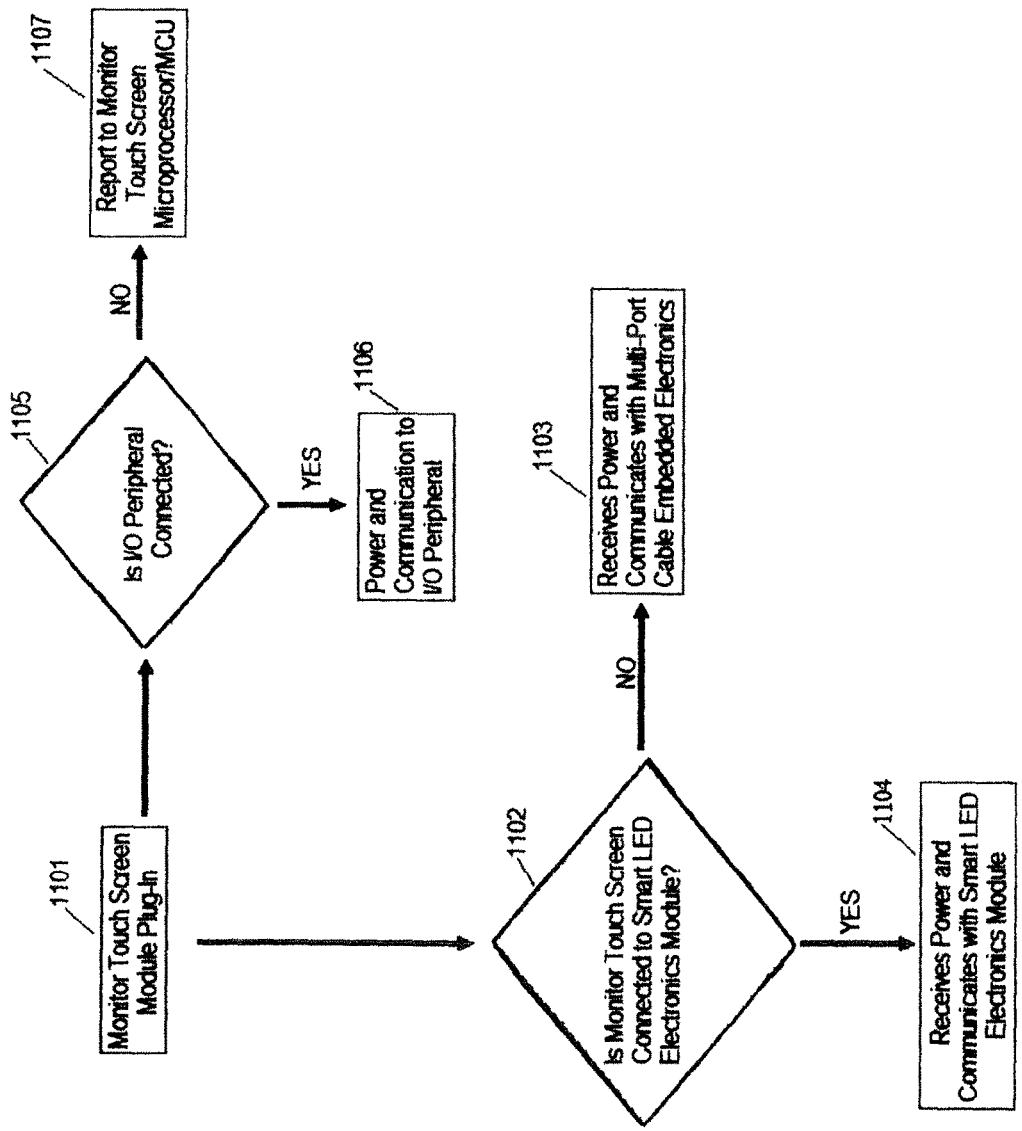

Reference is now made to FIGS. 1 and 11 for programming for a Monitor Display or Touch-Screen Plug-In Module. At box 1102, if the Monitor Display or Touch-Screen Module 04 is connected directly to a cable 02 connector 26-34 without being connected to an Electronics Module, then the Monitor Display Touch-Screen Module receives DC power and communicates with microprocessor 10 (FIG. 1) at box 1103. If the Monitor Display or Touch Screen module plug-in 04 is connected to a Smart LED Electronics Module 35-43, then it receives DC power and has two way communications with the Smart LED Electronics Module microprocessor/MCU at box 1104. If there is no Monitor Display or Touch Screen connected to the Smart LED Electronics Module then no connection is reported to microprocessor 12 in housing 01 at box 1103, and logic proceeds to box 1105. At box 1105 if the Monitor Display or Touch-Screen Plug-In Module detects another input/output peripheral device, such as a digital camera, then at box 1106 the I/O device is powered and communications are initiated. If at box 1105 no I/O peripheral device is detected, then it reports no connection at box 1107 to the Monitor Display or Touch-Screen Plug-In Module microprocessor/MCU.

In some embodiments a user may alter a display in real time by providing inputs to a monitor. As shown in FIG. 1, an image of a display may be provided on a display screen, which may be a touch screen or monitor display plugged into cable 02, or in other embodiments a third party device having a display screen, such as a cell phone, tablet computer, desktop or laptop computer or a special purpose communications device, that creates instructions that are communicated in real time to the display. For example, a plurality of LED lamps or electrical illuminated objects may be incorporated into each of a plurality of covers 44-51 that, by way of example only, spell out GO TEAM as shown in FIG. 1. In one embodiment, these LED lamps may be of the type wherein each LED lamp integrates a red LED, a green LED and a blue LED (color changing LEDs), so that the LEDs can be changed by the user to display any color. Where a monitor display or touch screen is used, such as an app in a smart phone for controlling the display, the user might touch a particular letter of the display to highlight the letter, and then select a color on a color palette in order to generate instructions that are in turn communicated to the selected letter cover or to a smart module the letter cover is plugged into. in order to change the letter's color. In other embodiments, LEDs with only static colors may be used, with a user selecting from the static colors. Where a monitor display or touch screen is not used, such as where a desktop is connected to the display, a cursor could be used to select a color from a color palette and implemented by a mouse click. Of course, any program may be devised, as by an app on a smart phone, to cycle the LEDs through any desired pattern of any colors. Likewise, where the aforementioned LCD-type displays for displaying still images or video streams are plugged into some of the smart modules, slide show programs or video streams may be played as endless loops or in any other manually selected or automated sequence.

Figure 9:
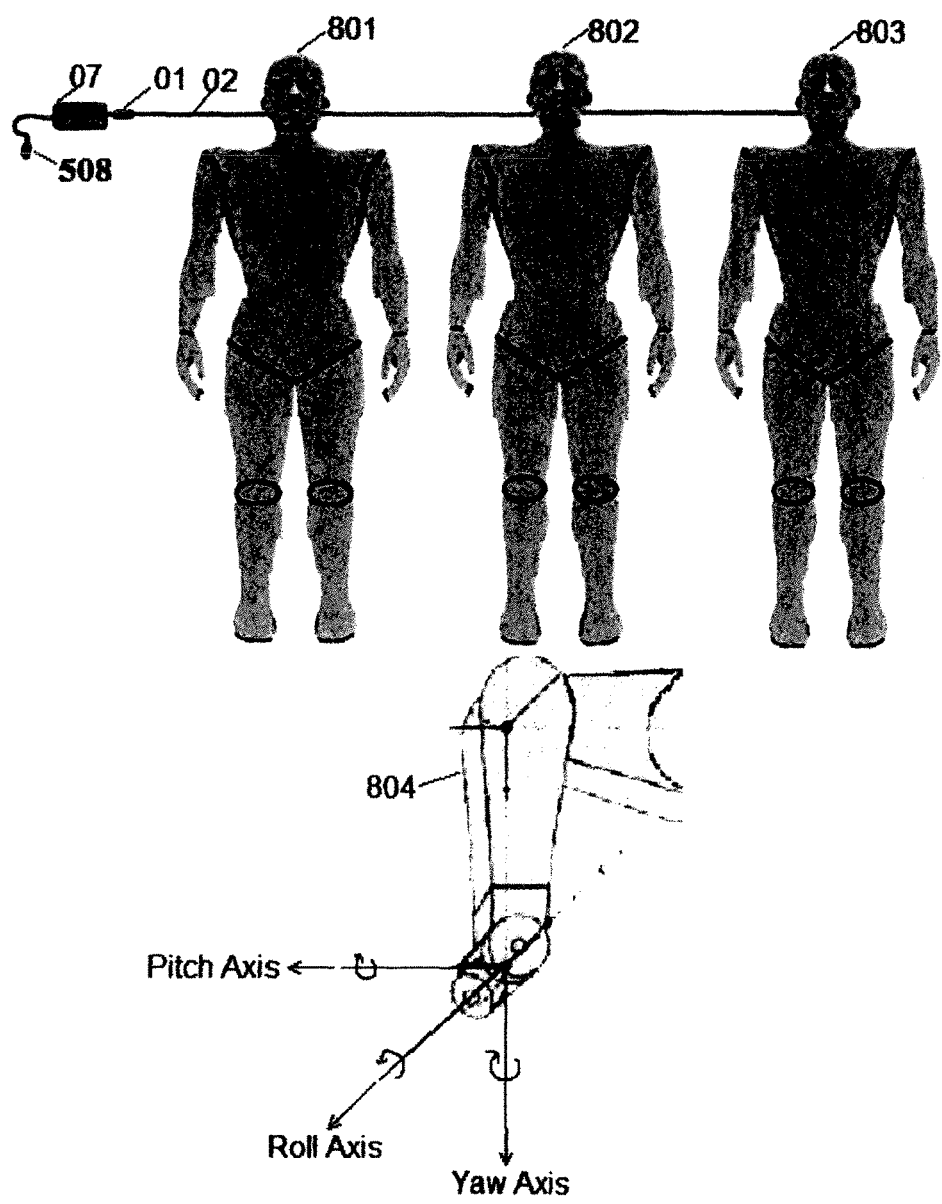
FIG. 9 is a block diagram of the Automated Robotics/Puppet Electronics Module.

Referring to FIG. 9, robotic devices, such as automated puppets, are shown. The robotic devices may be made to resemble anything, and have movable parts operated by servos, motors or other actuators. A reference is made to the aerospace industry axis definition 804 for the pitch, roll, and yaw in order to describe a similar axis needed for each moving part or axis of the automated puppet or mechanical robot. Each side of the robot mouth or jaw could have a pitch-type of axis to resemble the mechanical movement of the mouth. The eye lids could have a mechanical joint or pitch axis at each side of the robot's eye. The axis for the neck, shoulder, wrist, and hip could each have pitch, roll, and yaw axis to resemble their mechanical movements. The knee axis could have a pitch axis. The axis for the ankle could have a pitch and yaw axis to resemble the mechanical movements for those parts of the robotic-type body. A stepper or servo motor with an encoder could be used for each axis needed in order to receive pulses for each degree or fractional degree of movement for each axis or linear actuators may similarly be used. A microprocessor as described above, or digital signal processor (DSP) or the like could interact with the encoder by receiving pulses or signal from a user or software program and then delegating the pulses to the proper servo motor axis. For instance, control signals could be generated by an app interface mounted to a smart phone where the robot is depicted. A user might highlight a part of the robot that is desired to be moved, such as an arm or leg, and drag the leg or arm in the desired direction. As noted above, a monitor display or touch screen may be used to move the robotic parts, such as a smart phone using a smart phone app that would generate instructions that are transmitted to corresponding microprocessors, such as microprocessor 10 (FIG. 1), or microprocessor 15 (FIG. 7), or a microprocessor associated with the robot module (FIG. 13) plugged into a port of cable 02. Here, the user could touch a robotic part displayed on a monitor display or touch screen (FIG. 6) to highlight the part, and drag the highlighted part on the screen in a desired direction of movement. Instructions would be generated by the app as the part is dragged on the screen and transmitted to the microprocessor controlling the robotic device on cable 02 to effect the same or similar movement of the actual robotic part.

Figure 13:
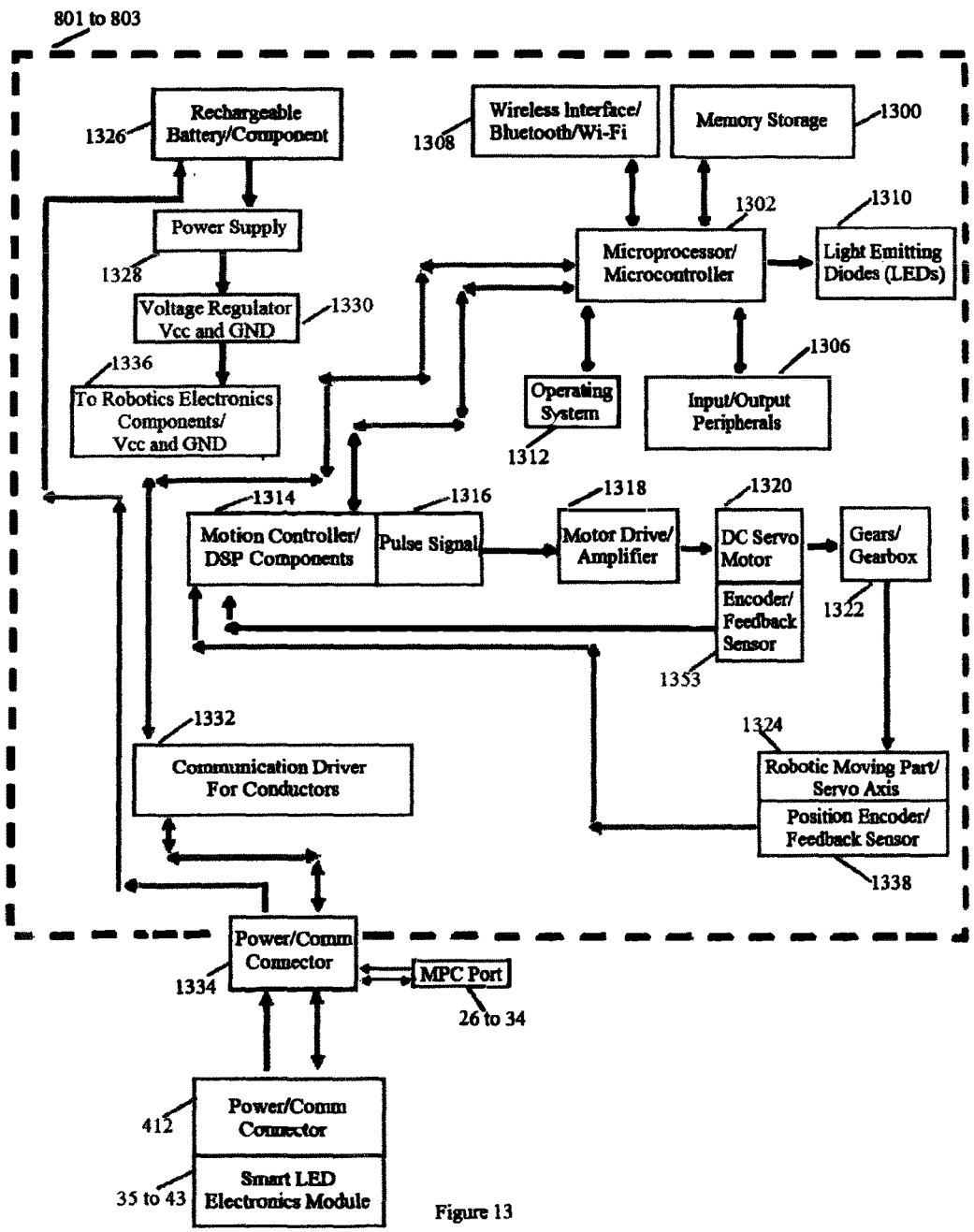
FIG. 13 is a block diagram of the Automated Robotics/Puppet Electronics Module.

Reference is now made to FIG. 13 that shows one embodiment of the Automated Puppet or Robotics Module plug-in 801-803 of FIG. 9. External DC power from a Smart Module connection 35-43 is connected with its connector 412 to power/communication connector 1334. In other embodiments, the Robotics Module plug-in 801-803 is plugged in directly with its power/communication connector 1334 to a cable port 26-34 without the Smart Module 35-43 connected to cable 02. In this embodiment, external DC power is fed directly from electronics in housing 01, with DC power applied to the rechargeable battery or other rechargeable component 1326. The Robotics Module plug-in 801-803 will run without external DC power until the rechargeable battery or other rechargeable component 1326 is de-energized or power falls below an operational level of the associated microprocessor as noted above. The power supply 1328 regulates power and constant power source components 1330 such as a voltage regulator could regulate power through the printed circuit board (PCB) conductive traces to the voltage (Vcc) and ground (GND) connection points to each of the components within the Robotics Module plug-in 801-803, and to all of the Robotics Electronics components 1336. The microprocessor/MCU 1302 might use assembly language based software like machine code, "C" based software or another language as noted above to communicate to the operating system 1312. The microprocessor/MCU 1302 controls the on/off frequency of light emitting diodes (LEDs) 1310 attached to its printed circuit board (PCB), communicates with the operating system 1312, to the input/output peripheral ports 1306, to the digital or memory storage 1300, to the communication driver/interface to the conductors 1332, and to the wireless interface components 1308 within the Robotics module plug-in 801-803. The communication driver for the conductors 1332 communicates through its power/communication connector 1334 to Smart Module connector 412. If a Robotics Module 801-803 is plugged into Smart Module connector 35-43 then it receives power 1334, conductor communication 1334, and it communicates wireless 1308 to the MPC embedded electronics wireless interface components 103 or with the Smart LED Electronics Module wireless interface components 413. The Microprocessor/MCU 1302 might receive a signal or program instruction from the wireless interface 1308 to move or automate a certain servo axis 1324 of the robotic component. This signal might come from a third party electronics device (FIG. 1, 08) controlled by the end-user's interface software, or from a software program within the MPC embedded electronics microprocessor (FIG. 4, 10), or from a software program within the Smart LED Electronics Module microprocessor (FIG. 5, 405). This signal is sent from the Microprocessor/MCU 1302 to the motion controller/Digital Signal Processor (DSP) 1314. This signal is converted to a pulse signal 1316 that is sent to the Motor Drive/Amplifier Components 1318. This converts the pulse 1316 or amplifies it to an electrical power signal that is compatible with the power inputs of the DC Servo Motor 1320. This power signal might power a DC Servo Motor 1320 in order to move Gears or Gear Box that the DC Servo Motor's Shaft 1320 is attached to. The Gears or Gear Box 1322 are mechanically attached to the Robotic Part/Servo Axis 1324 that moves. This Robotic Part or Servo Axis 1324 could be a robotic arm or leg. The Motor Controller/DSP 1314 might have encoder inputs connected to the DC Servo Motor's Encoder/Feedback sensor 1353 to the Robotic Moving Part/Servo Axis 1324, and to the Encoder/Feedback sensor 1338. The Motor Controller/DSP 1314 converts these encoder signals into data in order to calculate the exact position of the Robotic Moving Part or Servo Axis 1324 and the current position of the DC Servo Motor 1320. The Motor Controller/DSP 1314 uses this position data or servo axis degrees to move DC Servo Motor 1320 to the exact position or servo axis degrees that matches or equals the position data or servo axis degrees sent from the Microprocessor/MCU 1302 signal or program instruction.

Figure 15:
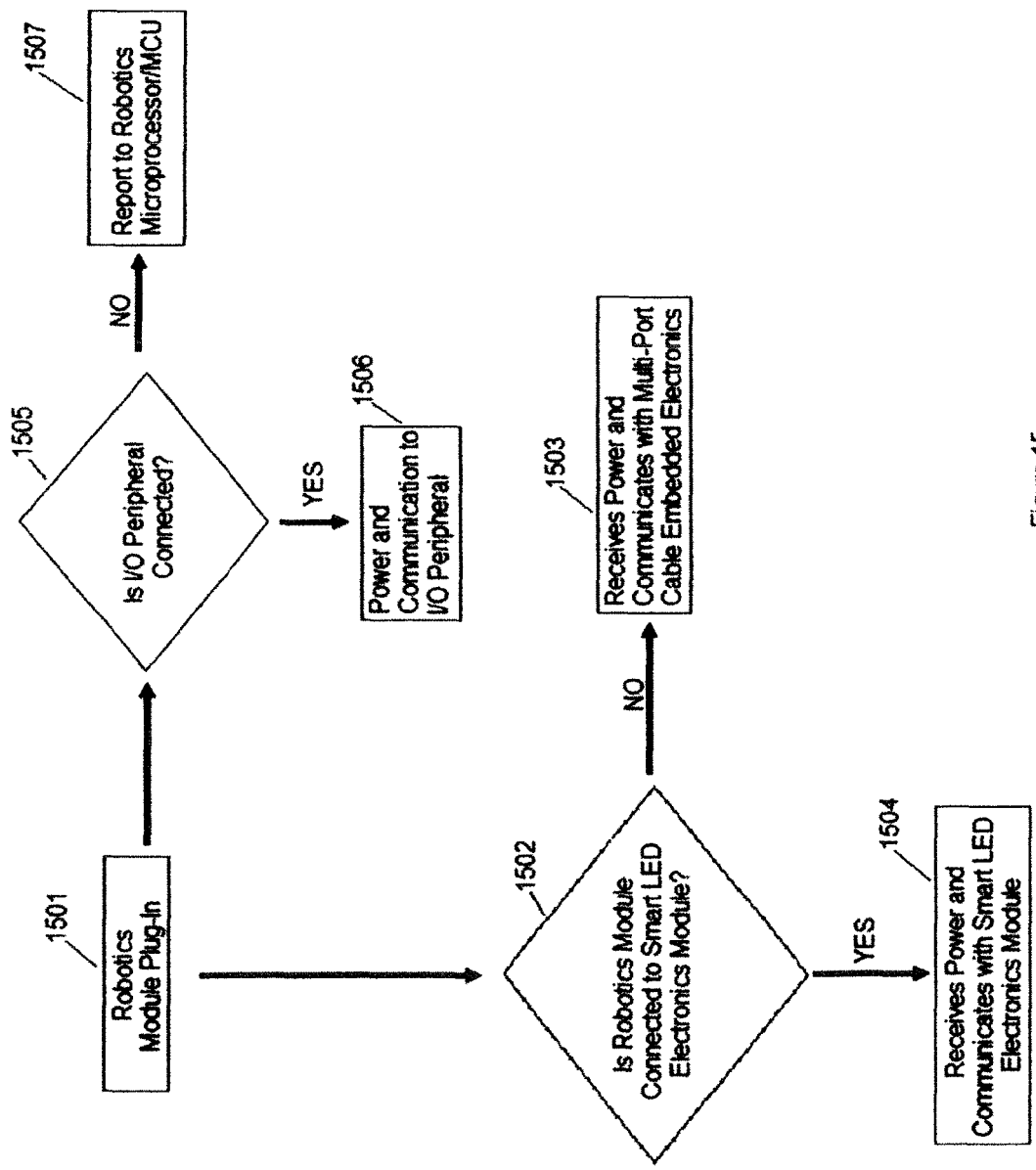
FIG. 15 is a flow chart of the Automated Robotics/Puppet Electronics Module.

Reference is now made to FIG. 15, where a flow chart of operation (but not limited to this type of operation) of the Robotics or Automated Puppet Module Plug-in (FIGS. 9, 801-803) is shown. Decision box 1502 determines if the Robotics Module Plug-In at box 1501 is connected directly to a cable 02 connector 26-34 (FIG. 1) without first connecting to a Smart Module connector (FIG. 5, 412). If the Robotics Module Plug-In is connected directly to the cable 02 port then the Robotics Module Plug-In receives DC power and communicates with electronics in housing 01 (FIG. 1) at box 1503. If the Robotics Module Plug-In is connected to a Smart Module then it receives DC power and has two way communications with the Smart Module microprocessor/MCU at box 1504. At decision box 1505 if the Robotics Module Plug-In detects an input/output peripheral device like a digital camera then it electrically powers the I/O device and communicates with it at box 1506. If no I/O peripheral device is detected then it reports no I/O connected to the Robotics Module Plug-In microprocessor/MCU at box 1507.

Figure 3:
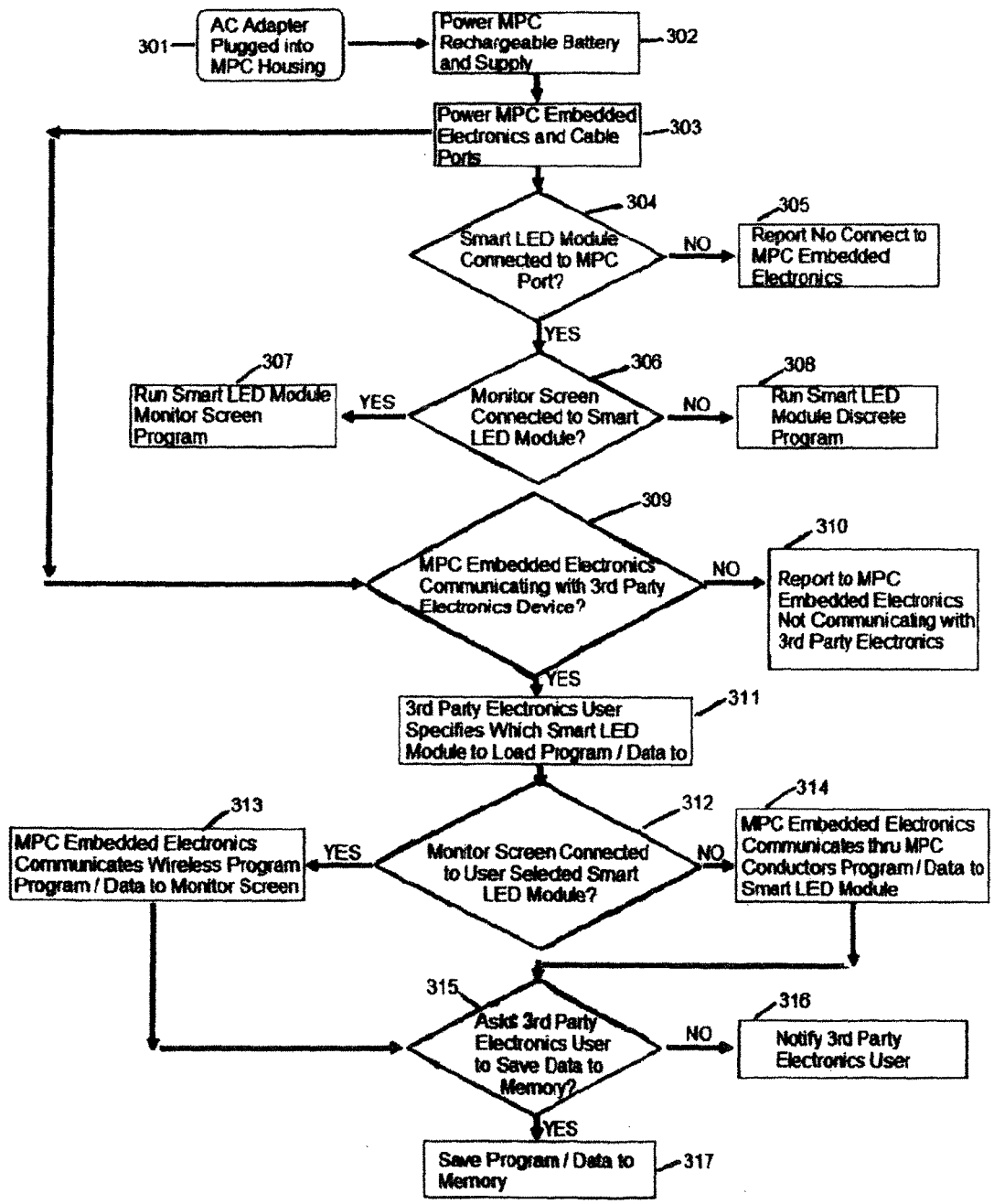
FIG. 3 is a flow chart of the electronic decoration system.

Reference is now made to FIG. 1 and FIG. 3 for one example of operation of the system. If an AC/DC adapter is connected to housing 01 at box 301, or a DC power source from a base unit 07 is plugged into the DC power source and communication connector 06 via cable 03, then power will begin to charge the rechargeable battery or rechargeable component 09 and supply power to electronic components within housing 01. Cable 02 may operate with or without a DC power source connected to housing 01 at box 301, but cable 02 will de-energize rechargeable battery or rechargeable component 09 in housing 01 as the cable 02 and its connected modules and devices are using its power. It also should be noted that a power switch (not shown) may be located on housing 01 to interrupt power to components therein to turn the system off. Electrical power at box 302 is distributed to the other cable electronics at box 303. The microprocessor/MCU 10 in housing 01 checks at box 304 if Smart LED modules 35-43 are connected to any of ports 26-34 of cable 02. If no, then a Smart module 35-43 is not connected to one of the ports 26-34, and microprocessor 10 may enter a power-saving mode to wait for a smart module to be plugged into a port of the cable. Otherwise, microprocessor 10 may continue to poll the ports of the cable for a smart module plugged into a port of the cable. This is reported to microprocessor 10 at box 305. If the answer at box 304 is yes, then a Smart LED electronics module 35-43 is connected to one of the ports 26-34 and the logic flow proceeds to box 306. At box 306 microprocessor 10 determines if a monitor display or touch screen 04 is connected to a Smart module 35-43. If yes, then at box 307 the Smart LED electronics module 42 operates the monitor display or touch screen program to receive inputs from a user and if provided, to run programs that operate other smart modules plugged into the respective cable 02. If no touch screen or monitor display is available, then no connection is returned at box 306 and the logic proceeds to box 308 to run programs associated with any Smart modules 35-41 and 43. Also at box 303, when power is supplied to the MPC embedded electronics 01 its microprocessor/MCU 10 is constantly checking at box 309 if it is communicating through the wireless system 12 with a third party electronics device/computer 08. If no, then at box 310 it reports to the MPC embedded electronics microprocessor/MCU 10 that it is not currently communicating with a third party electronics device/computer 08. If yes, at box 311 the user of the third party electronics device 08 specifies through its user interface software which smart module 35-43 to load a new program or data to. The logic then flows to box 312, and the MPC embedded electronics microprocessor/MCU 10 determines if a monitor display or touch screen plug-in 04 is connected to the user selected Smart module. If no, then the logic proceeds to box 314 and microprocessor/MCU 10 communicates the program/data to the Smart modules at respective ports 26-34. If yes, a monitor display or touch screen 04 is connected to the user selected Smart LED electronics module and the logic flow will proceed to box 313 and the MPC embedded electronics microprocessor/MCU 10 communicates the program/data to the Smart LED electronics module through the MPC embedded wireless system 12.

When the process at boxes 313 or 314 is complete the MPC embedded electronics microprocessor/MCU 10 asks the user of the third party electronics device/computer 08 to save the program/data to memory storage 11, and/or to the user specified Smart modules 35-43 memory storage 404 (FIG. 5), and/or to the Smart Multi-Port Auxiliary Base unit memory storage 17 (FIG. 1). If no, then the logic flows to box 316 to notify the user of the third party electronics device/computer 08 that the program/data was not saved. If yes, then the logic proceeds to box 317 to save the program/data to memory storage 11, and/or to monitor display or touch screen memory storage 704 (FIG. 6), and/or to the user specified Smart modules 35-43 memory storage 404, and/or to the Base unit 07 memory storage 17.

Figure 14:
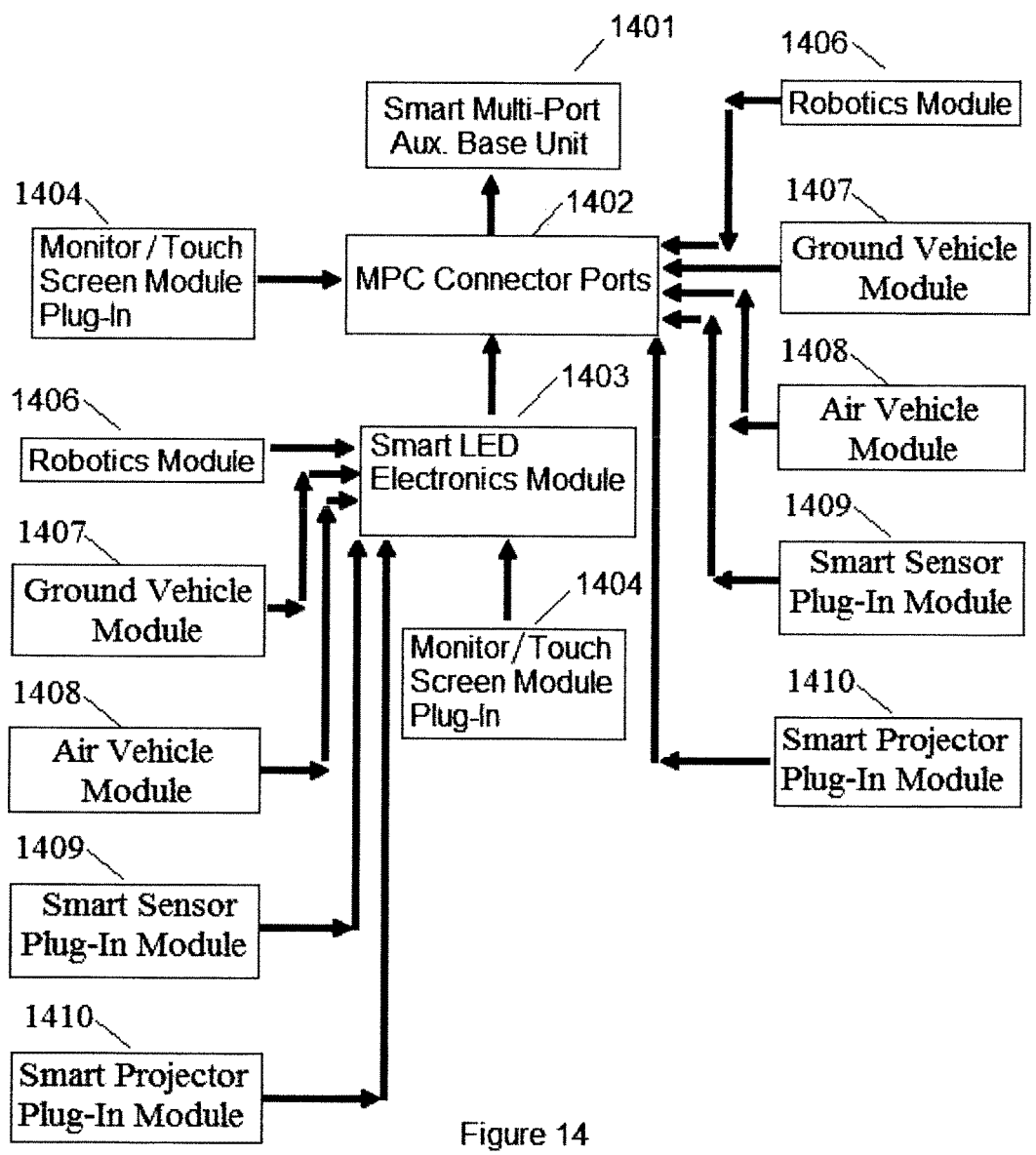
FIG. 14 is a block diagram of the electronics decoration system connections.

Reference is now made to FIG. 14 for an example of the different module connections to the system. MPC at box 1402 is connected to the Smart Auxiliary Base Unit at box 1401. The Monitor Display or Touch Screen Module Plug-in at box 1404, A Robotics Module 1406, Air Vehicle Module 1407, Ground Vehicle Module 1408, Smart Sensor Plug-in Module 1409, Smart Projector Plug-in 1410, and Smart LED Electronics Module 1403 are connected to MPC 1402. A Monitor Display or Touch Screen Module Plug-in 1404, Robotics Module 1406, Air Vehicle Module 1407, Ground Vehicle Module 1408, Smart Sensor Plug-in Module 1409, and Smart Project Plug-in 1410, are connected to Smart LED Electronics Module 1403.

Due to the intelligent decoration system's modular design, the physical dimensional sizes of the replaceable decorative covers or other decorative objects can easily be scaled up or down to meet the user's needs for almost any given application. This also allows the user to easily make other changes to the replaceable decorative cover letters by spelling a different word with different replaceable cover letters. This modular design allows for the re-use of the core components of the decoration system each time a decoration change is made and reduces the cost of having to obtain costly new electronics, cables, and components. These core components of the modular decoration system are the Multi-Port Cable (MPC), the MPC embedded electronics, and the Smart LED Electronics Modules. The cable and integrated ports may be configured to be of any length up to the limits of electronic transmission of signals and power potentials, and may be used in any application requiring a relatively large number of devices to be electronically or operatively connected together. Such a cable may also be integrated into clothing or accessories in several embodiments, such as a purse, belt, sash or the like, to provide various types of displays and receive video and audio inputs.

In use, a user of this invention may interact with the intelligent decoration system via an interface mounted in a computing device such as a smart phone, a general purpose laptop, desktop or tablet computer, or any other third party electronic device 08, as shown in FIG. 1. Where a general purpose or smart device is used, the user interface software allows for two way communication to exist between the intelligent decoration system electronic module components 01 and the third party electronics 08 used by the user. The user might use this interface software to control in real-time the decoration system, as by the app displaying modules plugged into a cable 02 so that the user might highlight a particular decoration or part attached to a smart module, or part of a decoration, and tap, drag or flick the image of a decoration or part in order to illuminate lights, display or scroll through pictures, play video streams or effect mechanical movements. Particular colors of LED lights might be selected by dragging a decoration at one port onto a color of a color wheel or the like in order to change lighting color of a decoration. Various types of software programs or data that control the decoration system and its behavior may be loaded to each of the Smart LED Electronics modules 35-43 plugged into each cable 02 port 26-34. The user might also load various types of data, such as static image files, video files, audio files, or other types of files that independently control the behavior or decorative display of each MPC port of the intelligent decoration system. In other words, one MPC port may be loaded with a video file, another with an audio file, and a third with a static image file or the like. These types of files or data could be loaded into the Multi-Port Auxiliary Base unit 07, or the MPC embedded electronics 01, or each of the Smart LED Electronics Modules 35-43 or the Monitor Display or Touch-Screen Plug-in Modules 04. These types of files or data could be loaded into the digital storage memory that can be executed or run within the microprocessor or microcontroller unit that might have an operating system or control software or systems installed within each of these modules or microprocessors/MCUs of the intelligent decoration system electronic module components described previously. The user also has the option of connecting a replaceable static decorative letter or object cover 44-51 into or over any of the Smart LED Electronics Modules 35-43 or directly into any of the MPC connector ports 26-34 that could also have user interactive or program driven light emitting diodes (LEDs) flash or illuminate light from within the replaceable static decorative letter or object cover.

Another feature of the intelligent decoration electronic system allows the end-user to connect user interactive or programmed through software robotics or automated puppets (FIG. 9. 801-803) to any of the Smart LED Electronics Modules 35-43 or connected directly into any of the MPC connector ports 26-34. All of these unique features described previously allow the invention system to be electronically intelligent, portable, modular, decorative, more adaptable to be used in almost any electronics safe environment, and custom to meet each end-user's decorative needs electronically and with custom decorative objects 44-51 and robotic type devices 801-803 for a wide range of demographics of people. Decorative covers in an embodiment that is substantially similar to those described above will now be described with reference to FIGS. 16 to 23 of the accompanying drawings. The decorative covers 2001 according to this embodiment include at least one but preferably a plurality of electrical component fastening structures configured to receive elements of an electrical device into an interior compartment of a respective decorative cover or into close proximity thereto. As will be described below, the electrical devices for which the decorative covers may be used with are traditional commercial light strings having lamps, electrical illuminated objects, or a rigid or flexible material having embedded LEDs or even the smart multi-port cable (MPC) described previously, respective decorative covers essentially being illuminated when coupled to respective electrical devices. It is understood that the external or commercial electronic devices (such as light strings and the MPC) are not actually the recited inventions in the claims below but rather are used with or acted upon by the recited decorative cover (recited as a decoration system).

Now more particularly, a traditional decorative string of lights 2011 is shown, and which is provided with a conventional plug 1601 for plugging the string into an AC outlet although a DC powered electrical string of lights might also be used. The conventional plug 1601 may also be plugged into a Flasher/Blinker Dimmer module 2401 (FIG. 16) that is powered by an AC/DC power adapter 54 through its connector 2406, the Flasher/Blinker/Dimmer module 2401 being configured to cause electrically connected electronics to flash or dim when actuated. String 2011 is provided with a plurality of decorative lights 2009, which may be incandescent lamps, LED lamps, electrical illuminated objects, electroluminescent wire or panels or the like. Applicant's decorative covers 2001 are configured with holders 2010 so that one or more lamps 2009 are fitted to respective holders, the holders then inserted into a respective decorative cover 2001 and held in place therein. This causes the covers, or at least portions of the covers, to be illuminated from within. Covers 2001 are held in place at selected locations by being movably mounted to a rigid or semi-rigid strip or wire 2004. In addition, the covers may be locked together so as to appear contiguous with or without strip or wire 2004 in order to form words or other visual effects.

Figure 16:
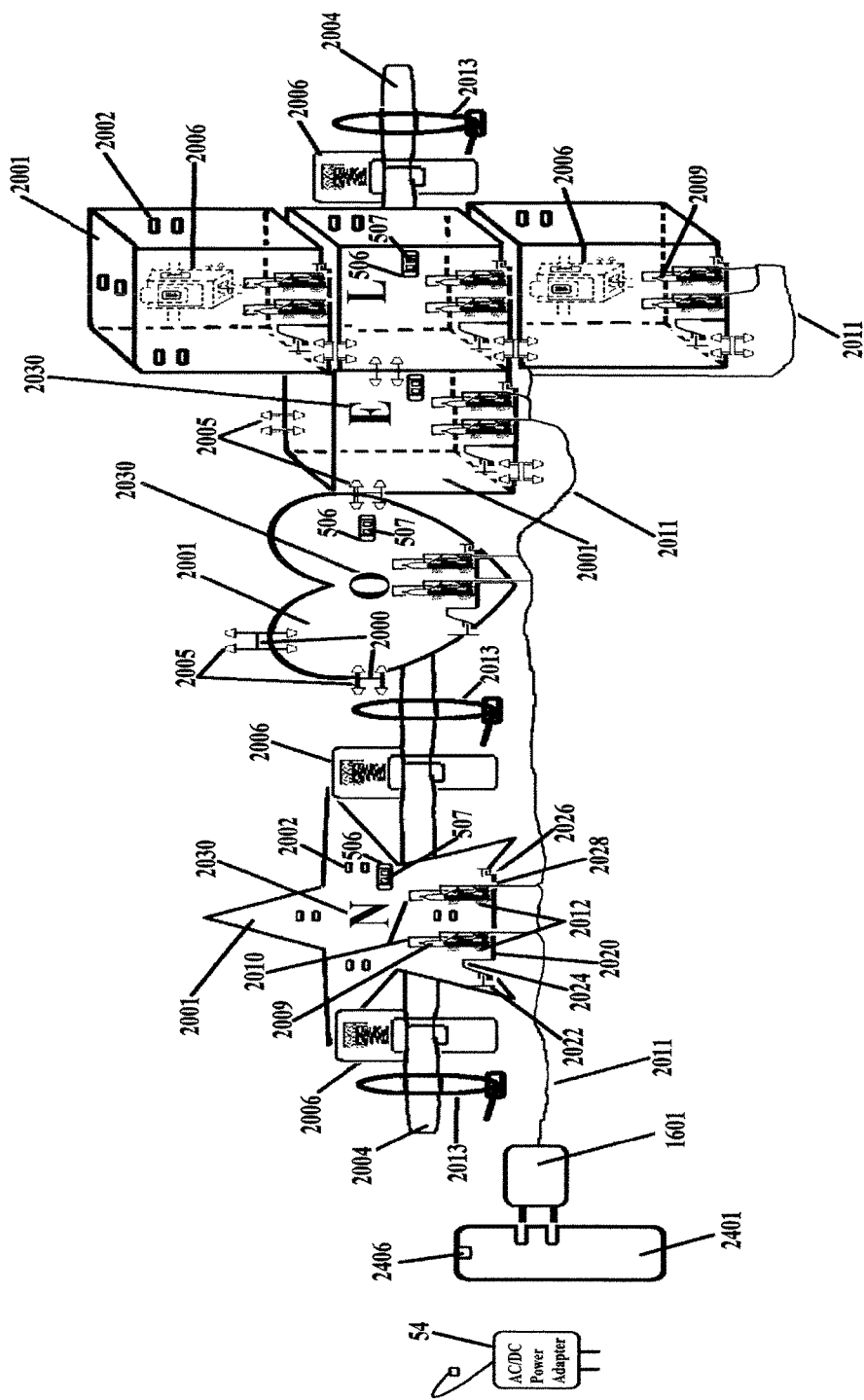
FIG. 16 is a diagram of an electronic decoration system and replaceable decorative string of AC or DC powered third party lights.

Covers 2001 may be generally hollow so as to be lightweight, or may be mostly solid for illumination effects, and have recesses or cutout areas where at least lamps 2009 are inserted. The front and side covers may be constructed of a transparent of translucent plastic material so as to diffuse or refract light emitted by lamps 2009. As such, any number of optical features may be molded into the covers or attached to the covers with a fastener type connector 507 into cover mated connector 506 to create pleasing optical effects. Such features include reflectors or retro-reflectors, glitter or sparkle effects, prisms, lenses, gratings, edge illuminated features, shapes, letters, words and numbers or other symbols, opaque or semi-opaque areas contrasted by illuminated areas, different colors of plastics forming shapes or artistic effects molded into the covers and any of the features noted for LED replaceable covers as noted in the foregoing. The removable and replaceable covers themselves may also be constructed in various shapes, such as the illustrated heart, star, cubes, globe, pyramid or regular geometric configuration, a uniform shape, an irregular geometric configuration, a non-uniform shape as shown in FIG. 16 or a letter shape, or number shape, or a data character/indicia shape as shown in FIG. 8. A decorative cover may also include alphanumeric indicia imprinted, etched, or indented on at least one of its walls.

Figure 17:
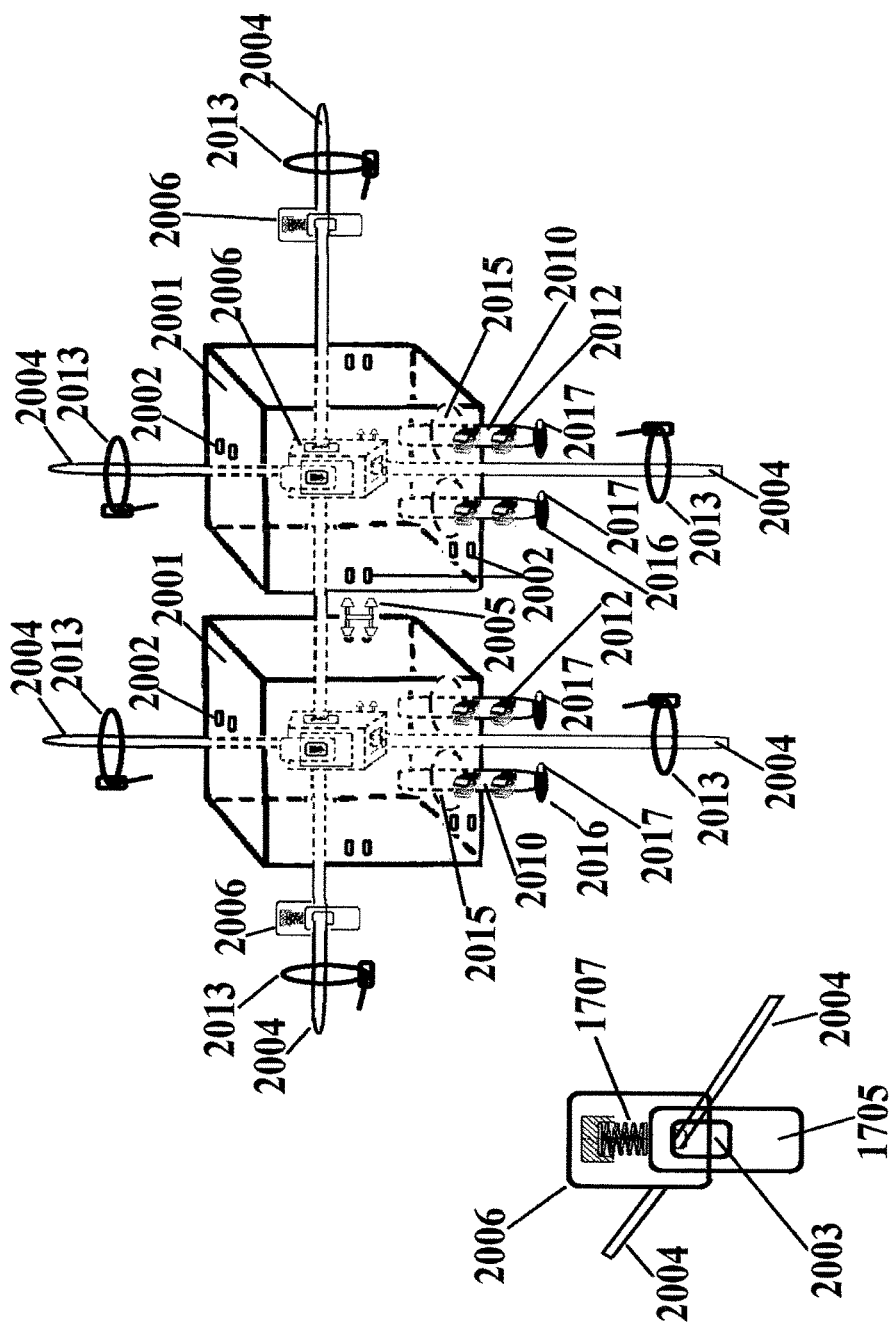
FIG. 17 is a diagram of the decorative cover interface with custom cable, cable clamps, tie wraps, connectors, and detachable light fixtures.
Figure 18:
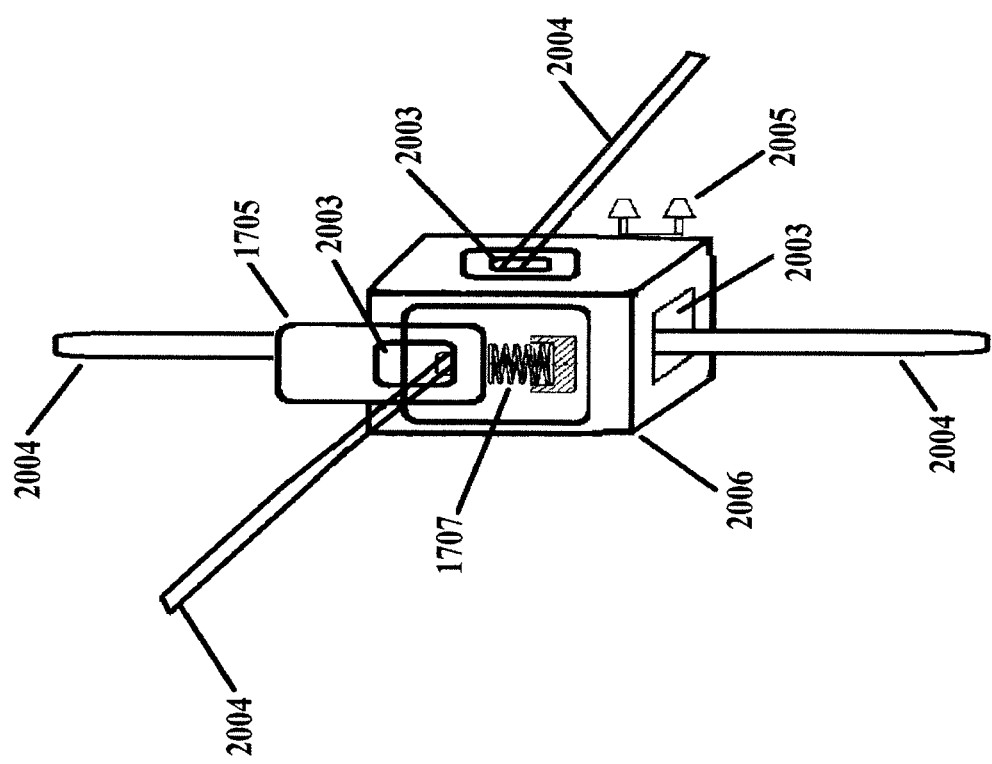
FIG. 18 is a diagram of the custom cable and cable clamp.

Each decorative cover 2001 may include a cover-to-cover fastening structure so that the covers may be coupled together in adjacent, contiguous arrangements as shown in the accompanying drawings and as described in detail below. For mounting the replaceable covers in a particular arrangement or sequence, a rigid or semi-rigid strip 2004 is provided, and which may be bent or otherwise configured to fit around or to an object, such as a Christmas tree, other decoration so as to be a part of the other decoration or as a stand-alone decoration affixed to a structure. As such, strip 2004 may be bent so as to go around a corner of a wall or the like, affixed to a fence or outdoor tree, attached to a fireplace mantle or anything else a user wishes to decorate by accompanying the decoration with surface suction fasteners, snaps, magnets, hooks, adhesive fasteners, mechanical threaded fasteners, hook and loop fasteners, screws, bolts, nuts, or the like. Accordingly, each cover is provided with a clamp 2006 that clamps the cover in place at its intended location along strip 2004. Referring to FIG. 17, one embodiment of a clamp 2006 is shown. In this embodiment, clamps 2006 are provided as a fixture on a back or rear of covers 2001. Referring to FIG. 18, an enlarged view of a fixture 2006, openings 2003 on opposite sides of the fixture are provided, with a horizontally disposed strip 2004 threaded through opposed openings 2003. A clamp 1705 having an opening 2003 through which strip 2004 is passed is mounted to fixture 2006, as by edges thereof riding in respective grooves or lips formed in fixture 2006. A spring 1707 biases sliding clamp 1705, as by bearing against a perpendicular tab on clamp 1705, upward so that strip 2004 is clamped between a lower inner edge of opening 2003 in sliding clamp 1705 and an upper inner edge of opening 2003 in fixture 2006. With this construction, a user pushes sliding clamp 1705 downward against the bias of spring 1707, enabling the cover to be moved along strip 2004 to a desired location on the strip, where the user releases clamp 1705 to clamp the cover in place on the strip. Also shown in FIG. 18 is a second, vertically disposed strip 2004, which allows fixture 2006 to be positioned both vertically and horizontally. In another embodiment, fixture 2006 may be constructed with opposed openings in the covers, with strip 2004 threaded through these openings and one or more discrete clamps positioned on strip 2004 to hold the covers there between.

Figure 19:
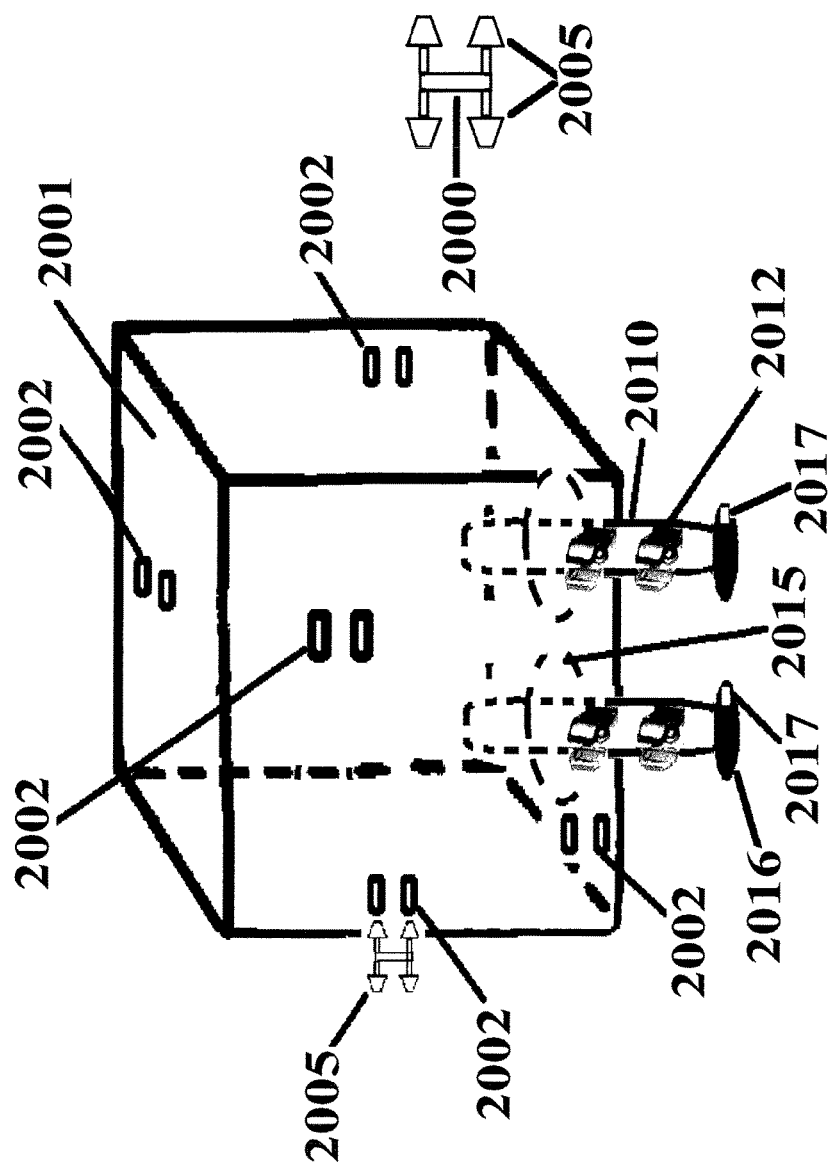
FIG. 19 is a diagram of the decorative cover with connector openings, connectors, and detachable light fixtures.

When mounting a strip 2004 with fixture 2006 clamped thereon to a structure or object, the strip may be bent into the desired shape and fasteners, such as tie wraps or cable ties, are used to secure the strip 2004 in place on or to the structure or nearby object like a tree branch or picture hanger.

Where it is desired to closely position several covers along strip 2004, the covers 2001 may be locked together as shown in FIGS. 16 and 19. Here, narrow, elongated openings 2002 are provided at predetermined locations on covers 2001, such as in sides, tops, bottoms, and in some cases, rears thereof. Locations of openings 2002 in the covers are selected so as to be aligned with corresponding openings in other covers so that the covers are in alignment when locked together. As shown, openings 2002 are arranged in pairs, with the openings in each pair oriented parallel to each other.

In order to lock the covers together, and still referring to FIGS. 16 and 19, connectors 2000 are provided. These connectors 2000 may be H-shaped members that have a barb 2005 at each end thereof, with the widest portion of barbs 2005 being generally the length of slotted openings 2002. As such, the center portion of a connector 2000 may be bent so that the barbs 2005 at one end of the H-shaped connector are brought coplanar with each other and the respective, coplanar barbs pushed through a respective pair of openings 2002. Barbs at the other end of a connector may likewise be installed into a pair of openings 2002 of an adjacent cover 2001. It is noted that the center portion of the connector is somewhat spring-like, and slightly misaligns the barbs with the openings they are inserted into when released to lock the covers together. It should be noted that a spring-like characteristic is not required for this connector 2000 to function. It is also noted that connector 2000 is shown enlarged in FIG. 19. In this embodiment, a strip 2004 may not be needed where the covers are placed on a shelf or other flat surface. They can simply be locked together and placed where desired.

In order to unlock the covers, two covers locked together may be separated slightly by the length of the center portion of the H connector 2000, and the center portion bent to again bring the barbs 2005 into coplanar relation so that the wide portion of the barbs can be withdrawn through respective elongated openings. Where the H-shaped connectors are relatively small, such as 1 inch square or less, tools, such as needle nosed pliers, may be needed to connect and release the connectors due to the covers being in close proximity to each other. However, needle nosed pliers are not required where the H-shaped connectors are larger than 1 inch square.

In other embodiments, the covers 2001 may be locked together linearly for being placed on a flat surface by having a stub shaft on one side of the covers that fits into an opening of the opposite side of adjacent covers. All the covers would have the stub shaft on the same side, and the openings would be on the same other side. The stub shaft would have an irregular head, and the openings would be configured to only receive the irregular head when the cover is rotated about the stub shaft in the offset relation. In other words, the stub shaft of one cover would be fitted into an opening of the adjacent cover and the covers rotated into alignment to lock them together. In this manner, and where most of the covers were cubes having letters 2030 (FIG. 16) thereon, a contiguous appearing decoration could be formed to spell words, form sentences and have stars, hearts, or other shapes 2001 (FIG. 16) between the words, or the cover could be the shape of a letter or number as shown in FIG. 8. Such a contiguous decoration could be placed on a shelf, table or other flat surface, or hung using tie wraps or cable ties to secure the strip 2004 in place on or to the structure or nearby object like a tree branch or picture hanger.

Figure 20:
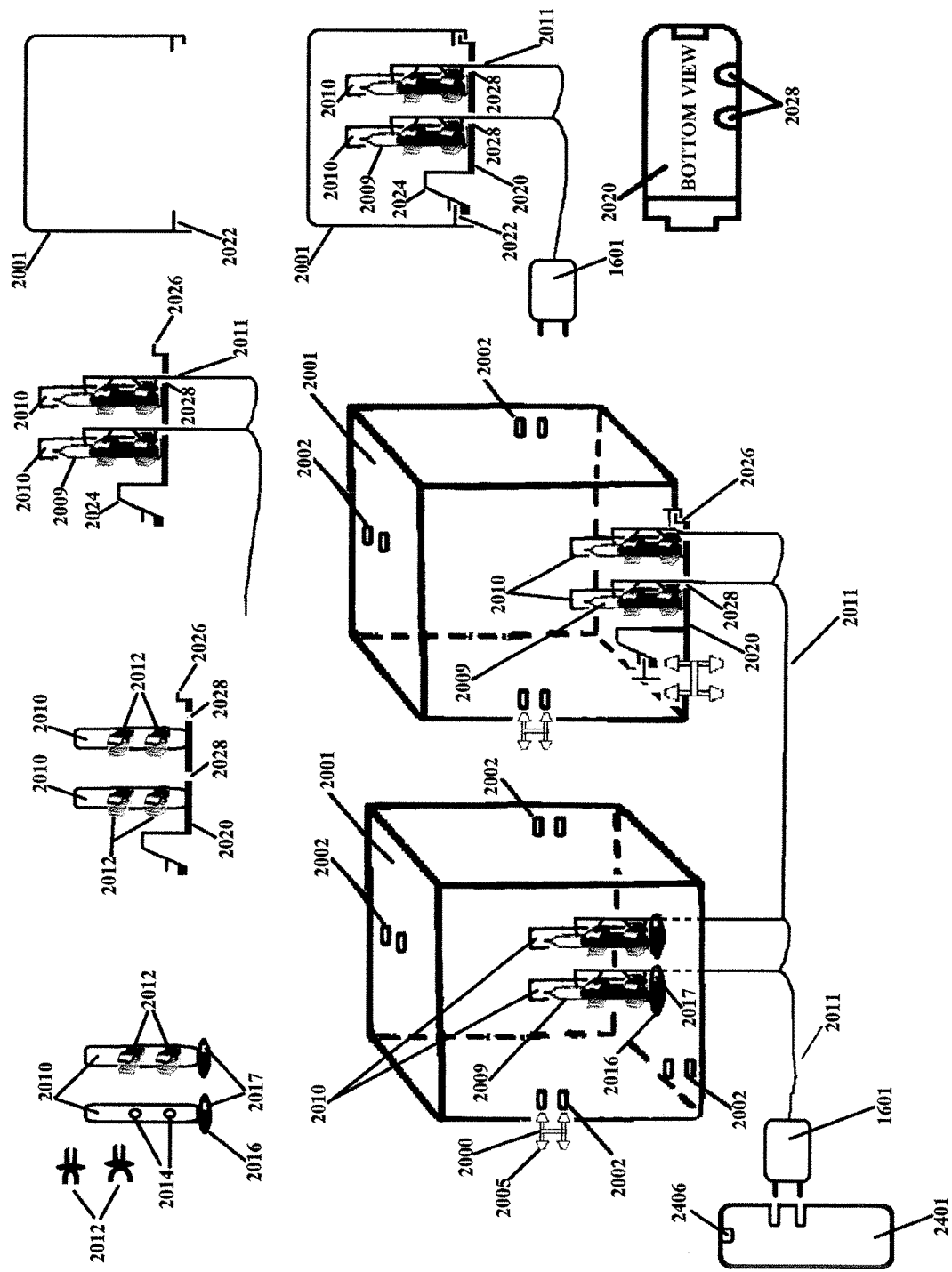
FIG. 20 is a diagram of the decorative cover interface with electronic decoration system, replaceable decorative covers, string of AC or DC powered third party lights, and detachable light fixtures.

FIGS. 16 and 20 show an embodiment that may be used to hold conventional decorative lamps, electrical illuminated objects, on a string of lamps within a respective cover. In this embodiment, a holder is shown by way of example for a conventional lamp 2009, typically of the miniature type. Here, an elongated member 2010 is provided with clips 2012 into which a lamp 2009 and its socket 2014 (FIG. 20) are clipped. Clips 2012 may be constructed as plastic rivets that each have a rivet portion that is inserted into openings 2014 in member 2010 in order to secure clips 2012 to member 2010. In other embodiments, member 2010 may have clips that are integral with member 2010, as by molding, ultrasonic welding or bonding, such as where the clips are of a plastic material, or the clips may be formed from member 2010 where member 2010 is of a thin metal material, such as copper, tin, a flexible ferrous or nonferrous metal or the like.

Elongated members 2010 are attached to or integral with a base 2016 that engages an opening 2015 (FIG. 17) in a respective cover 2001. As shown in the embodiment of FIGS. 17 and 20, base 2016 may be circular, and is provided with a way to lock the base into a respective opening in a cover. One such mechanism, and by way of example only, may be a flange on the opening that prevents the base from being pushed through the opening. The flange would be provided with a lip, with openings in the lip that receive tabs on the base. With such a construction, the base may be pressed against the flange with the tabs through the corresponding lip openings, and the base rotated so that the tabs engage the interior of the lip, locking the base in place. As such, the base need only be rotated perhaps 1/8 to 1/4 turn to lock it in place.

As there are two sets of wire leads going to/from each lamp fixture, slots or openings in each base, or slots or openings 2017 communicating with each cover opening, are needed to allow passage of the wires from the interior to exterior of each cover. In other embodiments, only the lamp is positioned within the cover, with the lamp fixture extending partially or fully to the exterior of the cover. This would eliminate a need for openings in the bases/cover for wires to pass through. In yet another embodiment, a short length of thread may be provide to an edge of the bases 2016 that engage a respective short length of thread in an edge of the openings 2015 (FIG. 17). In yet another embodiment, the bases 2016 may each be provided with a spring clip or spring-like clip that would engage edges of corresponding openings 2015 (FIG. 17) to hold the base in place.

Another embodiment of a lamp and socket holder is shown in FIGS. 16 and 20. Here, rectangular bases 2020 with a spring like feature with lips 2024 are provided that fit into corresponding rectangular openings 2022 in covers 2001. A flange at the edge of openings 2022 would prevent the base from going through the opening, and a flexible spring clip or spring-like clip 2024 integral with the base 2020 or attached thereto would engage an edge of openings 2022 or a lip provided in the cover 2001 above opening 2022. As described above, an elongated member 2026 is provided on rectangular base 2020 that has clips 2012 and elongated members 2010 for receiving a lamp 2009 and its respective socket 2014. As shown in FIG. 20, a bottom view of base 2020, openings or slots 2028 are provided for wires to pass to/from a respective lamp socket within a cover 2001.

Figure 21:
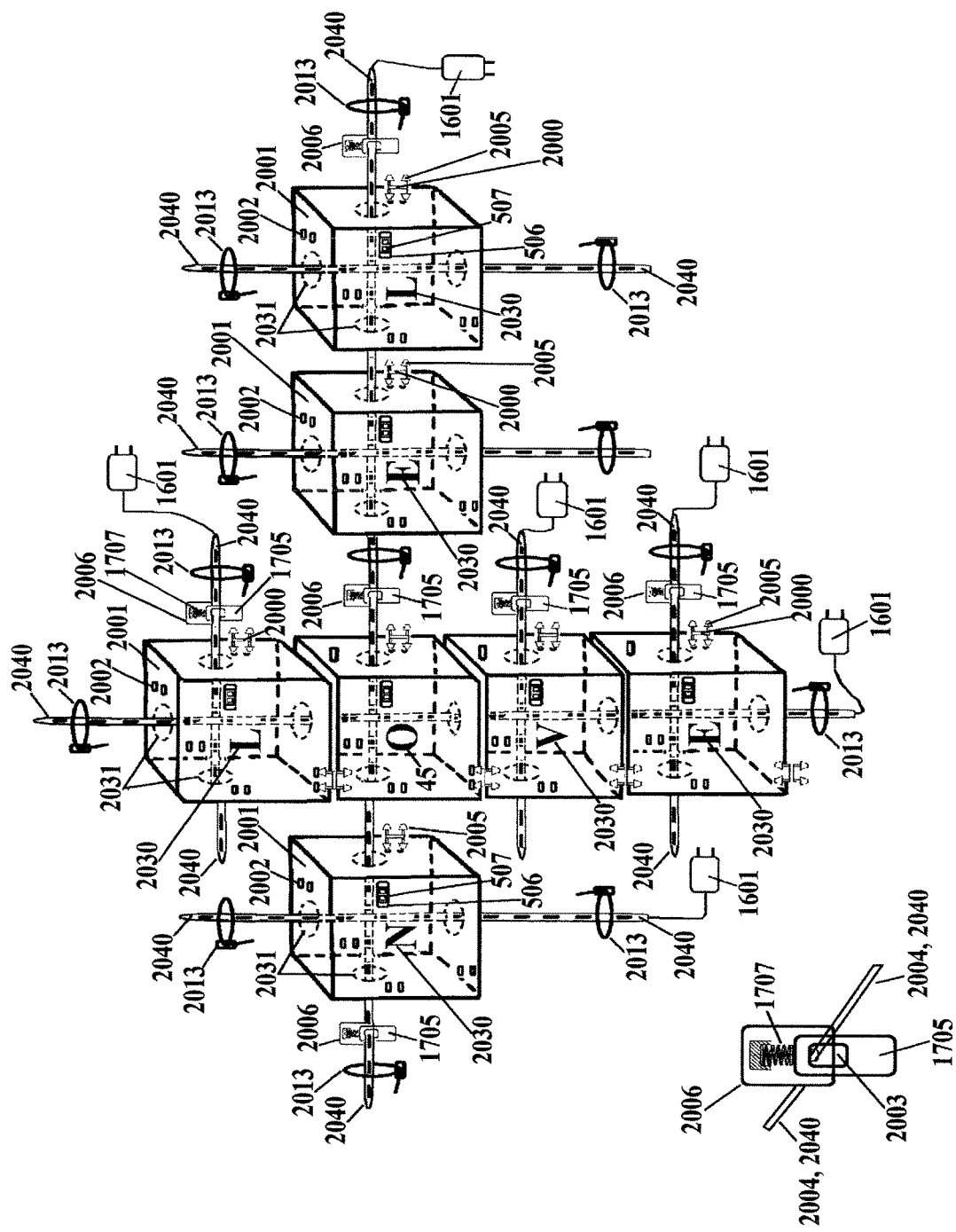
FIG. 21 is a diagram of the decorative cover interface with replaceable decorative covers, cable clamps, tie wraps, connectors, and multiple third party LED embedded light strips.

A different type of embodiment holds an LED type of cord or continuous LED cable strip 2040 that does not have individual lamp or LED sockets is shown in FIG. 21. Here, the LED cable strip 2040 has LEDs built into or LEDs embedded within its cable 2040. Holes or openings 2031 are provided on each side of the decoration cover 2001 that allow the LED strip 2040 to fit in these openings 2031. A spring 1707 biases sliding clamp 1705, as by bearing against a perpendicular tab on clamp 1705, upward so that LED strip 2040 is clamped between a lower inner edge of opening 2003 in sliding clamp 1705 and an upper inner edge of opening 2003 in fixture 2006. With this construction, a user pushes sliding clamp 1705 downward against the bias of spring 1707, enabling the cover to be moved along LED strip 2040 to a desired location on the LED strip 2040, where the user releases clamp 1705 to clamp the cover 2001 in place on the LED strip 2040. As described above, an LED strip 2040 is positioned into decoration covers 2001 in a vertical or horizontal orientation. These covers 2001 are replaceable at the cover's front face or sides of the cover that have connector 506 that mates with connector 507 that could be molded plastic attached to the side of cover 2001. The replaceable covers 2001 have letters or numbers that can form words when different covers 2001 are joined together.

Figure 22:
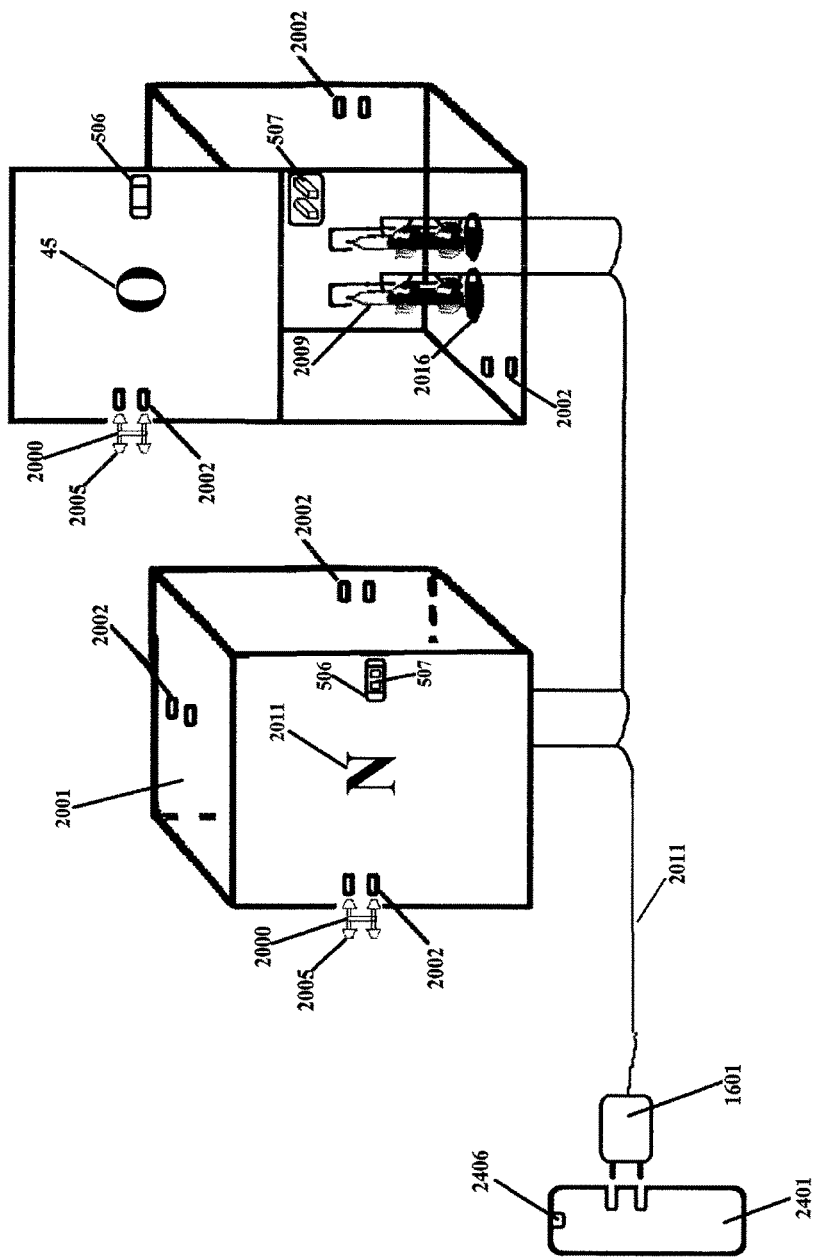
FIG. 22 is a diagram of a decorative cover with detachable front face, connectors, and detachable light fixtures.

A different type of embodiment holds an LED cable 2011 or LEDs that do have an individual lamp or LED sockets 2009 are shown in FIG. 22. This embodiment shows a detachable or replaceable decoration face cover 45 (FIGS. 1 and 22) with a female connector 506 that mates with male connector 507 as shown in FIGS. 8 and 22. The female connector 506 shown in FIG. 22 could be molded with the body of the decoration 2001 where the front face decoration cover 45 mates with connector 507.

Figure 23:
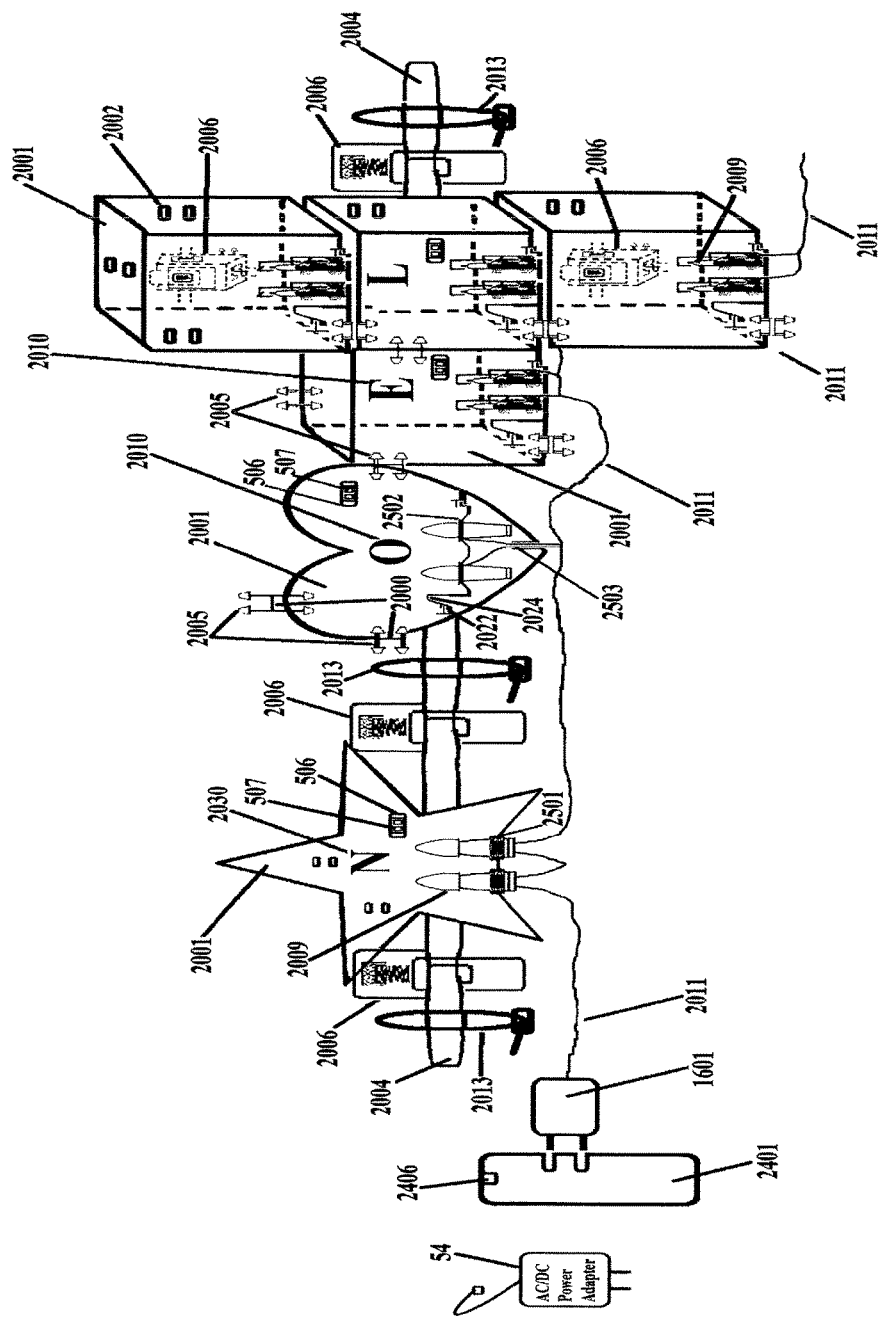
FIG. 23 is a diagram of an electronic decoration system and replaceable decorative string of AC or DC powered third party lights with threaded fastener attached to light fixture for attaching or detaching the decorative cover.

A different type of embodiment holds LED cable 2011 that does have an individual lamp or LED socket 2009 as shown in FIG. 23. This embodiment shows an inner threaded cylindrical or ring shape with an opening 2501 that could be fabricated or molded within the body of the lamp or LED socket 2009 or the threaded inner ring or cylindrical part 2501 could be internal within the LED socket 2009 at its top opening. This threaded inner ring 2501 is screwed into or mated with a threaded outer ring 2502 that is fabricated or part of the decoration cover 2001. The outer ring 2502 could not be threaded and could allow the LED or lamp to pass through the outer ring 2502 and screwed into the LED or lamp socket 2009. The LED cable 2011 could pass through the decoration opening 2503.

As should be apparent, the covers, bases and lamp/socket clips may be scaled to accommodate different sizes of lamps. Where larger, brighter lamps are used, openings may be provided in the covers to prevent heat from building to excessive levels. Also, the bases for the lamps and sockets do not necessarily need to be fitted to a bottom of the decoration covers, the bases may be fitted to a rear, side, top or even a front of the covers. In some embodiments, a particular feature of a side, such as a front of a cover, may be more strongly illuminated than the rest of the cover, and require a lamp to be positioned in the feature rather in the cover itself. Also as noted above, more than one lamp may be provided in a single decoration cover.

Figure 24:
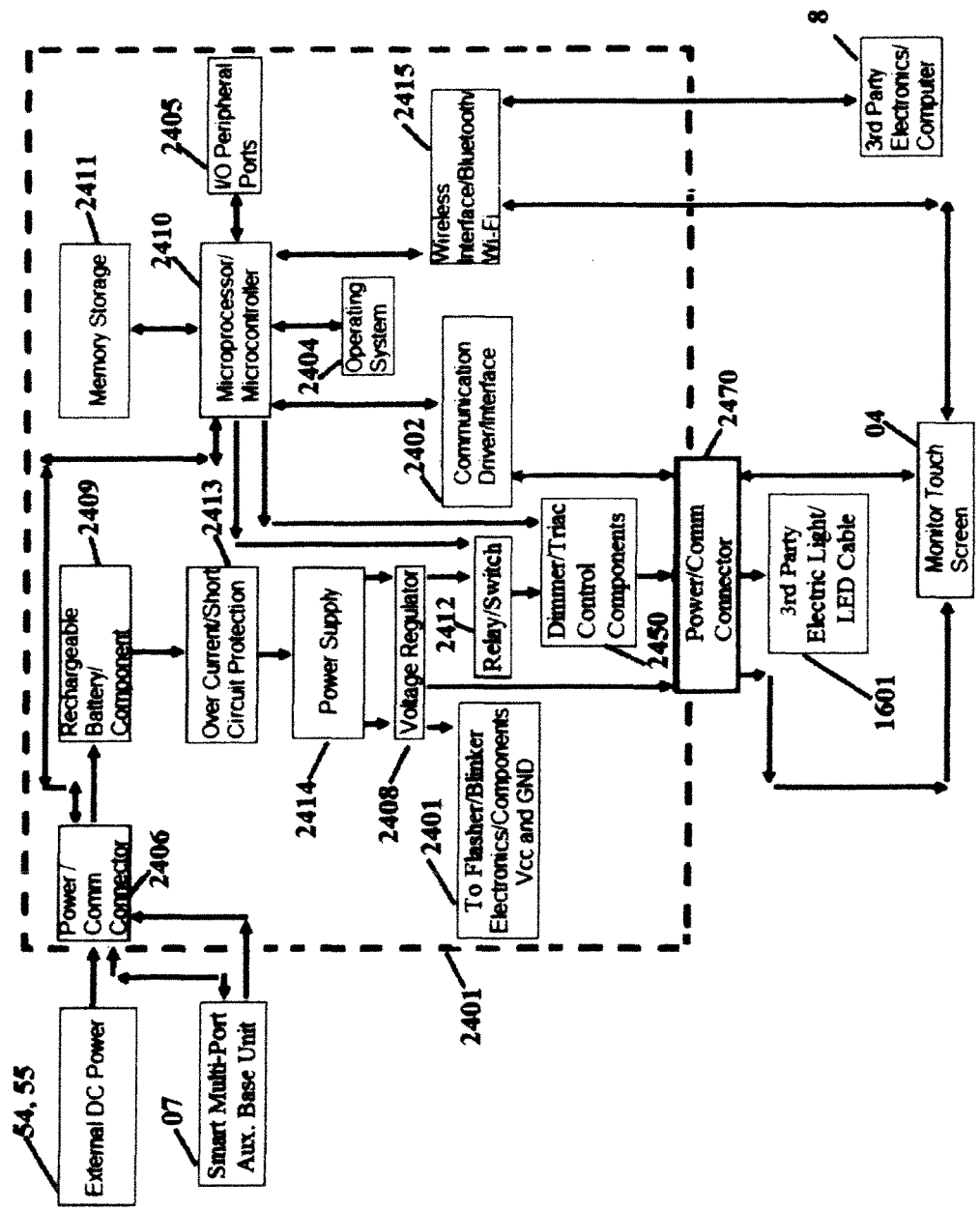
FIG. 24 is a block diagram of the Flasher/blinker/dimmer electronics module for third party lights.

Reference is now made to FIG. 24 that shows one embodiment of electronic components in housing 2401. When external DC power 54, 55 (FIGS. 16 and 24) is connected to the power and communication connector 2406 (FIGS. 16 and 24), power is applied to rechargeable battery or other rechargeable component 2409. The Smart Multi-Port Auxiliary Base unit 07 (FIGS. 1 and 24) could also connect to the power and communication connector 2406 with the power and communication cable 03 (FIG. 1). The electronics in housing 2401 will run without external DC power until rechargeable battery or other rechargeable component 2409 is completely de-energized. Over current/short circuit protection 2413 is designed to protect the electronics, third party electric lights or LED cable 2011 or 2040 (FIGS. 16 and 21) from becoming electrically damaged. In other embodiments, power may be supplied to the electronics in housing 2401 via a DC power supply connected to a conventional AC power source. A power supply 2414 and constant power source components 2408, such as a voltage regulator, serve to regulate power through the printed circuit board (PCB) conductive traces to the voltage (Vcc) and ground (GND) connection points to each of the components within the Flasher/Blinker/Dimmer module electronics 2401, to the power and communication connector 2470, and to the relay or semiconductor type of switch 2412 controlled to open or close by the microcontroller or microprocessor 2410 that allows or does not allow power to the third party electric lights or LEDs 2009, 2011, 1601, 2040 (FIGS. 16 and 21). The opening and closing of the semiconductor type of switch 2412 could be timing frequency controlled through the microprocessor/MCU 2410 by the end-user's third party electronics device 08 or through a software program. The switch 2412 may be connected to a dimmer control circuit 2450 that is controlled by microprocessor/MCU 2410. The dimmer control 2450 could have a triac that allows a certain amount of electricity to power the lights or LEDs based on the microprocessor/MCU 2410 timing frequency of its voltage output pulse sent to it. This frequency controls the brightness of the lights or LEDs. The microprocessor/MCU 2410 might use an operating system based on assembly language, machine code or a "C" based software to communicate with input/output peripheral ports 2405, digital or memory storage 2411 and to the communication driver/interface to the port conductors 2402. One particular family of microprocessors for use may be TINYAT™ processors available from ATMEL™, and which may integrate volatile and non-volatile memory and have I/O ports configurable on-the-fly to serve as both inputs and outputs. As should be apparent, where a particular family of microprocessors is used, the microprocessors of all devices of the system would be from the same family, be at least compatible with all devices of the system, or have some form of cross-platform adapter. A communication driver 2402 communicates with monitor touch screen 04 through power and communication circuitry and connector 2470. The microprocessor/MCU 2410 might also use wireless communication network protocol components 2415 such as Wi-Fi (802.11), Bluetooth, or other wireless transmission protocols. If a third party electric light or LED cable 2011 or 2040 is plugged into connector 2470 it receives power from the electronics in housing 2401 if the relay or semiconductor switch 2412 is switched closed by the output of the microcontroller or microprocessor 2410. If a monitor display or monitor touch screen 04 is plugged into connector 2470 then it may communicate through the PCB conductors to the communication driver 2402 that communicates with the microcontroller or microprocessor 2410 or it might communicate wirelessly to the wireless interface components 2415 that communicates with the microcontroller or microprocessor 2410. If a wireless electronic device/computer 08 is provided with Smart decoration system user interface software and communicates through its wireless technology 52 (FIG. 1), then it will communicate with cable wireless interface components 2415. Monitor display or touch screen 04 plugged into 2470 may ultimately communicate with each other, with the electronics in housing 2401, and could also communicate with the Smart Multi-Port Auxiliary Base Unit 07 (FIGS. 1 and 24) if connected, and also with a third party electronics device 08 (FIGS. 1 and 24) that is user controlled through the proper user interface software.

Figure 25:
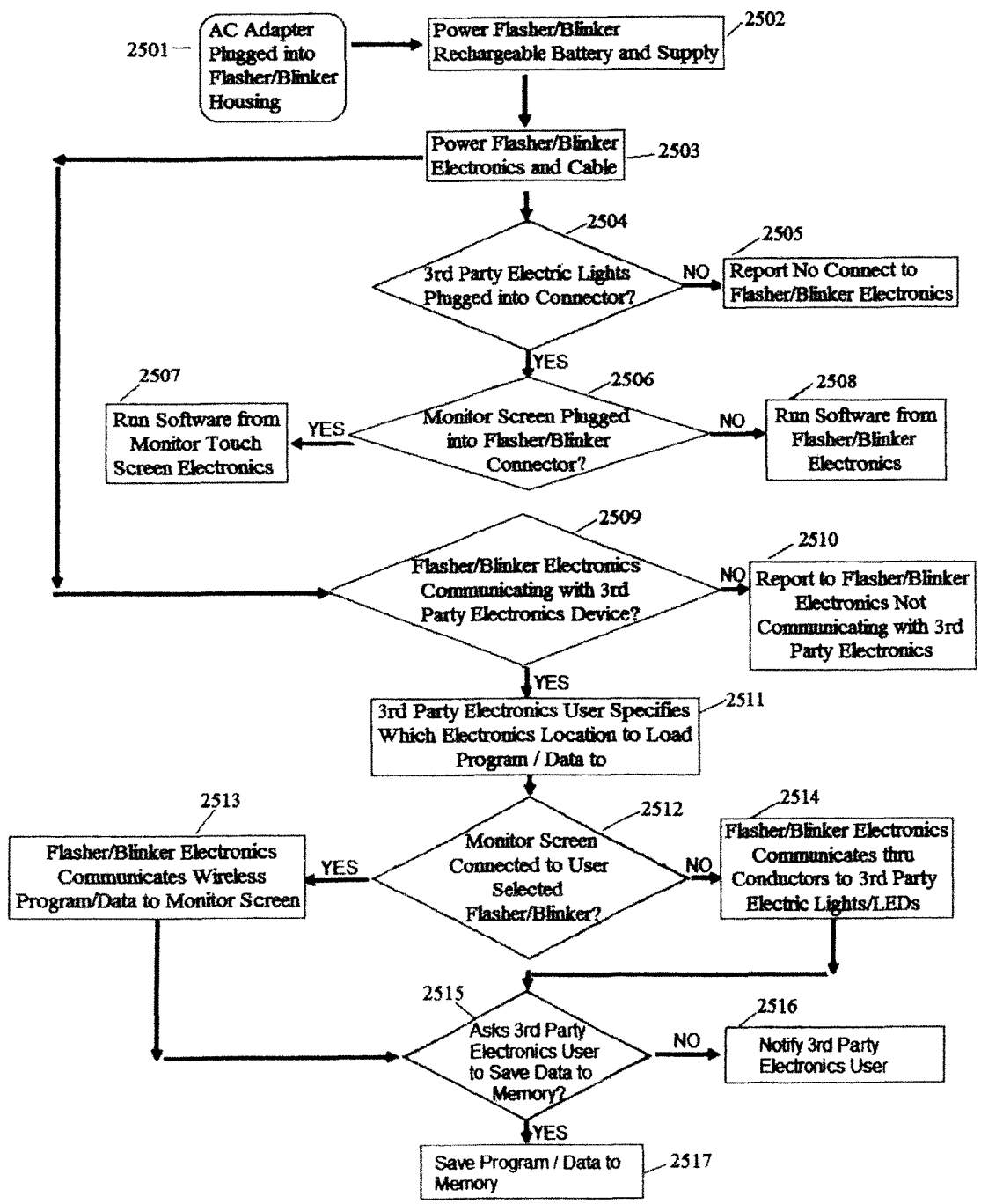
FIG. 25 is a flow chart of the Flasher/blinker/dimmer electronics system interaction with third party lights.

Reference is now made to FIG. 24 and FIG. 25 for one example of operation of the system. If an AC/DC adapter 54, 55 is connected to housing 2401 at box 2501, or a DC power source from a base unit 07 is plugged into the DC power source and communication connector 2406 via cable 03 (FIG. 01), then power will begin to charge the rechargeable battery or rechargeable component 2409 and supply power to electronic components within housing 2401. Cable 2011 (FIG. 16) or 2040 (FIG. 21) may operate with or without a DC power source connected to housing 2401 at box 2501, but cable 2011 or 2040 (FIGS. 16 and 21) will de-energize rechargeable battery or rechargeable component 2409 in housing 2401 as the cable 2011 or 2040 (FIGS. 16 and 21) and its connected modules and devices are using its power. It also should be noted that a power switch (not shown) may be located on housing 2401 to interrupt power to components therein to turn the system off. Electrical power at box 2502 is distributed to the other cable electronics at box 2503. The microprocessor/MCU 2410 in housing 2401 checks at box 2504 if third party lights or LED cable 2011 or 2040 (FIGS. 16 and 21) are connected at connector 2470. If no, then third party lights or LED cable 2011 or 2040 (FIGS. 16 and 21) are not connected at connector 2470, and microprocessor 2410 may enter a power-saving mode to wait for a third party lights or LED cable 2011 or 2040 (FIGS. 16 and 21) to be plugged into connector 2470. Otherwise, microprocessor 2410 may continue to poll connector 2470 until a third party lights or LED cable 2011 or 2040 (FIGS. 16 and 21) are connected at connector 2470. This is reported to microprocessor 2410 at box 2505. If the answer at box 2504 is yes, then a third party lights or LED cable 2011 or 2040 (FIGS. 16 and 21) are connected at connector 2470 and the logic flow proceeds to box 2506. At box 2506 microprocessor 2410 determines if a monitor display or touch screen 04 (FIG. 1) is connected to connector 2470. If yes, then at box 2507 the monitor touch screen program to receive software inputs from a user and if provided, to run programs that operate other smart modules plugged into the respective cable 2011 or 2040 (FIGS. 16 and 21). If no monitor display or touch screen monitor is available, then no connection is returned at box 2506 and the logic proceeds to box 2508 to run existing programs installed in the microprocessor/MCU 2410.

Also at box 2503, when power is supplied to the Flasher/Blinker/Dimmer embedded electronics 2401 its microprocessor/MCU 2410 is constantly checking at box 2509 if it is communicating through the wireless system 2415 with a third party electronics device/computer 08 (FIGS. 1 and 24). If no, then at box 2510 it reports to the Flasher/Blinker/Dimmer embedded electronics microprocessor/MCU 2410 that it is not currently communicating with a third party electronics device/computer 08 (FIGS. 1 and 24). If yes, at box 2511 the user of the third party electronics device 08 (FIGS. 1 and 24) specifies through its user interface software which software program to load. The logic then flows to box 2512, and the Flasher/Blinker/Dimmer embedded electronics microprocessor/MCU 2410 determines if a monitor display or touch screen plug-in 04 (FIGS. 1 and 24) is connected. If no, then the logic proceeds to box 2514 and microprocessor/MCU 2410 communicates the program/data to the third party lights or LED cable 2011 or 2040 (FIGS. 16 and 21) through connector 2470. If yes, a monitor display or touch screen 04 (FIGS. 1 and 24) is connected to connector 2470 then logic flow proceeds to box 2513 and the Flasher/Blinker/Dimmer embedded electronics microprocessor/MCU 2410 communicates the program/data through the Flasher/Blinker/Dimmer embedded wireless system 2415 to the monitor display or touch screen 04 (FIGS. 1 and 24) and to the third party lights or LED cable 2011 or 2040 (FIGS. 16 and 21) connected to 2470.

When the process at boxes 2513 or 2514 is complete the Flasher/Blinker/Dimmer embedded electronics microprocessor/MCU 2410 asks the user of the third party electronics device/computer 08 (FIGS. 1 and 24) to save the program/data to memory storage 2411 and/or to the Flasher/Blinker/Dimmer Multi-Port Auxiliary Base unit's 07 (FIGS. 1 and 24) memory storage 17 (FIG. 1). If no, then the logic flows to box 2516 to notify the user of the third party electronics device/computer 08 (FIG. 1) that the program/data was not saved. If yes, then the logic proceeds to box 2517 to save the program/data to memory storage 2411 and/or to the Base unit 07 (FIGS. 1 and 24) memory storage 17 (FIG. 1).

Figure 26:
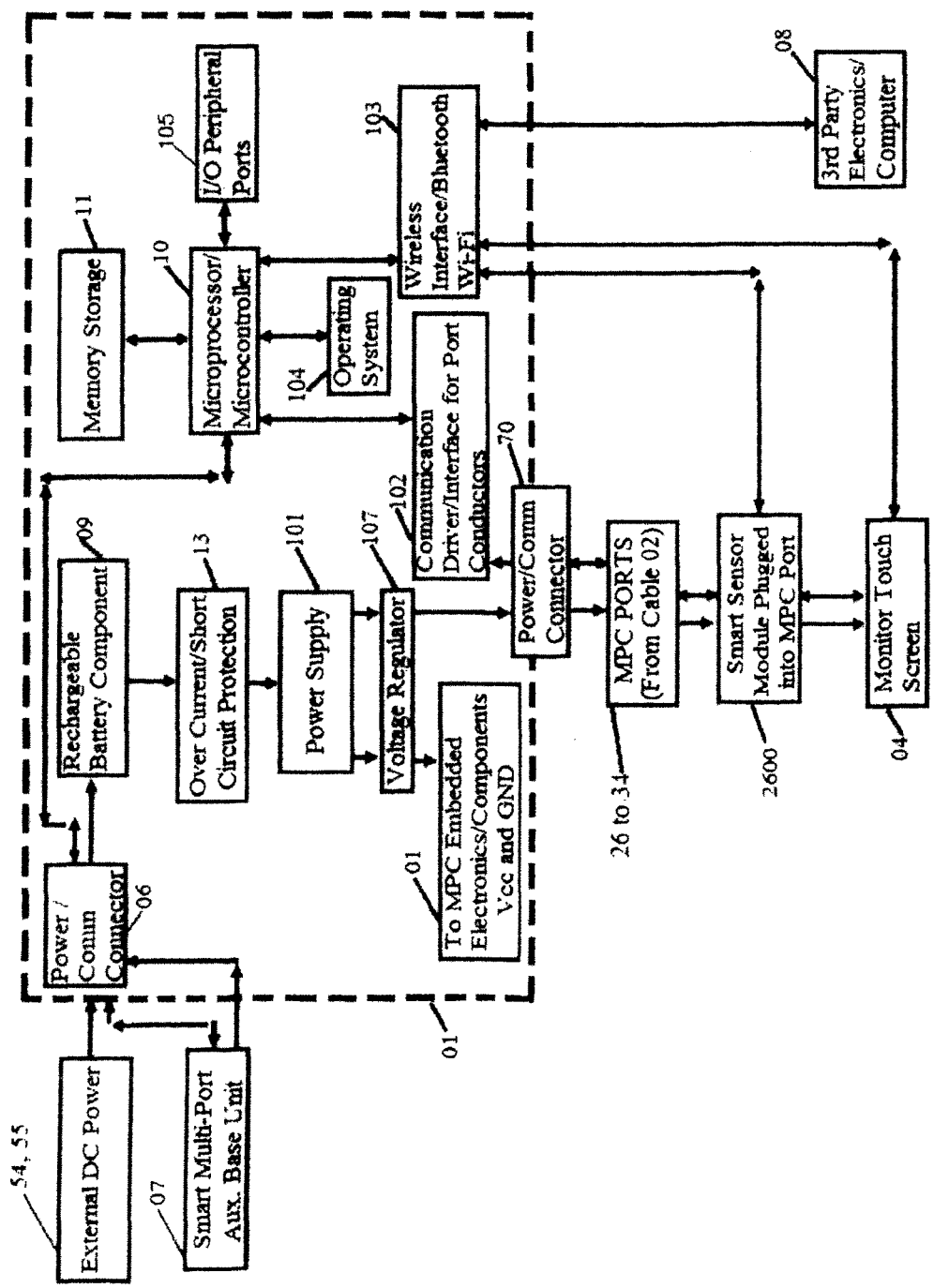
FIG. 26 is a block diagram of the Smart Sensor electronics module plug-in to MPC hardware components.

Reference is now made to FIG. 26 that shows one embodiment of electronic components in housing 01 (FIGS. 1 and 26). When external DC power 54, 55 is connected to the power and communication connector 06, power is applied to rechargeable battery or other rechargeable component 09. The Smart Multi-Port Auxiliary Base unit 07 (FIGS. 1 and 24) could also connect to the power and communication connector 06 with the power and communication cable 03 (FIG. 1). The electronics in housing 01 will run without external DC power until rechargeable battery or other rechargeable component 09 is completely de-energized. Over current/short circuit protection 13 is designed to protect the electronics (FIG. 26), cable 02 (FIG. 1), and Smart Sensor Module 2600 from becoming electrically damaged. In other embodiments, power may be supplied to the electronics in housing 01 via a DC power supply connected to a conventional AC power source.

A power supply 101 and constant power source components 107, such as a voltage regulator, serve to regulate power through the printed circuit board (PCB) conductive traces to the voltage (Vcc) and ground (GND) connection points to each of the components within the MPC embedded electronics 01, to the power and communication connector 70, and to all of the MPC ports 26-34 (FIGS. 1 and 26) that connect to Smart Sensor Module 2600. The microprocessor/MCU 10 might use an operating system based on assembly language, machine code or a "C" based software to communicate with input/output peripheral ports 105, digital or memory storage 11 and to the communication driver/interface to the port conductors 102. One particular family of microprocessors for use may be TINYAT™ processors available from ATMEL™, and which may integrate volatile and non-volatile memory and have I/O ports configurable on-the-fly to serve as both inputs and outputs. As should be apparent, where a particular family of microprocessors is used, the microprocessors of all devices of the system would be from the same family, be at least compatible with all devices of the system or have some form of cross-platform adapter. A communication driver for the port conductors 102 communicates with cable ports 26-34 through power and communication circuitry 70. The microprocessor/MCU 10 may also use wireless communication network protocol components 103 such as Wi-Fi (802.11), Bluetooth, or other wireless transmission protocols. If a Smart Sensor Module 2600 is plugged into a cable port 26-34, it receives power and communication from the electronics in housing 01. If a monitor display or touch screen 04 is plugged into a Smart Sensor Module 2600 then it may communicate through the conductors of cable 02 (FIGS. 1 and 26) or it might communicate wirelessly to the wireless interface components 103. If a wireless electronic device/computer 08 (FIGS. 1 and 26) is provided with Smart decoration system user interface software and communicates through its wireless technology 52 (FIG. 1), then it will communicate with cable wireless interface components 103. Smart Sensor Module 2600 and monitor touch screen 04 plugged into any of Ports 26-34 may ultimately communicate with each other, with the electronics in housing 01, and could also communicate with the Smart Multi-Port Auxiliary Base Unit 07 if connected, and also with a third party electronics device 08 that is user controlled through the proper interface software.

Smart Sensor Module 2600 is pluggable into any of the ports 26-34 of cable 02, and as described above, provide interfaces or communicates to different types of electronic devices, such as LED Smart Modules 35 to 43 (FIG. 1), or power terminals for providing power and control for LED lights, or input/output terminals for audio and input/output terminals for static images and streaming video. Other modules would additionally include terminals for a communication and display device, such as the small monitor display or touch screen monitor as noted above. Another module would additionally incorporate terminals for selectively powering actuators for animated parts of a display or decoration, such as an automated puppet or decorative robot (FIG. 9).

Figure 27:
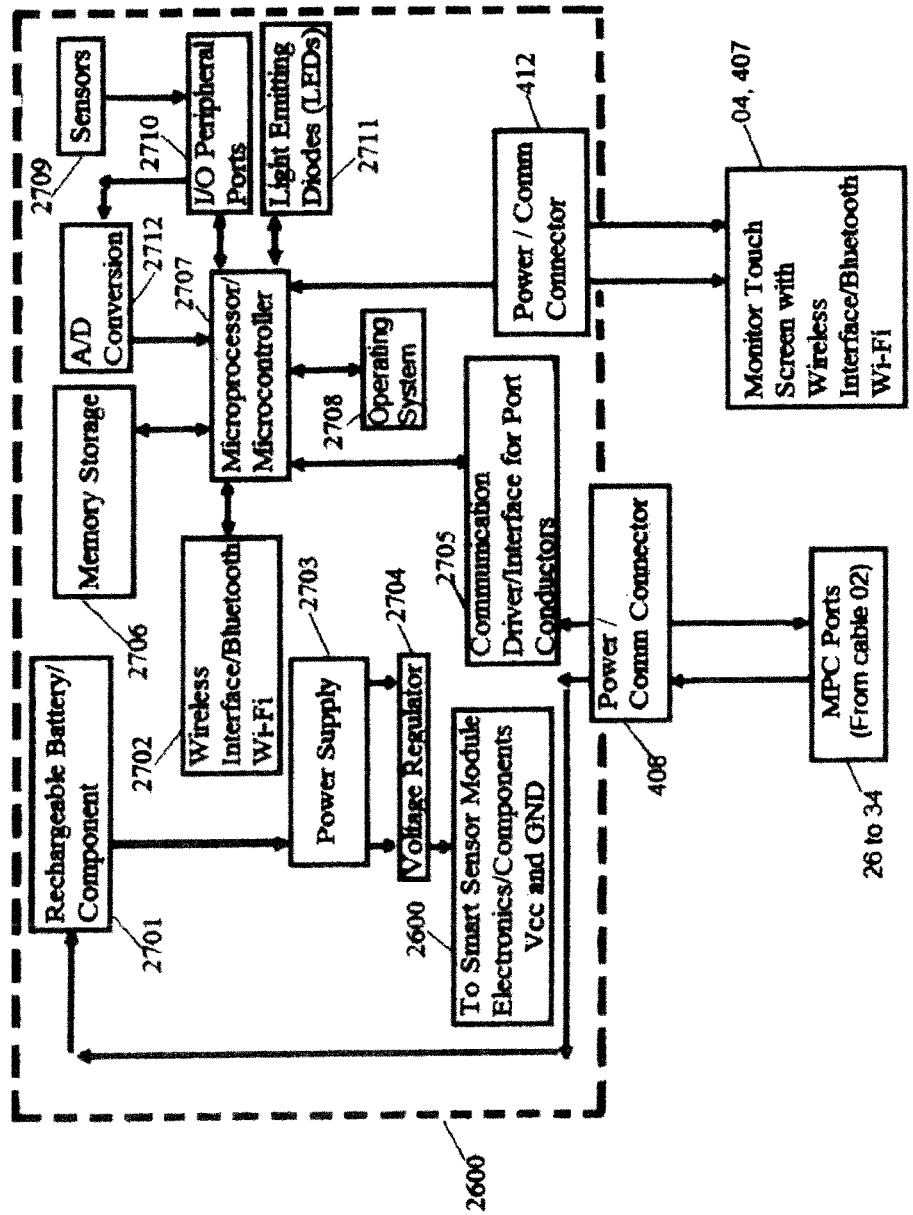

Referring now to FIG. 27, one embodiment of electronics of a Smart Sensor Module 2600 is shown that embodies the anticipated functions of the invention, although other functions may be added. For each Smart Sensor module plugged into a respective port 26 to 34 of the cable 02 (FIG. 1), DC power from the ports of cable 02 is connected to a power/communication connector 408 of the port and thereafter applied to a rechargeable battery or other rechargeable component 2701. As such, the Smart Sensor modules, once programmed, may run autonomously under their own power independently from power supplied by cable 02 or under control of a program operated by microprocessor 2707 or 10 (FIG. 1). A power supply 2703 and voltage regulator 2704 provide a constant power source through the printed circuit board (PCB) conductive traces to the voltage (Vcc) and ground (GND) connection points to each of the components within the Smart Sensor Module 2600. A microprocessor/MCU 2707 with associated memory 2706 might use assembly language based software like machine code, "C" based software and commands or proprietary language where TINYAT™ type processors are used to communicate to the operating or control system 2708, input/output peripheral ports 2710, digital or memory storage 2706, through the power and communication connector 412 connected to a Monitor Display or Touch Screen plug-in 04 and its wireless interface components 407, and to a communication driver/interface to the port conductors 2705. The communication driver for the port conductors 2705 communicates to its power/communication connector 408 connected to cable 02 ports 26-34. If a Smart Sensor Module 2600 is plugged into a cable 02 port 26-34 then it receives power and communication. Sensor 2709 has its voltage/current connected to the input to the microprocessor/MCU 2707. The sensor voltage/current could be measured with the microprocessor/MCU 2707 if it has an internal analog to digital converter or it could be measured with an external analog to digital converter 2712 that sends the measured digital data to the microprocessor/MCU 2707. This sensor 2709 could be a resistor, thermocouple, transistor, thermistor, laser, diode, or semiconductor type of component, or a component that is composed of a semiconductor type of material that changes voltage or current values when exposed to different types of environments with gasses, liquid, or vapors present. Then software could determine the measurement or reading of the sensor's voltage or current value and display the value to a monitor display or touch screen plug-in 04. Software could determine the type and amount of gas, or liquid, or vapor, or environment temperature that is in immediate contact with the sensor 2709. Other various types of sensors that include optic sensor types could be used to determine light brightness or the characterization of the reaction of the light or vision sensors could be used to interact with the environment, animals, micro-organisms, human beings, or equipment. The smart sensor module is not limited to any one type of sensor but allows multiple types of sensors to be used including but not limited to, environmental, weather, natural gas, smoke, temperature, carbon monoxide sensors, sound, light, proximity, vibration, biological, mind, flow, velocity, accelerometer, medical, pressure, and motion sensors. If a monitor display or touch screen plug-in 04 is plugged into a Smart Sensor Module 2600 with its power and communication connector 412 then it might communicate through the conductors of the Smart Sensor Module, or it might communicate wirelessly 407 to the wireless interface components 2702, or it could communicate with electronics in cable housing 01 (FIG. 1), or it can communicate with other Smart Sensor Modules 2600 connected to cable 02 ports 26-34. There are also mechanical connections on the exterior of Smart Sensor Module 2600 for connections for tie-wraps or a strap-like material (can be rotated multiple angles) for hanging the Smart Sensor Module 2600 to another object, such as a pipe fitting or mechanical fixture. A plurality of such programmable Smart Sensor Modules 2600 can be used together on a cable 02, but controlled independently by programming provided by a cell phone, tablet or other computer 08 (FIG. 1) and stored in memory 11 (FIG. 1) in housing 01. In some embodiments, the Smart Sensor Module 2600 could be hermetically sealed to protect its internal components from harsh environments that could include hazardous or flammable environments. Outdoor Smart Sensor Modules 2600 would be weatherized by sealing components in waterproof housings and insulation.

Figure 28:
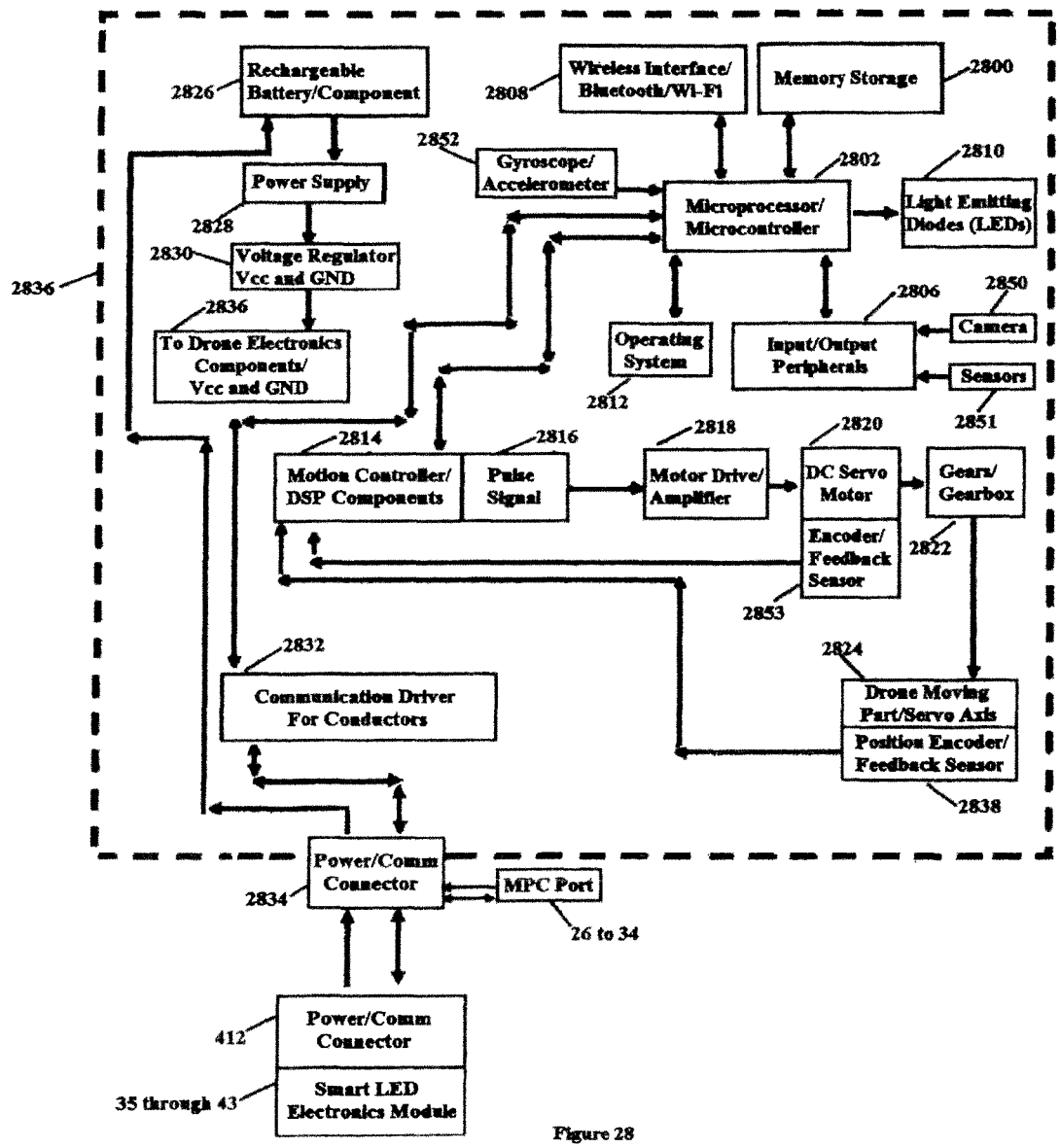
FIG. 28 is a block diagram of the Drone/Air vehicle electronics.

Reference is now made to FIG. 28 that shows one embodiment of the Drone Module or Air Vehicle plug-in module 2836. External DC power from a Smart Module connection 35-43 (FIGS. 1 and 28) is connected with its connector 412 to power/communication connector 2834. In other embodiments, the Drone Module plug-in module is plugged in directly with its power/communication connector 2834 to a cable port 26-34 without the Smart Module 35-43 connected to cable 02 of FIG. 1. In this embodiment, external DC power is fed directly from electronics in housing 01 of FIG. 1, with DC power applied to the rechargeable battery or other rechargeable component 2826. The Drone plug-in module 2836 will run without external DC power until the rechargeable battery or other rechargeable component 2826 is de-energized or power falls below an operational level of the associated microprocessor as noted above. The power supply 2828 regulates power and constant power source components 2830 such as a voltage regulator could regulate power through the printed circuit board (PCB) conductive traces to the voltage (Vcc) and ground (GND) connection points to each of the components within the Drone plug-in module 2836. The microprocessor/MCU 2802 might use assembly language based software like machine code, "C" based software or another language as noted above to communicate to the operating system 2812. The microprocessor/MCU 2802 controls the on/off frequency of light emitting diodes (LEDs) 2810 attached to its printed circuit board (PCB), communicates with the operating system 2812, to the input/output peripheral ports 2806, to the digital or memory storage 2800, to the communication driver/interface to the conductors 2832, and to the wireless interface components 2808 within the Drone plug-in module 2836. A camera 2850 and sensors 2851 may be included in the Drone module electronics 2836 that communicate through the input/output peripheral ports 2806. Gyroscope and accelerometer sensors 2852 might also be included with the Drone module electronics 2836 to assist the Drone module to fly in its surrounding environmental conditions. The communication driver for the conductors 2832 communicates through its power/communication connector 2834 to Smart Module connector 412. If a Drone Module 2836 is plugged into Smart Module connector 35-43 then it receives power 2834, conductor communication 2834, and it communicates wireless 2808 to the MPC embedded electronics wireless interface components 103 (FIG. 4) or with the Smart LED Electronics Module wireless interface components 413 (FIG. 5). The Microprocessor/MCU 2802 might receive a signal or program instruction from the wireless interface 2808 to move or automate a certain servo axis 2824 of the drone component. This signal might come from a third party electronics device 08 (FIG. 1) controlled by the end-user's interface software, or from a software program within the MPC embedded electronics microprocessor 10 (FIG. 4), or from a software program within the Smart LED Electronics Module microprocessor 405 (FIG. 5). This signal is sent from the Microprocessor/MCU 2802 to the motion controller/Digital Signal Processor (DSP) 2814. This signal is converted to a pulse signal 2816 that is sent to the Motor Drive/Amplifier Components 2818. This converts the pulse 2816 or amplifies it to an electrical power signal that is compatible with the power inputs of the DC Servo Motor 2820. This power signal might power a DC Servo Motor 2820 in order to move Gears/Gear Box that the DC Servo Motor's Shaft 2820 is attached to. The Gears/Gear Box 2822 are mechanically attached to the Drone Moving Part/Servo Axis 2824 that moves. This Drone Moving Part/Servo Axis 2824 (FIG. 28 and FIG. 31) could be a robotic arm with direction control attached to a DC Servo Motor 2820. The Motor Controller/DSP 2814 might have encoder inputs connected to the DC Servo Motor's Encoder/Feedback sensor 2853, to the Drone Moving Part/Servo Axis 2824, and Position Encoder/Feedback sensor 2838. The Motor Controller/DSP 2814 converts these encoder signals into data in order to calculate the exact position of the Drone Moving Part/Servo Axis 2824 and the current position of the DC Servo Motor 2820. The Motor Controller/DSP 2814 uses this position data or servo axis degrees to move DC Servo Motor 2820 to the exact position or servo axis degrees that matches or equals the position data or servo axis degrees sent from the Microprocessor/MCU 2802 signal or program instruction.

Figure 29:
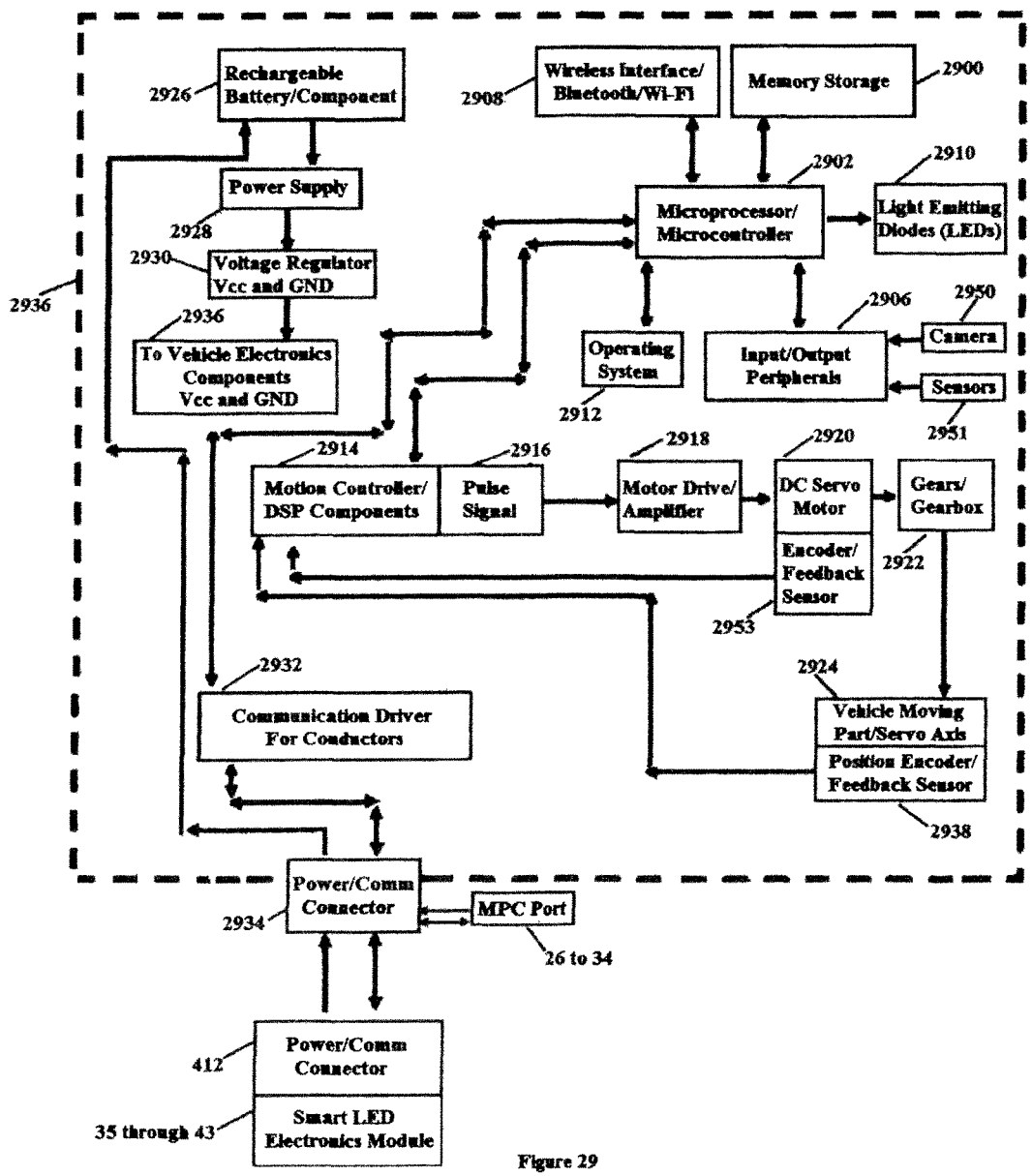
FIG. 29 is a block diagram of the ground vehicle electronics.

Reference is now made to FIG. 29 that shows one embodiment of the Automobile or Ground Vehicle plug-in module 2936. External DC power from a Smart Module connection 35-43 is connected with its connector 412 to power/communication connector 2934. In other embodiments, the Ground Vehicle plug-in module 2936 is plugged in directly with its power/communication connector 2934 to a cable port 26-34 without the Smart Module 35-43 connected to cable 02 (FIG. 1). In this embodiment, external DC power is fed directly from electronics in housing 01 (FIG. 1), with DC power applied to the rechargeable battery or other rechargeable component 2926. The Ground Vehicle plug-in module 2936 will run without external DC power until the rechargeable battery or other rechargeable component 2926 is de-energized or power falls below an operational level of the associated microprocessor as noted above. The power supply 2928 regulates power and constant power source components 2930 such as a voltage regulator could regulate power through the printed circuit board (PCB) conductive traces to the voltage (Vcc) and ground (GND) connection points to each of the components within the Ground Vehicle plug-in module 2936. The microprocessor/MCU 2902 might use assembly language based software like machine code, "C" based software or another language as noted above to communicate to the operating system 2912. The microprocessor/MCU 2902 controls the on/off frequency of light emitting diodes (LEDs) 2910 attached to its printed circuit board (PCB), communicates with the operating system 2912, to the input/output peripheral ports 2906, to the digital or memory storage 2900, to the communication driver/interface to the conductors 2932, and to the wireless interface components 2908 within the Ground Vehicle plug-in module 2936. A camera 2950 and sensors 2951 may be included in the Ground Vehicle plug-in module electronics 2936 that communicate through the input/output peripheral ports 2906. Sensors 2951 might be included with the Ground Vehicle plug-in module electronics 2936 to assist the Ground Vehicle module to drive or maneuver in its surrounding environmental conditions. The communication driver for the conductors 2932 communicates through its power/communication connector 2934 to Smart Module connector 412. If a Ground Vehicle plug-in module 2936 is plugged into Smart Module connector 35-43 then it receives power 2934, conductor communication 2934, and it communicates wireless 2908 to the MPC embedded electronics wireless interface components 103 (FIG. 4) or with the Smart LED Electronics Module wireless interface components 413 (FIG. 5). The Microprocessor/MCU 2902 might receive a signal or program instruction from the wireless interface 2908 to move or automate a certain servo axis 2924 of the car or ground vehicle component. This signal might come from a third party electronics device 08 (FIG. 1) controlled by the end-user's interface software, or from a software program within the MPC embedded electronics microprocessor 10 (FIG. 4), or from a software program within the Smart LED Electronics Module microprocessor 405 (FIG. 5). This signal is sent from the Microprocessor/MCU 2902 to the motion controller/Digital Signal Processor (DSP) 2914. This signal is converted to a pulse signal 2916 that is sent to the Motor Drive/Amplifier Components 2918. This converts the pulse 2916 or amplifies it to an electrical power signal that is compatible with the power inputs of the DC Servo Motor 2920. This power signal might power a DC Servo Motor 2920 in order to move Gears/Gear Box that the DC Servo Motor's Shaft 2920 is attached to. The Gears/Gear Box 2922 are mechanically attached to the Automobile or Vehicle Moving Part/Servo Axis 2924 that moves. This Automobile or Vehicle Moving Part/Servo Axis 2924 could be a wheel or tire with direction control attached to a DC Servo Motor 2920. The Motor Controller/DSP 2914 might have encoder inputs connected to the DC Servo Motor's Encoder/Feedback sensor 2953, to the Automobile or Vehicle Moving Part/Servo Axis 2924, and to the Position Encoder/Feedback sensor 2938. The Motor Controller/DSP 2914 converts these encoder signals into data in order to calculate the exact position of the Automobile or Ground Vehicle Moving Part/Servo Axis 2924 (FIG. 29 and FIG. 32) and the current position of the DC Servo Motor 2920. The Motor Controller/DSP 2914 uses this position data or servo axis degrees to move DC Servo Motor 2920 to the exact position or servo axis degrees that matches or equals the position data or servo axis degrees sent from the Microprocessor/MCU 2902 signal or program instruction.

Figure 30:
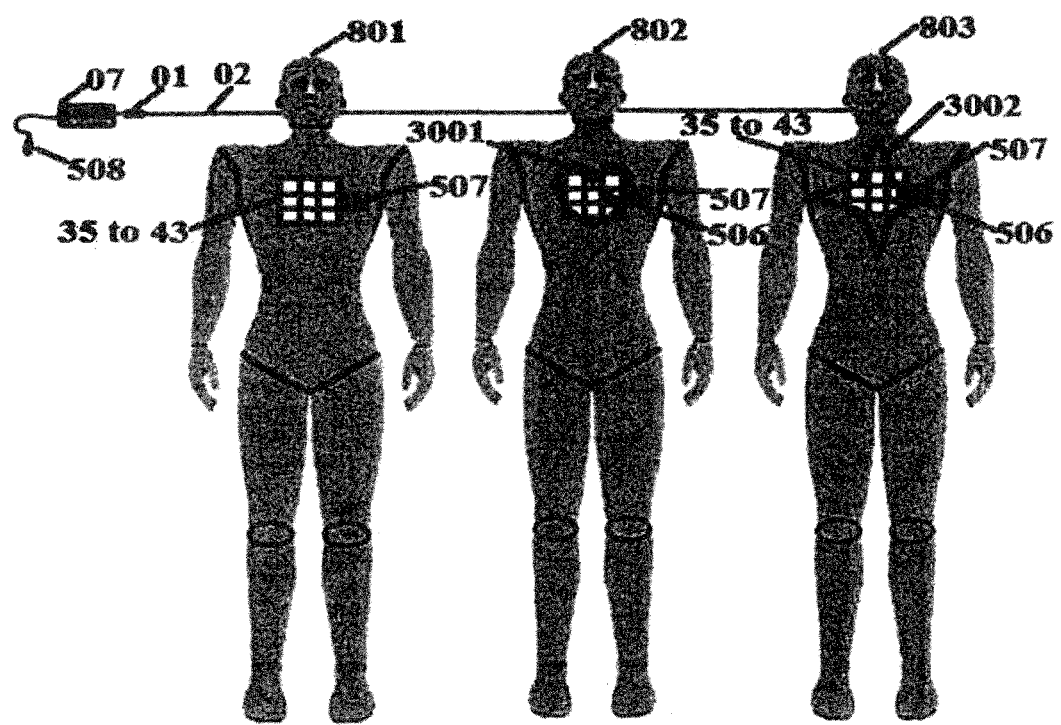
FIG. 30 is a diagram of the decorative robotics with auxiliary base unit, MPC electronics, MPC, Smart LED modules, and replaceable decorative covers with connectors.
Figure 31:
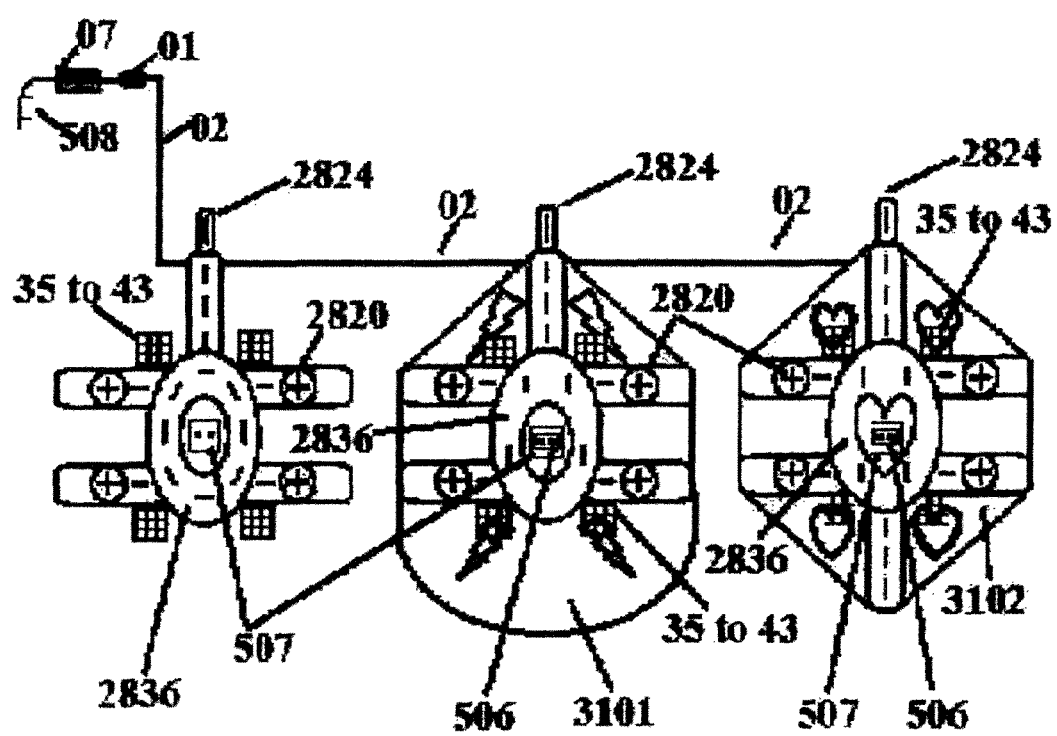
FIG. 31 is a diagram of the decorative drone/air vehicles with auxiliary base unit, MPC electronics, MPC, Smart LED modules, and replaceable decorative covers with connectors.
Figure 32:
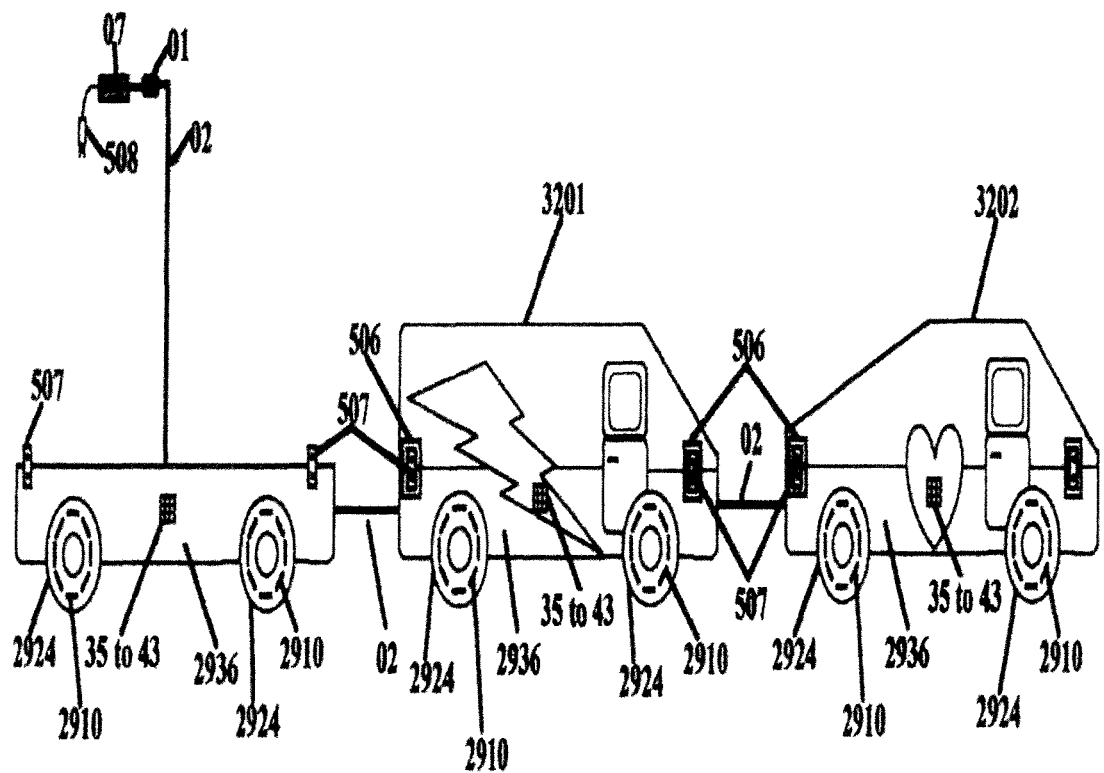
FIG. 32 is a diagram of the decorative cars/ground vehicles with auxiliary base unit, MPC electronics, MPC, Smart LED modules, and replaceable decorative covers with connectors.

Reference is now made to FIG. 30, FIG. 31, and FIG. 32. By way of example, in the top most diagram representation there is a 115 VAC power plug 508 connected to a Smart Multi-Port Auxiliary Base unit 07 (FIG. 1, FIG. 30, FIG. 31, and FIG. 32) that in turn is electrically connected to a housing 01 (FIG. 1, FIG. 30, FIG. 31, and FIG. 32) and decorative robotic housing 801 through 803 (FIG. 9 and FIG. 30), or decorative drone housing 2836 (FIG. 31), or decorative ground vehicle housing 2936 (FIG. 32) containing associated electronics (FIG. 13, FIG. 28, and FIG. 29), and a cable 02 (FIG. 1, FIG. 30, FIG. 31, and FIG. 32) having respective ports 26-34 (FIG. 1). Smart modules 35-43 (FIG. 1, FIG. 30, FIG. 31, and FIG. 32) plugged into ports 26-34 are provided with Discrete LED Replaceable Covers 3001, 3002 (FIG. 30), 3101, 3102 (FIG. 31), and 3201, 3202 (FIG. 32) that attach to respective smart modules and are attachable/detachable by means of a mechanical connector, such as a clip, tabs, fasteners or the like 506 (FIG. 8, FIG. 22, FIG. 30, FIG. 31, FIG. 32) that engage a mating connector 507 (FIG. 8, FIG. 22, FIG. 30, FIG. 31, FIG. 32) on the Smart modules 35-43. In other embodiments, and as noted, the housings 01 may be connected directly to AC power without the base units 07.

Within each LED Replaceable Cover 3001, 3002, 3101, 3102, 3201, and 3202 there may be miniature/individual compartments or other structures 502 (FIG. 8) containing or otherwise integrating light emitting diodes (LEDs), for providing illumination control. These compartments 502 (FIG. 8) might not be included in all replaceable covers if improved illumination control is not desired, but the Discrete LED Replaceable Cover would still be a generally hollow housing for LEDs enclosed therein or mounted thereto. A printed circuit board may be specifically configured in the shape of each Discrete LED Replaceable cover 3001, 3002, 3101, 3102, 3201, and 3202 which has LEDs and other components that could connect to a connector within the Discrete LED Replaceable cover 3001, 3002, 3101, 3102, 3201, and 3202, and which connects to a port of a respective smart module 35-43. As noted, connectors for LED lights attached to a smart module may be modular connectors with multiple terminals so as to independently control individual lights of a replaceable cover 3001, 3002, 3101, 3102, 3201, and 3202. In other embodiments, the specifically-configured printed circuit board may be omitted, with the LEDs mounted directly to or in the replaceable cover. Reflectors, retro-reflectors, prisms and lenses and other optical shapes might be included or attached to covers 3001, 3002, 3101, 3102, 3201, and 3202 to increase the illumination effects. LEDs 2910 (FIG. 32) may be added to increase the frequency animation effects of the LEDs when connected to smart module 35-43 and to cable 02. In addition, using special paints such as fluorescent paint, reflective coatings and glitter may be added to replaceable decorative covers 3001, 3002, 3101, 3102, 3201, and 3202. As noted above, in or on the back of the Smart LED Electronics module 35-43 there may be a slit, tab hook or the like 505 (FIG. 8) to be used for a tie wrap or strap-like material that can be used to hang the Smart LED Electronics module 35-43 at different angles from various objects or things. A rotatable mechanized accessory 503 (FIG. 8) might also be added to a Smart LED Electronics module 35-43 in order for the accessory to be rotated. A tabletop or desktop accessory 504 (FIG. 8) is another feature that enables the LED Smart Electronics module 35-43 to be placed or mounted on a flat surface.

Figure 33:
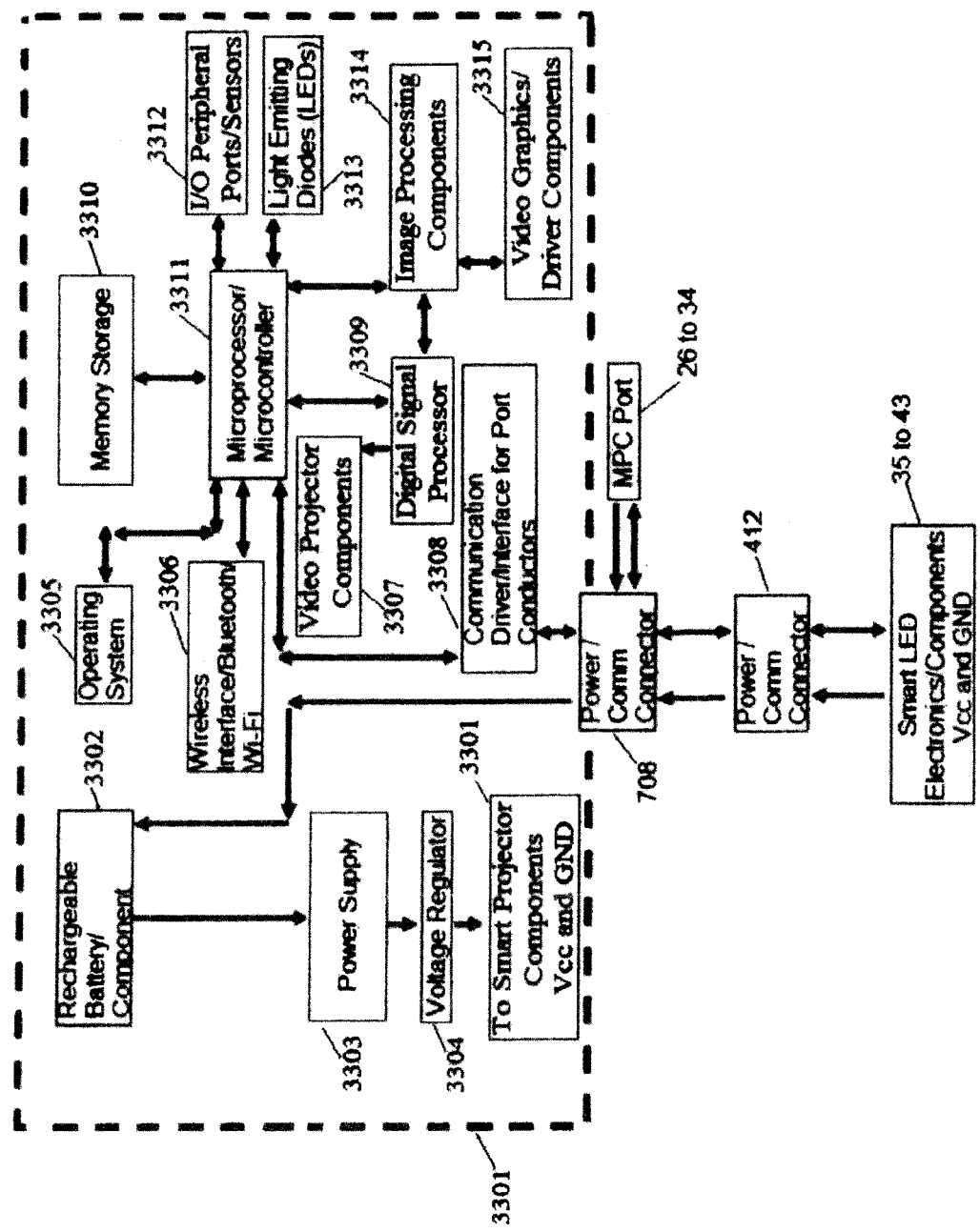

Reference is now made to FIG. 33 that shows, by way of example, one embodiment of the Smart Projector Module plug-in 3301. External DC power from the Smart LED Electronics Module is connected to power/communication connector 708. In other embodiments the Smart Projector Module plug-in 3301 may be plugged in directly via connector 708 to a cable port 26-34 without the LED Smart Electronics Module 35-43. In this embodiment, external DC power is fed directly from a housing of the Smart Projector Module plug-in 3301 (FIG. 33) and DC power is applied to the rechargeable battery or other rechargeable component 3302. The Smart Projector Module plug-in 3301 will run without external DC power until the rechargeable battery or other rechargeable component 3302 is completely de-energized or as noted, the battery voltage falls below an operational voltage of the Smart Projector Module plug-in 3301, at which point it turns itself off. The power supply 3303 regulates power and constant power source components 3304 such as a voltage regulator to regulate power through the printed circuit board (PCB) conductive traces to the voltage (Vcc) and ground (GND) connection points to each of the components within the Smart Projector Module plug-in and to all of the Smart Projector Module plug-in 3301. The microprocessor/MCU 3311 might use assembly language based software like machine code, "C" based software language or a proprietary language as noted above to communicate to the operating system 3305. The microprocessor/MCU 3311 controls the on/off frequency of light emitting diodes (LEDs) 3313 attached to its printed circuit board (PCB), communicates with the operating system 3305, to the input/output peripheral ports/sensors 3312, to the digital or memory storage 3310, to the communication driver/interface to the conductors 3308, to the image processing components 3314 that communicates, to the video graphics/driver components 3315, to the digital signal processor 3309, and to the wireless interface components 3306 within the Smart Projector Module plug-in 3301. When all images are processed they are sent to the video projector components 3307 in order to project the display image. The communication driver for the conductors 3308 communicates through its power/communication connector 708 to the Smart Module connector 412.

If a Smart Projector Module plug-in 3301 is plugged into a Smart Module connector 35-43 (FIG. 1), then it receives power and communication via connector 708, and communicates wirelessly using wireless interface 3306 to the cable electronics wireless interface components 103 (FIG. 4) in housing 01 (FIG. 1) or with the Smart Electronics Module wireless interface components 413 (FIG. 5).

If a Smart Projector Module plug-in 3301 is plugged directly into a port of the MPC 26-34 (FIG. 1) then it receives power and communication via connector 708, and communicates wirelessly using wireless interface components 3306 to the cable electronics wireless interface components 103 (FIG. 4) in housing 01 (FIG. 1).

Figure 34:
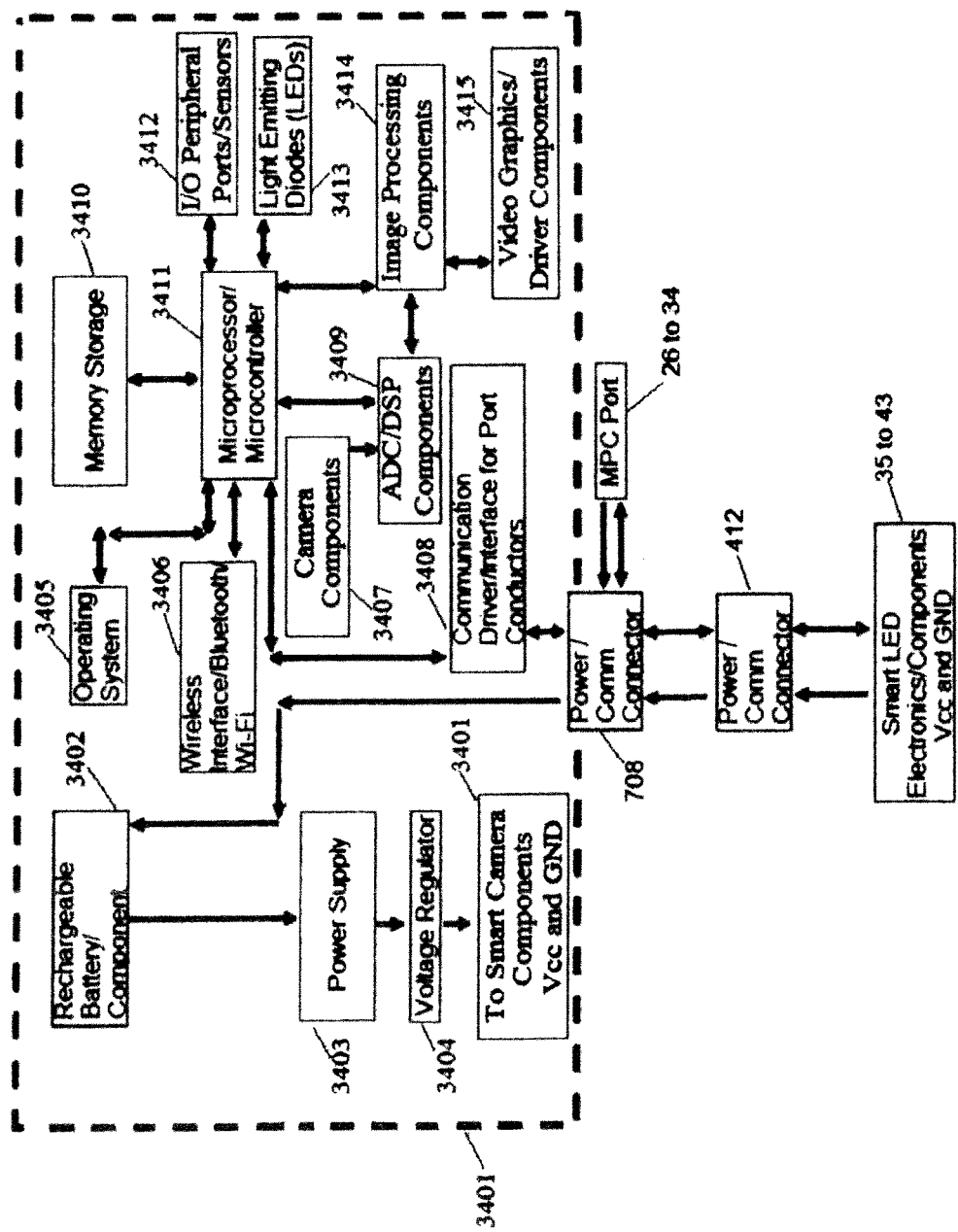

Reference is now made to FIG. 34 that shows, by way of example, one embodiment of a Smart Camera Module plug-in 3401 having camera components configured to capture, otherwise receive, process, or display images including video, when energized. External DC power from the Smart LED Electronics Module is connected to power/communication connector 708. In other embodiments the Smart Camera Module plug-in 3401 may be plugged in directly via connector 708 to a cable port 26-34 without the LED Smart Electronics Module 35-43. In this embodiment, external DC power is fed directly from housing 3401 (FIG. 34) and DC power is applied to the rechargeable battery or other rechargeable component 3402. The Smart Camera Module plug-in 3401 will run without external DC power until the rechargeable battery or other rechargeable component 3402 is completely de-energized or as noted, the battery voltage falls below an operational voltage of the Smart Camera Module plug-in 3401, at which point it turns itself off. The power supply 3403 regulates power and constant power source components 3404 such as a voltage regulator to regulate power through the printed circuit board (PCB) conductive traces to the voltage (Vcc) and ground (GND) connection points to each of the components within the Smart Camera Module plug-in and to all of the Smart Camera Module plug-in components 3401. The microprocessor/MCU 3411 might use assembly language based software like machine code, "C" based software language or a proprietary language as noted above to communicate to the operating system 3405. The microprocessor/MCU 3411 controls the on/off frequency of light emitting diodes (LEDs) 3413 attached to its printed circuit board (PCB), communicates with the operating system 3405, to the input/output peripheral ports/sensors 3412, to the digital or memory storage 3410, to the communication driver/interface to the conductors 3408, to the image processing components 3414 that communicates, to the video graphics/driver components 3415, to the analog to digital converter (ADC) 3409, to the digital signal processor (DSP) 3409, and to the wireless interface components 3406 within the Smart Camera Module plug-in 3401. When all images are received and processed from the camera components 3407 they are sent to the I/O peripheral port 3412 in order to display the image. The communication driver for the conductors 3408 communicates through its power/communication connector 708 to the Smart Module connector 412.

It should be apparent that any of the various parts and embodiments of the invention can be used separately or together in any combination.

Having thus described my invention and the manner of its use, it should be apparent to those skilled in the relevant arts that incidental changes may be made thereto that fairly fall within the scope of the following appended claims, wherein I claim:

1. An intelligent electronic decoration system, comprising:
 a smart multi-port cable (MPC) having a flexible body extending longitudinally between opposed proximal and distal ends and having a plurality of electronic ports spaced apart along said body and perpendicular thereto, said MPC being configured for electrically powering and communicating data via conductors connected to respective ports;

MPC embedded electronics having a housing selectively coupled to said proximal end of said MPC and in electrical and data communication therewith, said embedded electronics having a rechargeable battery or rechargeable component configured for energizing electronics devices electrically coupled to respective MPC ports, a microcontroller unit ("MCU"), and a memory collectively positioned within an interior space defined by said housing, said embedded electronics being configured for data interfacing with wired or wireless communication components of external electronic devices;

a plurality of smart electronics modules each having a connector selectively electrically connected to a respective MPC port, each smart electronics module being energized by power from said battery of said embedded electronics.

2. The intelligent decoration system as in claim 1, further comprising a Smart Multi-Port Auxiliary Base unit electrically connected to a DC power and communication connector of said embedded electronics, said Smart Multi-Port Auxiliary Base unit including an AC power source connector, a rechargeable battery, an AC to DC power conversion component, and a microprocessor/MCU unit.

3. The intelligent electronic decoration system as in claim 2 further comprising a flasher/blinker/dimmer electronics module electrically interfaced with said Smart Multi-Port Auxiliary Base unit, wherein said flasher/blinker/dimmer electronics module includes an input/output peripheral plug-in and is electrically configured to cause attached lighting hardware to flash or dim when electrically connected to said input/output peripheral plug-in.

4. The intelligent electronic decoration system as in claim 1, wherein said plurality of smart electronics modules includes a smart LED electronics module having LED lights selectively controlled by one of a microcontroller unit, microprocessor, or onboard electronics configured to display various colors and pre-programmed or real-time flashing patterns.

5. The intelligent electronic decoration system as in claim 1, wherein said plurality of smart electronics modules includes a display device or touch screen monitor configured to display visual data.

6. The intelligent electronic decoration system as in claim 1, further comprising a smart sensor plug-in module having at least one sensor electrically connected to a port in the MPC or a respective smart electronics module that is connected to the MPC.

7. The intelligent electronic decoration system as in claim 6, wherein said smart sensor plug-in module is hermetically or environmentally sealed to protect from hazardous environmental conditions, flammable conditions, and weather conditions.

8. The intelligent decoration system as in claim 1, further comprising a robotics or automated puppet module electrically connected to a respective Smart LED electronics module that is electrically connected to a port in the smart multi-port cable (MPC) or directly to the smart multi-port cable (MPC) and configured for controlling the automated puppets through programs and third party electronic devices.

9. The intelligent decoration system as in claim 1, further comprising one of a drone or air vehicle electrically connected to a respective Smart LED electronics module that is electrically connected to a port in the smart multi-port cable (MPC) or directly to the smart multi-port cable (MPC) and configured for controlling the said drone or air vehicle through programs, wireless electronics, and third party electronic devices.

10. The intelligent decoration system as in claim 1, further comprising one of an automobile or ground vehicle electrically connected to a respective Smart LED electronics module that is electrically connected to a port in the smart multi-port cable (MPC) or directly to the smart multi-port cable (MPC) and configured for controlling the said automobile or ground vehicle through programs, wireless electronics, and third party electronic devices.

11. The intelligent decoration system as in claim 1, further comprising a Smart Projector Module electrically connected to a respective Smart electronics module that is electrically connected to a port in the smart multi-port cable (MPC) or connected directly to the smart multi-port cable (MPC), said Smart Projector Module having a projector for projecting or displaying images or video when energized and is configured for controlling the said Smart Projector Module through programs, wireless electronics, and third party electronic devices.

12. The intelligent decoration system as in claim 1, further comprising a Smart Camera Module electrically connected to a respective Smart electronics module that is electrically connected to a port in the smart multi-port cable (MPC) or connected directly to the smart multi-port cable (MPC), said Smart Projector Module having a camera configured to capture, process, and display images or video when energized and is configured for controlling the said Smart Camera Module through programs, wireless electronics, and third party electronic devices.

13. The intelligent decoration system as in claim 1, further comprising a plurality of decorative covers having fastening structures removably coupled to respective smart electronics modules when said respective smart electronics module is connected to a respective MPC port, a respective cover being selectively rotatably positioned at various angles.

14. The intelligent decoration system as in claim 13, wherein a respective decorative cover includes an individual compartment configured to receive a light emitting diode (LED) for providing enhanced illumination of said decorative cover.

15. The intelligent decoration system as in claim 3, further comprising a plurality of decorative covers having fastening structures removably coupled to respective smart electronics modules when said respective smart electronics module is connected to a respective MPC port, a respective cover being selectively rotatably positioned at selected angles.

16. The intelligent decoration system as in claim 5, further comprising a plurality of decorative covers having fastening structures removably coupled to respective smart electronics modules when said respective smart electronics module is connected to a respective MPC port, a respective cover being selectively rotatably positioned at various angles.

17. The intelligent decoration system as in claim 6, further comprising a plurality of decorative covers having fastening structures removably coupled to respective smart electronics modules when said respective smart electronics module is connected to a respective MPC port, a respective cover being selectively rotatably positioned at various angles.

18. The intelligent decoration system as in claim 8, further comprising a plurality of decorative covers having fastening structures removably coupled to respective smart electronics modules when said respective smart electronics module is connected to a respective MPC port, a respective cover being selectively rotatably positioned at various angles.

19. The intelligent decoration system as in claim 9, further comprising a plurality of decorative covers having fastening structures removably coupled to respective smart electronics modules when said respective smart electronics module is connected to a respective MPC port, a respective cover being selectively rotatably positioned at various angles.

20. The intelligent decoration system as in claim 10, further comprising a plurality of decorative covers having fastening structures removably coupled to respective smart electronics modules when said respective smart electronics module is connected to a respective MPC port, a respective cover being selectively rotatably positioned at various angles.

21. The intelligent decoration system as in claim 6, wherein said at least one sensor is taken from a group that includes environmental, chemical, weather, gas, vapor, liquid, smoke, temperature, sound, light, proximity, optics, vision, vibration, biological, mind, flow, velocity, accelerometer, medical, pressure, and motion sensors.

* * * * *